US011231526B2

(12) United States Patent
Bellman et al.

(10) Patent No.: US 11,231,526 B2
(45) Date of Patent: Jan. 25, 2022

(54) LOW-COLOR SCRATCH-RESISTANT ARTICLES WITH A MULTILAYER OPTICAL FILM

(71) Applicant: CORNING INCORPORATED, Corning, NY (US)

(72) Inventors: Robert Alan Bellman, Ithaca, NY (US); Shandon Dee Hart, Elmira, NY (US); Karl William Koch, III, Elmira, NY (US); Charles Andrew Paulson, Painted Post, NY (US); James Joseph Price, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/386,759

(22) Filed: Apr. 17, 2019

(65) Prior Publication Data

US 2019/0243032 A1    Aug. 8, 2019

Related U.S. Application Data

(60) Continuation of application No. 15/142,508, filed on Apr. 29, 2016, now Pat. No. 10,444,408, which is a (Continued)

(51) Int. Cl.
*G02B 1/14* (2015.01)
*G02B 1/113* (2015.01)
(Continued)

(52) U.S. Cl.
CPC ............ *G02B 1/14* (2015.01); *C03C 17/3435* (2013.01); *G02B 1/10* (2013.01); *G02B 1/113* (2013.01);
(Continued)

(58) Field of Classification Search
CPC . G02B 1/14; G02B 1/115; G02B 1/10; G02B 1/113; C03C 17/3435; C03C 2217/734; C03C 2217/78; Y10T 428/315
See application file for complete search history.

(56) References Cited

U.S. PATENT DOCUMENTS 3,922,068 A   11/1975  Uetsuki
3,934,961 A    1/1976  Itoh et al.
(Continued)

FOREIGN PATENT DOCUMENTS

AU   2002341016 A1   2/2003
AU      766773 B2   10/2003
(Continued)

OTHER PUBLICATIONS

Portinha et al., "Hard ZrO2/Al2O3 nanolamianted PVD coatings evaluated by nanoindentation", Surface & Coatings Technology 200 (2005) 765-768. (See copy.
(Continued)

*Primary Examiner* — Kimberly N. Kakalec
(74) *Attorney, Agent, or Firm* — Shantanu Pathak; William Tucker

(57) ABSTRACT

Embodiments of this disclosure pertain to articles that exhibit scratch-resistance and improved optical properties. In some examples, the article exhibits a color shift of about 2 or less, when viewed at an incident illumination angle in the range from about 0 degrees to about 60 degrees from normal under an illuminant. In one or more embodiments, the articles include a substrate, and an optical film disposed on the substrate. The optical film includes a scratch-resistant layer and an optical interference layer. The optical interference layer may include one or more sub-layers that exhibit different refractive indices. In one example, the optical interference layer includes a first low refractive index sub-layer and a second a second high refractive index sub-layer.

(Continued)

In some instances, the optical interference layer may include a third sub-layer.

36 Claims, 32 Drawing Sheets

Related U.S. Application Data division of application No. 14/480,898, filed on Sep. 9, 2014, now Pat. No. 9,366,784, and a continuation-in-part of application No. 14/331,656, filed on Jul. 15, 2014, now Pat. No. 9,079,802, which is a continuation of application No. 14/262,066, filed on Apr. 25, 2014, now Pat. No. 9,359,261.

(60) Provisional application No. 62/034,412, filed on Aug. 7, 2014, provisional application No. 61/954,697, filed on Mar. 18, 2014, provisional application No. 61/877,568, filed on Sep. 13, 2013, provisional application No. 61/820,407, filed on May 7, 2013.

(51) Int. Cl.
  *C03C 17/34* (2006.01)
  *G02B 1/10* (2015.01)
  *G02B 1/115* (2015.01)

(52) U.S. Cl.
  CPC ........ *G02B 1/115* (2013.01); *C03C 2217/734* (2013.01); *C03C 2217/78* (2013.01); *Y10T 428/24942* (2015.01); *Y10T 428/315* (2015.01)

(56) References Cited

U.S. PATENT DOCUMENTS

| | | |
|---|---|---|
| 3,989,350 A | 11/1976 | Cohen et al. |
| 4,033,667 A | 7/1977 | Fleming |
| 4,137,365 A | 1/1979 | Wydeven et al. |
| 4,298,366 A | 11/1981 | Dabby et al. |
| 4,310,595 A | 1/1982 | Beall et al. |
| 4,423,925 A | 1/1984 | Dabby et al. |
| 4,495,684 A | 1/1985 | Sander et al. |
| 4,519,966 A | 5/1985 | Aldinger et al. |
| 4,537,814 A | 8/1985 | Itoh et al. |
| 4,568,140 A | 2/1986 | van der Werf et al. |
| 4,571,519 A | 2/1986 | Kawabata et al. |
| 4,705,356 A | 11/1987 | Berning et al. |
| 4,826,734 A | 5/1989 | Jackson et al. |
| 4,851,095 A | 7/1989 | Scobey et al. |
| 4,896,928 A | 1/1990 | Perilloux et al. |
| 4,995,684 A | 2/1991 | Tustison et al. |
| 5,071,206 A | 12/1991 | Hood et al. |
| 5,138,219 A | 8/1992 | Krisl et al. |
| 5,178,911 A | 1/1993 | Gordon et al. |
| 5,234,769 A | 8/1993 | Shevlin |
| 5,268,217 A | 12/1993 | Kimock et al. |
| 5,300,951 A | 4/1994 | Yamazaki |
| 5,332,888 A | 7/1994 | Tausch et al. |
| 5,390,274 A | 2/1995 | Toyoda et al. |
| 5,393,574 A | 2/1995 | Sulzbach |
| 5,478,634 A | 12/1995 | Setoyama et al. |
| 5,503,912 A | 4/1996 | Setoyama et al. |
| 5,508,092 A | 4/1996 | Kimock et al. |
| 5,549,953 A | 8/1996 | Li |
| 5,567,363 A | 10/1996 | Jung et al. |
| 5,597,622 A | 1/1997 | Zoller et al. |
| 5,635,245 A | 6/1997 | Kimock et al. |
| 5,637,353 A | 6/1997 | Kimock et al. |
| 5,643,638 A | 7/1997 | Otto et al. |
| 5,718,773 A | 2/1998 | Shiozaki |
| 5,719,705 A | 2/1998 | Machol |
| 5,766,783 A | 6/1998 | Utsumi et al. |
| 5,772,862 A | 6/1998 | Ando et al. |
| 5,773,148 A | 6/1998 | Charrue et al. |
| 5,846,650 A | 12/1998 | Ko et al. |
| 5,935,716 A | 8/1999 | McCurdy et al. |
| 5,938,898 A | 8/1999 | Ando et al. |
| 6,045,894 A | 4/2000 | Jonza et al. |
| 6,074,730 A | 6/2000 | Laird et al. |
| 6,077,569 A | 6/2000 | Knapp et al. |
| 6,088,166 A | 7/2000 | Lee |
| 6,114,043 A | 9/2000 | Joret |
| 6,129,980 A | 10/2000 | Tsukada et al. |
| 6,132,650 A | 10/2000 | Nakamura |
| 6,165,598 A | 12/2000 | Nelson |
| 6,166,125 A | 12/2000 | Sugiyama et al. |
| 6,172,812 B1 | 1/2001 | Haaland et al. |
| 6,174,599 B1 | 1/2001 | Boire et al. |
| 6,217,272 B1 | 4/2001 | Felsenthal et al. |
| 6,238,781 B1 | 5/2001 | Anderson et al. |
| 6,250,758 B1 | 6/2001 | Yoshihara et al. |
| 6,267,915 B1 | 7/2001 | Park et al. |
| 6,303,225 B1 | 10/2001 | Veerasamy |
| 6,337,771 B1 | 1/2002 | Chu et al. |
| 6,344,288 B1 | 2/2002 | Oyama et al. |
| 6,355,334 B1 | 3/2002 | Rondeau et al. |
| 6,355,344 B1 | 3/2002 | Mamish et al. |
| 6,391,400 B1 | 5/2002 | Russell et al. |
| 6,395,333 B2 | 5/2002 | Veerasamy |
| 6,416,872 B1 | 7/2002 | Maschwitz |
| 6,495,251 B1 | 12/2002 | Arbab et al. |
| 6,503,557 B1 | 1/2003 | Joret |
| 6,524,714 B1 | 2/2003 | Neuman et al. |
| 6,535,333 B1 | 3/2003 | Piepel et al. |
| 6,570,709 B2 | 5/2003 | Katayama et al. |
| 6,572,990 B1 | 6/2003 | Oyama et al. |
| 6,580,512 B1 | 6/2003 | Hussey et al. |
| 6,583,935 B1 | 6/2003 | Saif et al. |
| 6,596,368 B1 | 7/2003 | Liebig et al. |
| 6,605,358 B1 | 8/2003 | Stachowiak |
| 6,652,974 B1 | 11/2003 | Krisko |
| 6,707,610 B1 | 3/2004 | Woodard et al. |
| 6,730,352 B2 | 5/2004 | Stachowiak |
| 6,746,775 B1 | 6/2004 | Boire et al. |
| 6,783,253 B2 | 8/2004 | Thomsen et al. |
| 6,785,468 B2 | 8/2004 | Takasaki et al. |
| 6,813,096 B2 | 11/2004 | Ohta |
| 6,838,179 B1 | 1/2005 | Legrand |
| 6,875,468 B2 | 4/2005 | Kunz et al. |
| 6,908,480 B2 | 6/2005 | Jayaraman |
| 6,924,037 B1 | 8/2005 | Joret et al. |
| 6,950,236 B2 | 9/2005 | Hokazono et al. |
| 6,986,857 B2 | 1/2006 | Klemm et al. |
| 6,998,177 B2 | 2/2006 | Krzyzak et al. |
| 7,005,188 B2 | 2/2006 | Anderson et al. |
| 7,018,727 B2 | 3/2006 | Dzick |
| 7,055,954 B2 | 6/2006 | Marechal |
| 7,156,533 B2 | 1/2007 | Hoeing |
| 7,166,360 B2 | 1/2007 | Coustet et al. |
| 7,189,456 B2 | 3/2007 | King |
| 7,229,684 B2 | 6/2007 | Enniss et al. |
| 7,332,213 B2 | 2/2008 | Mimura et al. |
| 7,351,447 B2 | 4/2008 | Nishida et al. |
| 7,378,146 B1 | 5/2008 | Hedrick et al. |
| 7,381,469 B2 | 6/2008 | Moelle et al. |
| 7,405,005 B2 | 7/2008 | Watanabe |
| 7,426,328 B2 | 9/2008 | Zhou et al. |
| 7,498,058 B2 | 3/2009 | Harris et al. |
| 7,521,123 B2 | 4/2009 | Hattori et al. |
| 7,541,102 B2 | 6/2009 | Klippe et al. |
| 7,569,269 B2 | 8/2009 | Takada et al. |
| 7,643,719 B1 | 1/2010 | Zhou et al. |
| 7,655,298 B2 | 2/2010 | Thies et al. |
| 7,736,728 B2 | 6/2010 | Loboda et al. |
| 7,736,824 B2 | 6/2010 | Yoshikawa et al. |
| 7,910,215 B2 | 3/2011 | Reymond et al. |
| 7,926,939 B2 | 4/2011 | Kato et al. |
| 7,978,402 B2 | 7/2011 | Sweeney et al. |
| 8,062,749 B2 | 11/2011 | Shelestak et al. |
| 8,067,094 B2 | 11/2011 | Benson et al. |
| 8,088,502 B2 | 1/2012 | Martin et al. |
| 8,118,896 B2 | 2/2012 | Can et al. |
| 8,187,671 B2 | 5/2012 | Sol |

(56) References Cited

U.S. PATENT DOCUMENTS

| | | |
|---|---|---|
| 8,236,433 B2 | 8/2012 | Chiu et al. |
| 8,273,801 B2 | 9/2012 | Baikerikar et al. |
| 8,304,078 B2 | 11/2012 | Varshneya |
| 8,312,739 B2 | 11/2012 | Lee et al. |
| 8,360,574 B2 | 1/2013 | Ishak et al. |
| 8,383,214 B2 | 2/2013 | Schaepkens et al. |
| 8,400,592 B2 | 3/2013 | Hirakata et al. |
| 8,409,716 B2 | 4/2013 | Schultz et al. |
| 8,425,035 B2 | 4/2013 | von Blanckenhagen |
| 8,432,611 B1 | 4/2013 | Wach |
| 8,445,112 B2 | 5/2013 | Di Stefano |
| 8,446,673 B2 | 5/2013 | Yoshihara |
| 8,460,804 B2 | 6/2013 | Henn et al. |
| 8,508,703 B2 | 8/2013 | Lee et al. |
| 8,561,429 B2 | 10/2013 | Allan et al. |
| 8,679,631 B2 | 3/2014 | Murata |
| 8,691,351 B2 | 4/2014 | Asakura et al. |
| 8,746,880 B2 | 6/2014 | Fukagawa et al. |
| 8,753,744 B2 | 6/2014 | Borrelli et al. |
| 8,784,933 B2 | 7/2014 | Krzyak et al. |
| 8,840,257 B2 | 9/2014 | Kawagishi et al. |
| 8,842,365 B2 | 9/2014 | Koike et al. |
| 8,854,623 B2 | 10/2014 | Fontaine et al. |
| 9,023,457 B2 | 5/2015 | Carrilero et al. |
| 9,041,885 B2 | 5/2015 | Weber et al. |
| 9,042,019 B2 | 5/2015 | Su et al. |
| 9,079,802 B2 | 7/2015 | Bellman et al. |
| 9,110,230 B2 | 8/2015 | Koch, III et al. |
| 9,249,049 B2 | 2/2016 | Fujii |
| 9,296,648 B2 | 3/2016 | Henn et al. |
| 9,335,444 B2 | 5/2016 | Hart et al. |
| 9,359,261 B2 | 6/2016 | Bellman et al. |
| 9,366,784 B2 | 6/2016 | Bellman et al. |
| 9,411,180 B2 | 8/2016 | Gollier et al. |
| 9,573,842 B2 | 2/2017 | Gollier et al. |
| 9,574,262 B2 | 2/2017 | Henn et al. |
| 9,663,400 B2 | 5/2017 | O'Malley et al. |
| 9,684,097 B2 | 6/2017 | Koch, III et al. |
| 9,701,579 B2 | 7/2017 | Gollier et al. |
| 9,726,786 B2 | 8/2017 | Hart et al. |
| 9,790,593 B2 | 10/2017 | Adib et al. |
| 9,957,609 B2 | 5/2018 | Lee et al. |
| 10,444,408 B2 * | 10/2019 | Bellman ............ C03C 17/3435 |
| 2001/0002295 A1 | 5/2001 | Anderson et al. |
| 2001/0016262 A1 | 8/2001 | Toyoshima et al. |
| 2001/0017452 A1 | 8/2001 | Bernard |
| 2001/0031365 A1 | 10/2001 | Anderson et al. |
| 2002/0009593 A1 | 1/2002 | Veerasamy |
| 2002/0017452 A1 | 2/2002 | Zimmermann et al. |
| 2002/0051274 A1 | 5/2002 | Kim et al. |
| 2002/0051294 A1 | 5/2002 | Katayama et al. |
| 2002/0136908 A1 | 9/2002 | Komatsu et al. |
| 2003/0019363 A1 | 1/2003 | Grover et al. |
| 2003/0031879 A1 | 2/2003 | Neuman et al. |
| 2003/0035044 A1 | 2/2003 | Nakayama et al. |
| 2003/0044652 A1 | 3/2003 | Wang |
| 2003/0116270 A1 | 6/2003 | Hawa et al. |
| 2003/0179454 A1 | 9/2003 | Thomsen et al. |
| 2003/0193636 A1 | 10/2003 | Allen et al. |
| 2004/0004778 A1 | 1/2004 | Liu et al. |
| 2004/0005482 A1 | 1/2004 | Kobayashi et al. |
| 2004/0065968 A1 | 4/2004 | Klemm et al. |
| 2004/0147185 A1 | 7/2004 | Decroupet |
| 2004/0258947 A1 | 12/2004 | Moelle et al. |
| 2005/0008863 A1 | 1/2005 | Mimura et al. |
| 2005/0012569 A1 | 1/2005 | Sasaki |
| 2005/0074591 A1 | 4/2005 | Zagdoun |
| 2005/0084705 A1 | 4/2005 | Klippe et al. |
| 2005/0123772 A1 | 6/2005 | Coustet et al. |
| 2005/0196632 A1 | 9/2005 | Maschwitz et al. |
| 2005/0233091 A1 | 10/2005 | Kumar et al. |
| 2005/0263775 A1 | 12/2005 | Ikeda et al. |
| 2006/0008656 A1 | 1/2006 | Veerasamy |
| 2006/0017707 A1 | 1/2006 | Fukui et al. |
| 2006/0019119 A1 | 1/2006 | Spitsberg et al. |
| 2006/0093833 A1 | 5/2006 | Meyer et al. |
| 2006/0115651 A1 | 6/2006 | Merfeld et al. |
| 2006/0134436 A1 | 6/2006 | Maschwitz |
| 2006/0139783 A1 | 6/2006 | Decroupet |
| 2006/0154044 A1 | 7/2006 | Yamada et al. |
| 2006/0165963 A1 | 7/2006 | Fleury et al. |
| 2006/0197096 A1 | 9/2006 | Kerdiles et al. |
| 2006/0222863 A1 | 10/2006 | Nadaud et al. |
| 2006/0240266 A1 | 10/2006 | Schicht et al. |
| 2007/0018671 A1 | 1/2007 | Steck |
| 2007/0018871 A1 | 1/2007 | Riley |
| 2007/0030569 A1 | 2/2007 | Lu et al. |
| 2007/0063147 A1 | 3/2007 | Yamazaki et al. |
| 2007/0097509 A1 | 5/2007 | Nevitt et al. |
| 2007/0128528 A1 | 6/2007 | Hess et al. |
| 2007/0146887 A1 | 6/2007 | Ikeda et al. |
| 2007/0188871 A1 | 8/2007 | Fleury et al. |
| 2007/0237918 A1 | 10/2007 | Jonza et al. |
| 2007/0247567 A1 | 10/2007 | Sato et al. |
| 2007/0285776 A1 | 12/2007 | Nakamura et al. |
| 2008/0024867 A1 | 1/2008 | Kawashima et al. |
| 2008/0032157 A1 | 2/2008 | Koekert et al. |
| 2009/0017314 A1 | 1/2009 | Nadaud et al. |
| 2009/0023254 A1 | 1/2009 | Lim et al. |
| 2009/0040440 A1 | 2/2009 | Park |
| 2009/0052041 A1 | 2/2009 | Watanabe et al. |
| 2009/0086778 A1 | 4/2009 | Kameyama et al. |
| 2009/0086783 A1 | 4/2009 | Kameyama et al. |
| 2009/0104385 A1 | 4/2009 | Reymond et al. |
| 2009/0109537 A1 | 4/2009 | Bright et al. |
| 2009/0141357 A1 | 6/2009 | Kamura et al. |
| 2009/0155490 A1 | 6/2009 | Bicker et al. |
| 2009/0195865 A1 | 8/2009 | Kleideiter et al. |
| 2009/0197048 A1 | 8/2009 | Amin et al. |
| 2009/0217968 A1 | 9/2009 | Joshi et al. |
| 2009/0223437 A1 | 9/2009 | Ballard |
| 2009/0297877 A1 | 12/2009 | Chang et al. |
| 2009/0298669 A1 | 12/2009 | Akiba et al. |
| 2009/0324844 A1 | 12/2009 | Haoto et al. |
| 2010/0009154 A1 | 1/2010 | Allan et al. |
| 2010/0027383 A1 | 2/2010 | Suzuki et al. |
| 2010/0028607 A1 | 2/2010 | Lee et al. |
| 2010/0047521 A1 | 2/2010 | Amin et al. |
| 2010/0060979 A1 * | 3/2010 | Harris ................ G02B 1/115 359/359 |
| 2010/0062245 A1 | 3/2010 | Martin et al. |
| 2010/0119486 A1 | 5/2010 | Sakamoto et al. |
| 2010/0127154 A1 | 5/2010 | Kameyama |
| 2010/0177380 A1 | 7/2010 | Nagahama et al. |
| 2010/0183857 A1 | 7/2010 | Nouvelot et al. |
| 2010/0196685 A1 | 8/2010 | Murata et al. |
| 2010/0215950 A1 | 8/2010 | Schultz et al. |
| 2010/0247745 A1 | 9/2010 | Rudmann et al. |
| 2010/0291353 A1 | 11/2010 | Dejneka et al. |
| 2010/0304090 A1 | 12/2010 | Henn et al. |
| 2010/0311868 A1 | 12/2010 | Bekiarian et al. |
| 2010/0313875 A1 | 12/2010 | Kennedy |
| 2010/0330350 A1 | 12/2010 | Osada et al. |
| 2011/0033635 A1 | 2/2011 | Nishimoto et al. |
| 2011/0033681 A1 | 2/2011 | Adachi et al. |
| 2011/0043719 A1 | 2/2011 | Thunhorst et al. |
| 2011/0114160 A1 | 5/2011 | Murashige et al. |
| 2011/0120554 A1 | 5/2011 | Chhajed et al. |
| 2011/0129287 A1 | 6/2011 | Lecoutre |
| 2011/0151173 A1 | 6/2011 | Ramadas et al. |
| 2011/0157703 A1 | 6/2011 | Broadway et al. |
| 2011/0177241 A1 | 7/2011 | Lee et al. |
| 2011/0235181 A1 | 9/2011 | Hayashibe et al. |
| 2011/0262742 A1 | 10/2011 | Takeuchi et al. |
| 2011/0262752 A1 | 10/2011 | Bawendi et al. |
| 2011/0262754 A1 | 10/2011 | Zehentmaier et al. |
| 2011/0290982 A1 | 12/2011 | Boutami et al. |
| 2011/0297979 A1 | 12/2011 | Diana et al. |
| 2012/0008217 A1 | 1/2012 | Ishak et al. |
| 2012/0027968 A1 | 2/2012 | Chang et al. |
| 2012/0040179 A1 | 2/2012 | Dave |
| 2012/0052271 A1 | 3/2012 | Gomez et al. |
| 2012/0099188 A1 | 4/2012 | Akozbek et al. |
| 2012/0099323 A1 | 4/2012 | Thompson |

(56) References Cited

U.S. PATENT DOCUMENTS

| | | |
|---|---|---|
| 2012/0107607 A1 | 5/2012 | Takaki et al. |
| 2012/0135153 A1 | 5/2012 | Osakabe et al. |
| 2012/0154921 A1 | 6/2012 | Yoshida et al. |
| 2012/0196103 A1 | 8/2012 | Murashige et al. |
| 2012/0212826 A1 | 8/2012 | Henn et al. |
| 2012/0219792 A1 | 8/2012 | Yamamoto et al. |
| 2012/0228641 A1 | 9/2012 | Thoumazet et al. |
| 2012/0235399 A1 | 9/2012 | Lochbihler |
| 2012/0247152 A1 | 10/2012 | Ohara et al. |
| 2012/0250314 A1 | 10/2012 | Maikowski et al. |
| 2012/0268809 A1 | 10/2012 | Guo et al. |
| 2012/0281292 A1 | 11/2012 | Baca et al. |
| 2012/0301676 A1 | 11/2012 | Ushida et al. |
| 2012/0321898 A1 | 12/2012 | Meinhardt et al. |
| 2012/0327568 A1 | 12/2012 | Shedletsky et al. |
| 2013/0013574 A1 | 1/2013 | Wu |
| 2013/0021669 A1 | 1/2013 | Xi et al. |
| 2013/0022798 A1 | 1/2013 | Fukawa et al. |
| 2013/0029118 A1 | 1/2013 | Kishi et al. |
| 2013/0057950 A1 | 3/2013 | Lin et al. |
| 2013/0059137 A1 | 3/2013 | Hevesi et al. |
| 2013/0120842 A1 | 5/2013 | Moens et al. |
| 2013/0128342 A1 | 5/2013 | Mitarai et al. |
| 2013/0135742 A1 | 5/2013 | Fukagawa et al. |
| 2013/0135750 A1 | 5/2013 | Walker et al. |
| 2013/0170044 A1 | 7/2013 | Mont et al. |
| 2013/0176615 A1 | 7/2013 | Uefuji et al. |
| 2013/0177751 A1 | 7/2013 | Oh et al. |
| 2013/0183489 A1 | 7/2013 | Cremer et al. |
| 2013/0187185 A1 | 7/2013 | Deshazer et al. |
| 2013/0189184 A1 | 7/2013 | Lub et al. |
| 2013/0209762 A1 | 8/2013 | Damm et al. |
| 2013/0260115 A1 | 10/2013 | Suzuki et al. |
| 2013/0263784 A1 | 10/2013 | Lee et al. |
| 2013/0271836 A1 | 10/2013 | Fukaya et al. |
| 2013/0322270 A1 | 12/2013 | Ko |
| 2013/0334031 A1 | 12/2013 | Lee et al. |
| 2014/0022630 A1 | 1/2014 | Reymond et al. |
| 2014/0036175 A1 | 2/2014 | Morishima et al. |
| 2014/0049827 A1 | 2/2014 | Fujii et al. |
| 2014/0087101 A1 | 3/2014 | Tixhon et al. |
| 2014/0090864 A1 | 4/2014 | Paulson |
| 2014/0090974 A1 | 4/2014 | Ballet et al. |
| 2014/0091419 A1 | 4/2014 | Hasegawa et al. |
| 2014/0093711 A1 | 4/2014 | Paulson |
| 2014/0106141 A1 | 4/2014 | Bellman et al. |
| 2014/0106146 A1 | 4/2014 | Decker et al. |
| 2014/0106150 A1 | 4/2014 | Decker et al. |
| 2014/0111859 A1 | 4/2014 | Duraes et al. |
| 2014/0113083 A1 | 4/2014 | Lee et al. |
| 2014/0113120 A1 | 4/2014 | Thiel |
| 2014/0139978 A1 | 5/2014 | Kwong |
| 2014/0170765 A1 | 6/2014 | Ockenfuss |
| 2014/0174532 A1 | 6/2014 | Stewart et al. |
| 2014/0186615 A1 | 7/2014 | An et al. |
| 2014/0220327 A1 | 8/2014 | Adib et al. |
| 2014/0226208 A1 | 8/2014 | Vikor |
| 2014/0233104 A1 | 8/2014 | Nagahama et al. |
| 2014/0233106 A1 | 8/2014 | Vergoehl et al. |
| 2014/0247415 A1 | 9/2014 | Kleptsyn |
| 2014/0255616 A1 | 9/2014 | Paulson |
| 2014/0261615 A1 | 9/2014 | Nair et al. |
| 2014/0264321 A1 | 9/2014 | Liang et al. |
| 2014/0295330 A1 | 10/2014 | Pruneri et al. |
| 2014/0320806 A1 | 10/2014 | Cohen-Tannoudji et al. |
| 2014/0334006 A1 | 11/2014 | Adib et al. |
| 2014/0335330 A1 | 11/2014 | Bellman et al. |
| 2014/0347722 A1 | 11/2014 | Hevesi |
| 2014/0353618 A1 | 12/2014 | Shim et al. |
| 2014/0362444 A1 | 12/2014 | Paulson |
| 2014/0368029 A1 | 12/2014 | Park |
| 2014/0370264 A1 | 12/2014 | Ohara et al. |
| 2014/0376094 A1 | 12/2014 | Bellman et al. |
| 2014/0377522 A1 | 12/2014 | Koch, III et al. |
| 2015/0002809 A1 | 1/2015 | Cohen-Tannoudji et al. |
| 2015/0037554 A1 | 2/2015 | Gao et al. |
| 2015/0043058 A1 | 2/2015 | Saito |
| 2015/0062695 A1 | 3/2015 | Chu et al. |
| 2015/0062710 A1 | 3/2015 | Grillmayer et al. |
| 2015/0079398 A1 | 3/2015 | Amin et al. |
| 2015/0083464 A1 | 3/2015 | Zilbauer et al. |
| 2015/0116832 A1 | 4/2015 | Kamiuto et al. |
| 2015/0212245 A1 | 7/2015 | Ueda |
| 2015/0219798 A1 | 8/2015 | Sonoda et al. |
| 2015/0260888 A1 | 9/2015 | Yoshihara et al. |
| 2015/0284840 A1 | 10/2015 | Henn et al. |
| 2015/0293284 A1 | 10/2015 | Tatemura |
| 2015/0322270 A1 | 11/2015 | Amin et al. |
| 2015/0323705 A1 | 11/2015 | Hart et al. |
| 2015/0346403 A1 | 12/2015 | Jidai et al. |
| 2015/0355382 A1 | 12/2015 | Henn et al. |
| 2015/0376057 A1 | 12/2015 | Koch, III et al. |
| 2016/0011348 A1 | 1/2016 | Hirakoso et al. |
| 2016/0018576 A1 | 1/2016 | Yamamoto et al. |
| 2016/0076135 A1 | 3/2016 | Cheah et al. |
| 2016/0083835 A1 | 3/2016 | Adib et al. |
| 2016/0372532 A1 | 12/2016 | Song et al. |
| 2017/0075039 A1 | 3/2017 | Hart et al. |
| 2017/0087144 A1 | 3/2017 | Rowe et al. |
| 2017/0184762 A1 | 6/2017 | Fujii et al. |
| 2017/0199307 A1 | 7/2017 | Hart et al. |
| 2017/0317217 A1 | 11/2017 | Ito et al. |
| 2017/0355172 A1 | 12/2017 | Paulson |
| 2019/0077352 A1 | 3/2019 | Bhatia et al. |

FOREIGN PATENT DOCUMENTS

| | | |
|---|---|---|
| CA | 2141536 A1 | 2/1994 |
| CN | 1134555 A | 10/1996 |
| CN | 1423682 A | 6/2003 |
| CN | 1575970 A | 2/2005 |
| CN | 101019043 A | 8/2007 |
| CN | 100360449 C | 1/2008 |
| CN | 101236264 A | 8/2008 |
| CN | 101295030 A | 10/2008 |
| CN | 101349769 A | 1/2009 |
| CN | 101356455 A | 1/2009 |
| CN | 101400619 A | 4/2009 |
| CN | 101724812 A | 6/2010 |
| CN | 101734867 A | 6/2010 |
| CN | 101809512 A | 8/2010 |
| CN | 102278833 A | 12/2011 |
| CN | 102681042 A | 9/2012 |
| CN | 102736136 A | 10/2012 |
| CN | 202661651 U | 1/2013 |
| CN | 102934010 A | 2/2013 |
| CN | 102967947 A | 3/2013 |
| CN | 103073196 A | 5/2013 |
| CN | 103395247 A | 11/2013 |
| CN | 103499852 A | 1/2014 |
| CN | 103508678 A | 1/2014 |
| CN | 103707578 A | 4/2014 |
| CN | 104040016 A | 9/2014 |
| CN | 104422971 A | 3/2015 |
| CN | 104553126 A | 4/2015 |
| CN | 105142900 A | 12/2015 |
| CN | 105593705 A | 5/2016 |
| CN | 105764866 A | 7/2016 |
| CN | 105848883 A | 8/2016 |
| CN | 106604900 A | 4/2017 |
| CN | 107076874 A | 8/2017 |
| CN | 107735697 A | 2/2018 |
| DE | 102014104798 A1 | 10/2015 |
| DE | 102015114877 A1 | 3/2017 |
| EP | 566271 A2 | 10/1993 |
| EP | 592986 A1 | 4/1994 |
| EP | 1289898 A1 | 3/2003 |
| EP | 1490715 A2 | 12/2004 |
| EP | 2328818 B1 | 12/2012 |
| EP | 2628818 A1 | 8/2013 |
| EP | 2711744 A1 | 3/2014 |
| GB | 1517585 A | 7/1978 |
| JP | 63238260 A | 10/1988 |
| JP | 04250834 A | 9/1992 |

(56) References Cited

FOREIGN PATENT DOCUMENTS

| | | | |
|---|---|---|---|
| JP | 07035267 A | 2/1995 |
| JP | 09068602 A | 3/1997 |
| JP | 10-000009 A | 1/1998 |
| JP | 2974879 B2 | 11/1999 |
| JP | 11311702 A | 11/1999 |
| JP | 2000171601 A | 6/2000 |
| JP | 2000171605 A | 6/2000 |
| JP | 2000214302 A | 8/2000 |
| JP | 2001-511539 A | 8/2001 |
| JP | 2001303246 A | 10/2001 |
| JP | 2002-116303 A | 4/2002 |
| JP | 2002174810 A | 6/2002 |
| JP | 2002-267835 A | 9/2002 |
| JP | 2003131011 A | 5/2003 |
| JP | 2003236970 A | 8/2003 |
| JP | 2003-266607 A | 9/2003 |
| JP | 2003285343 A | 10/2003 |
| JP | 2004138662 A | 5/2004 |
| JP | 2004-163549 A | 6/2004 |
| JP | 2005114649 A | 4/2005 |
| JP | 2005219223 A | 8/2005 |
| JP | 2005274527 A | 10/2005 |
| JP | 2006-079067 A | 3/2006 |
| JP | 2006-116754 A | 5/2006 |
| JP | 2006208726 A | 8/2006 |
| JP | 2007099557 A | 4/2007 |
| JP | 2007156017 A | 6/2007 |
| JP | 2007527328 A | 9/2007 |
| JP | 2007271958 A | 10/2007 |
| JP | 2008033348 A | 2/2008 |
| JP | 2008-133535 A | 6/2008 |
| JP | 2008-242425 A | 10/2008 |
| JP | 4250834 B2 | 4/2009 |
| JP | 2009109850 A | 5/2009 |
| JP | 2009116218 A | 5/2009 |
| JP | 2009116219 A | 5/2009 |
| JP | 2009116220 A | 5/2009 |
| JP | 2009-529715 A | 8/2009 |
| JP | 2009199022 A | 9/2009 |
| JP | 2009204506 A | 9/2009 |
| JP | 2009265601 A | 11/2009 |
| JP | 2010-037115 A | 2/2010 |
| JP | 04421142 B2 | 2/2010 |
| JP | 2010202514 A | 9/2010 |
| JP | 04612827 B2 | 1/2011 |
| JP | 2011017782 A | 1/2011 |
| JP | 2011057547 A | 3/2011 |
| JP | 2011093728 A | 5/2011 |
| JP | 04707656 B2 | 6/2011 |
| JP | 2011133800 A | 7/2011 |
| JP | 2011134464 A | 7/2011 |
| JP | 2011-150821 A | 8/2011 |
| JP | 04765069 B2 | 9/2011 |
| JP | 04790396 B2 | 10/2011 |
| JP | 2011-237789 A | 11/2011 |
| JP | 2012171866 A | 9/2012 |
| JP | 2012-194546 A | 10/2012 |
| JP | 2012-203187 A | 10/2012 |
| JP | 2012189760 A | 10/2012 |
| JP | 2012230290 A | 11/2012 |
| JP | 2013025318 A | 2/2013 |
| JP | 2013097356 A | 5/2013 |
| JP | 2013122516 A | 6/2013 |
| JP | 2013142817 A | 7/2013 |
| JP | 2013-224964 A | 10/2013 |
| JP | 2013205634 A | 10/2013 |
| JP | 2013-258209 A | 12/2013 |
| JP | 2013252992 A | 12/2013 |
| JP | 2014056215 A | 3/2014 |
| JP | 2014-081522 A | 5/2014 |
| JP | 2014194530 A | 10/2014 |
| JP | 2015-058606 A | 3/2015 |
| JP | 2015058605 A | 3/2015 |
| JP | 2018-010275 A | 1/2018 |
| KR | 1103041 B1 | 1/2012 |
| KR | 1194257 B1 | 10/2012 |
| KR | 2013031689 A | 3/2013 |
| KR | 2014034172 A | 3/2014 |
| TW | 200600824 A | 1/2006 |
| TW | 201815720 A | 5/2018 |
| WO | 1997013003 A2 | 4/1997 |
| WO | 1998037254 A2 | 8/1998 |
| WO | 0037384 A1 | 6/2000 |
| WO | 02/42834 A2 | 5/2002 |
| WO | 0242843 A2 | 5/2002 |
| WO | 2006099765 A1 | 9/2006 |
| WO | 2008108332 A1 | 9/2008 |
| WO | 2009/041528 A1 | 4/2009 |
| WO | 2012/043341 A1 | 4/2012 |
| WO | 2012144499 A1 | 10/2012 |
| WO | 2012/157719 A1 | 11/2012 |
| WO | 2013088856 A1 | 6/2013 |
| WO | 2013098641 A2 | 7/2013 |
| WO | 2013160233 A1 | 10/2013 |
| WO | 2014/041257 A1 | 3/2014 |
| WO | 2014167293 A1 | 10/2014 |
| WO | 2014/182693 A1 | 11/2014 |
| WO | 2014182639 A1 | 11/2014 |
| WO | 2015/000534 A1 | 1/2015 |
| WO | 2015009377 A1 | 1/2015 |
| WO | 2015031428 A2 | 3/2015 |
| WO | 2015041257 A1 | 3/2015 |
| WO | 2015/070254 A1 | 5/2015 |
| WO | 2015076914 A1 | 5/2015 |
| WO | 2015085283 A1 | 6/2015 |
| WO | 2015142837 A1 | 9/2015 |
| WO | 2015179739 A1 | 11/2015 |
| WO | 2016118462 A2 | 7/2016 |

OTHER PUBLICATIONS

Reinhold et al; "Plasma Nitriding of Aluminum Alloys." Proceedings of the 1st International Automotive Heat Treating Conference. Jul. 13-15, 1998.

Ruddell et al; "The Effect of Deposition Parameters On the Properties of Yttria-Stabilzed Zirconia Thin Films"; Thin Solid Films, 445 (2003) pp. 14-19.

Savage "Preparation and properties of hard crystalline materials for optical applications a review." Journal of Crystal Growth 113 (1991) 698-715.

Schroter et al; "X-ray photoelectron diffraction on SiC and AlN epitaxial films: polytype structure and polarity." Elsevier, Journal of Electron Spectroscopy and Related Phenomena. 114-116 (2001) 443-450.

Singh et al; "Structural and optical properties of RF magnetron sputtered aluminium nitride films without external substrate heating." Elsevier, Applied Surface Sceince 257 (2011) 9568-9573.

Sixth Edition, Pearson Prentice Hall, New Jersey, 2005, pp. 404-418.

Smart and Moore; "Solid State Chemistry, an Introduction," Chapman & Hall University and Professional Division, London, 1992, pp. 136-151.

Sonderby et al; "Deposition of Yttria-Stabilized Zirconia Thin Films By High Power Impulse Magnetron Sputtering and Pulsed Magnetron Sputtering"; Surface & Coatings Technology; 240; (2014) pp. 1-6.

Southwell, "Coating design using very thin high- and low-index layers," Applied Optics, vol. 24, Issue 4, pp. 457 (1985.

PCT/US2015/043161 Search Report dated Dec. 3, 2015.

Sun et al; "DLC protective layers for touch screen panels"; National Research Center for Glass Processing and State Key Laboratory for Green Building Materials, China Academy of Building Materials; Beijing CN, SVC2013, Rhode Island Apr. 23-24, 2013.

Tsui, et al., "Effects of Adhesion on the Measurement of Thin Film Mechanical Properties by Nanoindentation." Mat. Res. Soc. Symp. Proc. vol. 473 1997.

Urushidani et al; "Etalon-Type Optical Filters, Their Modules, Spectrometers, and Optical Devices." Jpn. Kokai Tokkyo Koho, 2012.

(56) References Cited

OTHER PUBLICATIONS

Urushidani et al; "Optical Filters Including Optical Films Covered with Thickness-Controlled Dielectric Films, and Optical Filter Modules, Spectrometers and Optical Apparatus Containing Them." 2012.
Wang et al. "Tribological and optical properties of crystalline and amorphous alumina thin films grown by low temperature reactive magnetron sputter-deposition", Surface and coatings technology, pp. 146-147 (2001) p. 189-194.
Wang et al; "Roughness Improvement and Hardness Enhancement in Nanoscale Al/AlN Multilayered Thin Films." Applied Physics Letters vol. 71, No. 14, 1951-1953, Oct. 6, 1997.
Wang et al; "Study of ALON and CRON films deposited by arc ion plating as diffusion barriers." Jinshu Xuebao (2004), 40, 1, 83-87.
Wang et al; "Toward Hard yet Tough Ceramic Coatings"; Surface & Coatings Technology 258 (2014) pp. 1-16.
Watanabe et al; "Surface Oxidation of Aluminum Nitride Thin Films." Surface Modification Technologies XIII, Edited by Sudarshan, Khor, Jeandin, ASM International, Materials Park, Ohio, 1999. pp. 209-215.
Wen et al. "The AlN layer thickness dependent coherent epitaxial growth, stress and hardness in NbN/AlN nanostructured multi-layer films." Surface and Coatings Technology 235 (2013) 367-375.
Xi et al; "The Preparation and Optical properties of AlN Thin Films." Diwen Wuli Xuebao (2012), 34)6), 467-470.
Yamamoto et al; "Manufacture of IR-Reflecting Bent Plate Glass." Jpn. Kokai Tokkyo Koho, 1988.
Yamashita et al; "Preparation and Properties of AlON—SiAlON Composites." Journal of the Ceramic Society of Japan 109, pp. 434-439, 2001.
Yan et al; "The Preparation and Properties of Y2O3/AlN Anti-Reflection Films on Chemical Vapor Deposition Diamond." Elsevier, Thin Solid Films, 520, pp. 734-738, 2011.
Yang et al; "Preparation and Properties of AlN Thin Films by Pure Nitrogen Reactive Sputtering." Rengong Jingti Xuebao, 39 (1), pp. 190-196, 2010.
Yang et al; "Preparation and Properties of C-Axis Preferred Orientation AlN Thin Films by Pure Nitrogen Reactive Sputtering." Xianjiang Daxue Xuebao, Ziran Kexueban, 26 (4), pp. 444-449, 2009.
Yun et al . . . "Optical and Structural Investigation of AlN Grown on Sapphire with Reactive MBE Using RF Nitrogen or Ammonia." Mat. Res. Soc. Symp. Proc., vol. 764, 2003.
Zabinski et al "Stoichiometry and characterization of aluminium oxynitride thin films grown by ion-beam assisted pulsed laser deposition." Elsevier, Thin Solid Films, 516, pp. 6215-6219, 2008.
Zayats et al; "Optical Studies of AlN/n-Si(100) Films Obtained by the Method of High-Frequency Magnetron Sputtering.".
PCT Search report (PCT/US14/55281).
PCT Search report/Written Opinion from (PCT/US14/36872).
PCT Search report/Written Opinion (PCT/US14/36090).
Shackelford, "Introduction To Materials Science for Engineers," Sixth Edition, Pearson Prentice Hall, New Jersey, 2005, pp. 404-418.
Pantano et al "Al2O3 Coating by Atomic Layer Deposition (ALD) on various glass substrates for Surface Strength Improvement".
Gpi: http://generalplasma.com/products/large-area-pecvd/.
Corning, Corning Gorilla Glass for Large Cover Glass Applications, 2013, 3 Pgs.
Chinese First Office Action CN201480037881.2 dated Aug. 3, 2016.
Chinese First Office Action CN20140038909.4 dated Aug. 3, 2016.
Liaoning Provincial Popular Science Writers Association, "High Technology Around Your Life", Popular Science Press, p. 217, Oct. 1992 (English Translation Attached).
Afanasyev-Charkin et al; "Hard Si—N—C films with a tunable band gap produced by pulsed glow discharge deposition" ; Surface & Coatings Technology; 199 (2005) 38-42.
Aissa et al; "Comparison of the structural properties and residual stress of AlN films deposited by dc magnetron sputtering and high power impulse magnetron sputtering at different working pressures." Elsevier, Thin Solid Films, 550 (2014) 264-267.
Assouar et al; "Study of Acoustical and Optical Properties of AlN Films for SAW and BAW Devices: Correlation Between These Properties." Integrated Ferroelectrics, 82: 45-54, 2006.
Baek et al; "Correlations between optical properties, microstructure, and processing conditions of Aluminum nitride thin films fabricated by pulsed laser deposition." Elsevier, Thin Solid Films 515 (2007) 7096-7104.
Bitterlich et al; "Particle-reinforced SiAlONs for Cutting Tools." Materials Science Forum vol. 554 (2007) pp. 129-134.
Boichot et al; "Epitaxial growth of AlN on c-plane sapphire by High Temperature Hydride Vapor Phase Epitaxy: Inclence of the gas phase N/Al ratio and low temperature protective layer." Elsevier, Surface & Coatings Technology 237 (2013) 118-125.
Borges et al; . "Optical Properties of AlNxOy Thin Films Deposited by DC Magnetron Sputtering." Proceedings of SPIE, 2011.
Caceres and Prieto, "Mechanical properties of sputtered silicon notride thin films", Journal of Applied Physics 94 (12) 2003, pp. 7868-7873.
Caliendo et al; "Structural, optical, and acoustic characterization of high-quality AlN thick films sputtered on Al2O3 (001) at temperature for GHz band electroacoustic devices applications." Journal of Applied Physics 96, No. 5, 2610 (2004).
Carniero et al. "Hardness Evaluation of Nanolayered PVD Coatings Using Nanoindentation", Rev. Adv. Mater. Sci., 2014 p. 83-90.
Chan et al; "Fracture Toughness Improvements of Dental Ceramic Through Use of Yttria-Stabilized Zirconia (YSZ) Thin-Film Coating" ; Dental Materials, 29 (2013) pp. 881-887.
Chang et al; "Characteristics of Si—C—N films deposited by microwave plasma CVD on Si wafers with various buffer layer materials" Diamond and Related Materials; 10 (2001) 1910-1915.
Xu et al; "Chemical control of physical properties in silicon nitride films"; Appl Phys A (20163) 111: 867-876.
Chen et al; "Optical Reflectance of Bulk AlN Crystals and AlN Epitaxial Films." AIP Conference Proceedings, 772, 297-298, 2005.
Chen et al; "Thickness-dependent structural transformation in the AlN film." Elsevier, Acta Materialia 53 (2005) 5223-5227.
Chi et al; "Cracking in coating-substrate composites with multi-layered and FGM coatings." Engineering Fracture Mechanics, vol. 70, 1227-1243, 2003.
Corbin, Aluminum Oxynitride Spinel (ALON): A Review, Jul. 1987. Journal of the European Ceramic Society vol. 5, Issue 3, 1989, pp. 143-154.
Corning, Corning Eagle XG AMLCD Glass Substrates Material Information, MIE 301, Issued Jan. 2006, 3 Pgs.
Corning, Corning EAGLE2000 Glass, Materials Information, Revised Aug. 2000, 5 Pgs.
Danylyuk, et al . . . "Optical and Electrical Properties of Al 1-x InxN Films Grown on Sapphire (0001) by Plasma Source Molecular Beam Epitaxy." Mat. Res. Soc. Symp., vol. 639, 2001.
Easwarakhanthan et al; "Spectroellipsometric investigation of optical, morphological, and structural properties of reactively sputtered polycrystalline AlN films." J. Vac. Sci. Technology A 28 (3), pp. 495-501, May/Jun. 2010.
English Translation of JP2016512997 First Office Action dated Jul. 5, 2016; 6 Pages; Japanese Patent Office.
Fischer-Cripps; "Critical Review of Analysis and Interpretation of Nanoindentation Test Data"; Surface & Coatings Technology 200 (2006) pp. 4153-4165.
Gazda et al; "Formation of ALN films on Ti/TiN Arc-Layer Interface with Al-0.5% Cu Interconects evaluated by XPS and Energy-filtered-TEM." Mat. Res. Soc. Symp. Proc. vol. 589, 365-370, 2001.
Godeker et al., "Antireflection coating for sapphire with consideratino of mechanical properties", Surface & Coatings Technology, 241 (2014) 59-63.
Goldman et al., "Scale Up of Large ALON Windows", Window and Dome Technologies and Materials XIII, edited by Randal W. Tustison, Brian J. Zelinski,Proc. of SPIE vol. 8708, 870804 (Jun. 4, 2013) (See Copy.
Hajakbari et al; "Optical Properties of Amorphous AlN Thin Films on Glass and Silicon Substrates Grown by Single Ion Beam Sputtering." Jpn. J. Appl. Phys. 49, 095802 (2010.

(56) References Cited

OTHER PUBLICATIONS

Harding et al; "Cracking During Indentation and Its Use in the Measurement of Fracture Toughness"; Mat. Res. Soc. Symp. Proc.; Vo . . . 356, 1995, pp. 663-668.

Hay et al.; "Continuous Stiffness Measurement During Instrumented Indentation Testing" ; Experimental Techniques; May/Jun. 2010; pp. 86-94.

Hirai et al; "Formation of Aluminum Nitride by Carbothermic Reduction of Alumina in a Flowing Nitrogen Atmosphere." Nippon Kinzoku Gakkaishi (1989, 53 (10), 1035-40.

Hu et al.; "Dynamic Fracturing of Strengthened Glass Under Biaxial Tensile Loading" ; Journal of Non-Crystalline Solids; 405 (2014); pp. 153-158.

Huang et al; "Effect of deposition conditions on mechanical properties of low-temperature PECVD silicon nitride films" ; Materials Science and Engineering A 435-436 (2006) 453-459.

Huang et al; "Effects of Substrate Temperature on Aluminum Nitride Films by Reactive Magnetron Sputtering." Xiyou Jinshu, 35 (5), pp. 715-718, 2011.

Inkin et al; "Properties of aluminium nitride coating obtained by vacuum arc discharge method with plasma flow separation." Elsevier, Diamond and Related Materials, 10 (2001) 1314-1316.

International Search Report and Written Opinion PCT/US2016/051488 dated Nov. 21, 2016.

Ishiguro et al "Solar Light Absorption Property of Sputtered Al—N Films with Enhanced Surface Roughness during Film Growth." Jpn. J. Appl. Phys. vol. 41 (2002) pp. 292-300.

Kittel, "Introduction To Solid State Physics." Seventh Edition, John Wiley & Sons, Inc., NY, 1996, pp. 611-627.

Krupitskaya et al; "Optical Characatization of AlN Films Grown by Plasma Source Molecular Beam Epitaxy." Journal of Applied Physices 84, 2861-2865, 1998.

Li et al, "Low-temperature magnetron sputter deposition, hardness and electrical resistivity of amorphous and crystalline alumina thin films" Journal of Vacuum Science & Technology A 18, 2333 (2000). (See copy.

Madocks et al Durable Neutral Color Anti-Reflective Coating for Mobile Displays; SVC Bulletin Fall 2014 3 pages.

Mania "Magnetron Sputtering for Deposition of Aluminum Nitride Thin Films." Prace Komisji Nauk Ceramiczynych, 54, 429-433, 1997.

Martinet er al; "Deposition of SiO2 and TiO2 thin films by plasma enhanced chemical vapors deposition for antireflection coating", J. Non-Crystalline Solids; 216 (1997) 77-82.

McCauley, et al, "AlON: A brief history of its emergence and evolution." Journal of the European Ceramic Society 29 (2009), 223-236. (See Copy.

Miao et al; "Optical Properties and Reactive Sputtering Conditions of AlN and AlSiN Thin Films for Magneto-Optical Applications." Journal of Electronic Materials, vol. 26, No. 1, 1997.

Moghal et al., "Nanomechanical study of thin film nanocomposite and PVD thin films on polymer substrate for optical applications", J. Phys. D: Appl. Phys. 46 (2013) (See copy.

Moore, "Gradient Index Optics: A Review," Applied Optics, vol. 19, No. 7, Apr. 1, 1980.

Oliver et al. "An improved technique for determining hardness and elastic modulus using load and displacement sensing indentation experiments". J. Mater. Res., vol. 7, No. 6, 1992, 1564-1583.

Oliver et al. "Measurement of Hardness and Elastic Modulus by Instrument Indentation: Advances in Understanding and Refinements to Methodology". J. Mater. Res., vol. 19, No. 1, 2004, 3-20.

Park et al; "Atomic Layer Deposition of Yttria-Stabilized Zirconia Thin Films for Enhanced Reactivity and Stability of Solid Oxide Fuel Cells"; Energy; vol. 116; (2016); pp. 170-176.

PCT/US2015/030116 Search Report dated Jan. 12, 2016.

English Translation of CN201810443943.X Office Action dated Jul. 15, 2019; 19 Pages; Chinese Patent Office.

English Translation of JP2017225808 Office Action dated Aug. 14, 2019; 4 Pages; Japanese Patent Office.

Corning, "Corning Gorilla Glass 5," Product Info Sheet, 2 pgs. 2016. retrieved from: https://www.corning.com/microsites/csm/gorillaglass/PI_sheets/Corning%20Gorilla%2-Glass%205%20PI%20Sheet.pdf.

Tang et al. "Optical, structural, and mechanical properties of silicon oxyynitride films sputtering by pulsed magnetron sputtering," Applied Optics 56(4) 2016, pp. C168-C174.

Invitation To Pay Additional Fees and Partial Search Report of the European International Searching Authority; PCT/US2019/058547; dated Feb. 19, 2020; 11 Pgs.

Chang et al. "Characteristics of Si—C—N films deposited by microwave plasma CVD on Si wafers with various buffer layer materials", Diamond and Related Material, 2001, vol. 10, pp. 1910-1915. (Year: 2001.

I.V. Afanasyev-Charkin et al. "Hard Si—N—C films with a tunable band gap produced by pulsed glow discharge deposition" , Surface & Coatings Technology, 1999, pp. 38-42 (Year: 1999.

Xu et al. "Chemical control of physical properties in silicon nitride films", Applied Physics A: Materials Science & Processing, 2012, vol. III, pp. 867-876 (Year: 2012.

Fraunhofer IWS, Available online at <https://www.iws.fraunhofer.de/content/dam/iws/en/documents/publications/product_sheets/200-1a_large_en.pdf>, retrieved in 2020, 1 page.

Korean Patent Application No. 10-2020-7020785; Office Action dated Sep. 9, 2020; 11 Pages; Korean Patent Office.

Taiwanese Patent Application No. 109104136 Office Action dated Dec. 4, 2020; 3 Pages; Taiwanese Patent Office.

Paradis, Suzanne, Characterization and optimization of SiO2 and Si3N4 thin films. 2013, Defence Research and Development Canada (Year: 2013).

\* cited by examiner

LOW-COLOR SCRATCH-RESISTANT ARTICLES WITH A MULTILAYER OPTICAL FILM

CROSS-REFERENCE TO RELATED APPLICATIONS

This application is a continuation application and claims the benefit of priority under 35 U.S.C. § 120 of Ser. No. 15/142,508, filed Apr. 29, 2016, now U.S. Pat. No. 10,444,408, which is a divisional application and claims the benefit of priority under 35 U.S.C. § 120 of Ser. No. 14/480,898, filed Sep. 9, 2014, now U.S. Pat. No. 9,366,784, which in turn claims the benefit of priority under 35 U.S.C. § 119 of U.S. Provisional Application Ser. No. 62/034,412 filed on Aug. 7, 2014, of U.S. Provisional Application Ser. No. 61/954,697 filed on Mar. 18, 2014, and of U.S. Provisional Application Ser. No. 61/877,568 filed on Sep. 13, 2013, the contents of which are relied upon and incorporated herein by reference in their entirety. Application Ser. No. 15/142,508 filed on Apr. 29, 2016 is a continuation-in-part application and claims the benefit of priority under 35 U.S.C. § 120 of U.S. application Ser. No. 14/331,656 filed Jul. 15, 2014, now U.S. Pat. No. 9,079,802, which is a continuation and claims the benefit of priority under 35 U.S.C. § 120 of U.S. application Ser. No. 14/262,066 filed on Apr. 25, 2014, now U.S. Pat. No. 9,359,261, which in turns claims the benefit of priority under 35 U.S.C. § 119 of U.S. Provisional Application Ser. No. 61/954,697 filed on Mar. 18, 2014, of U.S. Provisional Application Ser. No. 61/877,568 filed on Sep. 13, 2013, and of U.S. Provisional Application Ser. No. 61/820,407 filed on May 7, 2013, the contents of which are relied upon and incorporated herein by reference in their entirety.

BACKGROUND

The disclosure relates to articles with scratch resistance, abrasion resistance or a combination thereof, which also exhibit retained optical properties and more particularly to articles that exhibit a high hardness and low color shift when viewed at different incident illumination angles.

Cover and housing substrates are often used in consumer electronic products to protect critical devices within the product, to provide a user interface for input and/or display, and/or many other functions. Such consumer electronic products include mobile devices, such as smart phones, mp3 players and computer tablets. Cover and housing substrates may also be used in architectural articles, transportation-related articles, appliance articles, or any article that requires some transparency, scratch-resistance, abrasion resistance or a combination thereof. These applications and others also often demand durable (e.g., scratch-resistant) cover and housing substrate, which also has strong optical performance characteristics. Often, the cover substrate includes glass for this purpose; however other substrates may be used.

Strong optical performance in terms of maximum light transmission and minimum reflectivity are required in cover substrate applications (and potentially in some housing substrate applications). Furthermore, cover substrate applications require that the color exhibited or perceived, in reflection and/or transmission, does not change appreciably as the viewing angle (or incident illumination angle) is changed. This is because, if the color, reflectivity or transmission changes with viewing angle to an appreciable degree, the user of the product incorporating the cover glass will perceive a change in the color or brightness of the display, which can diminish the perceived quality of the display. Of these changes, a change in color is often the most noticeable and objectionable to users.

Known cover substrates include glass and film combinations can often exhibit a variety of different types of scratches after use in harsh operating conditions. In some instances, a significant portion of those scratches are microductile scratches, which typically include a single groove in a material having extended length and with depths in the range from about 100 nm to about 500 nm. Microductile scratches may be accompanied by other types of visible damage, such as sub-surface cracking, frictive cracking, chipping and/or wear. Evidence suggests that a majority of such scratches and other visible damage is caused by sharp contact that occurs in a single contact event. Once a significant scratch appears on the cover substrate, the appearance of the product is degraded since the scratch causes an increase in light scattering, which may cause significant reduction in brightness, clarity and contrast of images on the display. Significant scratches can also affect the accuracy and reliability of touch sensitive displays. A portion of such scratches and other visible damage as described above may also be caused by multiple contact events (including reciprocating abrasion or wear). These scratches, and even less significant scratches, are unsightly and can affect product performance.

Single event scratch damage can be contrasted with abrasion damage. Abrasion damage is typically caused by multiple contact events, such as reciprocating sliding contact from hard counter face objects (e.g., sand, gravel and sandpaper). Abrasion damage can generate heat, which can degrade chemical bonds in the film materials and cause flaking and other types of damage to the cover glass. In addition, since abrasion damage is often experienced over a longer term than the single events that cause scratches, the film material experiencing abrasion damage can also oxidize, which further degrades the durability of the film and thus the glass-film laminate. The single events that cause scratches generally do not involve the same conditions as the events that cause abrasion damage and therefore, the solutions often utilized to prevent abrasion damage may not also prevent scratches in cover substrates. Moreover, known scratch and abrasion damage solutions often compromise the optical properties.

Accordingly, there is a need for new cover substrates, and methods for their manufacture, which are scratch resistant over a wide range of different types of scratches, abrasion resistant, and have good optical performance.

SUMMARY

One aspect of the present disclosure pertains to an article including a substrate with a surface and an optical film disposed on the surface of the substrate forming a coated surface. The article of one or more embodiments exhibits a transmittance color and/or reflectance such that the transmittance color coordinates and/or the reflectance color coordinates (measured at the coated surface) have color shift of about 2 or less or a color shift of about 0.5 or less, when viewed at an incident illumination angle in the range from about 0 degrees to about 60 degrees from normal incidence under an illuminant. Exemplary illuminants include International Commission on Illumination ("CIE") F2 or CIE F10.

The article of some embodiments may exhibit a hardness of about 8 GPa or greater, as measured by a Berkovich Indenter Hardness Test, as described herein, along an indentation depth of about 100 nm or greater (e.g., from about 100 nm to about 300 nm, from about 100 nm to about 400 nm, from about 100 nm to about 500 nm, or from about 100 nm to about 600 nm). The article may optionally include a crack mitigating layer disposed between the optical film and the substrate or within the optical film.

In one or more embodiments, the optical film includes a scratch-resistant layer. The scratch-resistant layer may exhibit a hardness of about 8 GPa or greater, as measured by the Berkovich Indenter Hardness Test. The scratch-resistant layer of some embodiments may exhibit a refractive index of about 1.7 or greater. The scratch-resistant layer may include one or more of AlN, $Si_3N_4$, $AlO_xN_y$, $SiO_xN_y$, $Al_2O_3$, $Si_xC_y$, $Si_xO_yC_z$, $ZrO_2$, $TiO_xN_y$, diamond, diamond-like carbon, and $Si_uAl_vO_xN_y$.

The optical film of one or more embodiments includes an optical interference layer disposed between the scratch-resistant layer and the substrate. The optical interference layer may include a first low refractive index (RI) sub-layer and a second high RI sub-layer. The difference between the refractive index of the first low RI sub-layer and the refractive index of the second high RI sub-layer may be about 0.01 or greater (e.g., about 0.1 or greater, about 0.2 or greater, about 0.3 or greater or about 0.4 or greater). In one or more embodiments, the optical interference layer includes a plurality of sub-layer sets (e.g., up to about 10 sub-layer sets), which can include a first low RI sub-layer and a second high RI sub-layer. The first low RI sub-layer may include one or more of $SiO_2$, $Al_2O_3$, $GeO_2$, $SiO$, $AlO_xN_y$, $SiO_xN_y$, $Si_uAl_vO_xN_y$, MgO, $MgF_2$, $BaF_2$, $CaF_2$, $DyF_3$, $YbF_3$, $YF_3$, and $CeF_3$. The second high RI rub-layer may include at least one of $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, and $MoO_3$.

In some instances, the optical interference layer includes a third sub-layer. The third sub-layer may be disposed between the plurality of sub-layer sets and the scratch-resistant layer. Alternatively, the third sub-layer may be disposed between the substrate and the plurality of sub-layer sets. The third sub-layer of one or more embodiments may have a RI between the refractive index of the first low RI sub-layer and the refractive index of the second high RI sub-layer. The optical film of some embodiments may include a capping layer disposed on the scratch-resistant layer.

The first low RI sub-layer and/or the second high RI sub-layer of the optical interference layer may have an optical thickness (n*d) in the range from about 2 nm to about 200 nm. The optical interference layer may exhibit a thickness of about 800 nm or less.

In some embodiments, the optical interference layer exhibits an average light reflection of about 0.5% or less over the optical wavelength regime. In some embodiments, the article exhibits an average transmittance or average reflectance having an average oscillation amplitude of about 5 percentage points or less over the optical wavelength regime.

The substrate of one or more embodiments may include an amorphous substrate or a crystalline substrate. The amorphous substrate can include a glass selected from the group consisting of soda lime glass, alkali aluminosilicate glass, alkali containing borosilicate glass and alkali aluminoborosilicate glass. The glass may be optionally chemically strengthened and/or may include a compressive stress (CS) layer with a surface CS of at least 250 MPa extending within the chemically strengthened glass from a surface of the chemically strengthened glass to a depth of layer (DOL). The DOL exhibited by such substrates may be at least about 10 μm.

The articles disclosed herein may include articles with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof.

Additional features and advantages will be set forth in the detailed description which follows. Additional features and advantages will be readily apparent to those skilled in the art from that description or recognized by practicing the embodiments described herein and in the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description, serve to explain principles and operation of the various embodiments.

DETAILED DESCRIPTION

Figure 1:
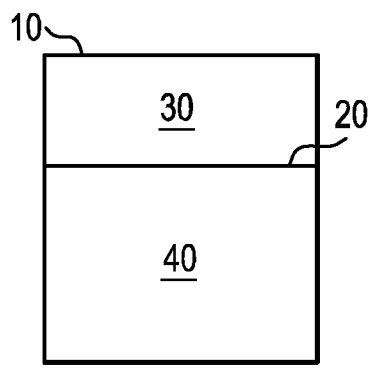
FIG. 1 is an illustration of a known substrate and a scratch-resistant material embodiment.

Reference will now be made in detail to various embodiment(s), examples of which are illustrated in the accompanying drawings. Whenever possible, the same reference numerals will be used throughout the drawings to refer to the same or like parts.

Known scratch-resistant materials, such as AlN, $Si_3N_4$, $AlO_xN_y$, and $SiO_xN_y$, have high refractive indices, for example, in the range from about 1.7 to about 2.1. Common substrates that include scratch-resistant materials are glass and plastic substrates. Glass and plastic materials typically have refractive indices in the range from about 1.45 to about 1.65. This difference in the refractive index of the scratch-resistant materials and the substrate can contribute to undesirable optical interference effects. These undesirable optical interference effects may be more pronounced where the scratch-resistant materials have a physical thickness in the range from about 0.05 to about 10 microns. Optical interference between reflected waves from the scratch-resistant material/air interface 10 (as shown in FIG. 1) and the scratch-resistant material/substrate interface 20 (as shown in FIG. 1) can lead to spectral reflectance oscillations that create apparent color in the scratch-resistant materials 30 (and/or the combination of the scratch-resistant materials 30 and substrate 40), particularly in reflection. The color shifts in reflection with viewing angle due to a shift in the spectral reflectance oscillations with incident illumination angle. The observed color and color shifts with incident illumination angle are often distracting or objectionable to device users, particularly under illumination with sharp spectral features such as fluorescent lighting and some LED lighting.

Figure 2:
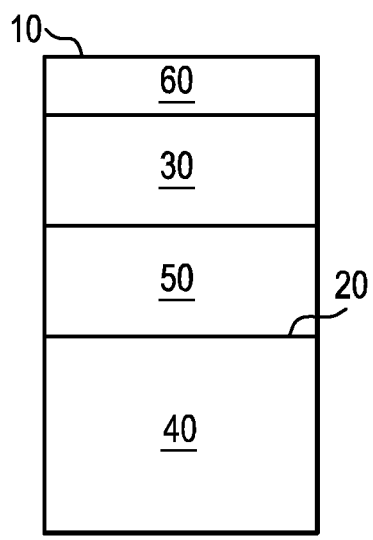
FIG. 2 is an illustration of a known article including a single layer interference layer.
Figure 3:
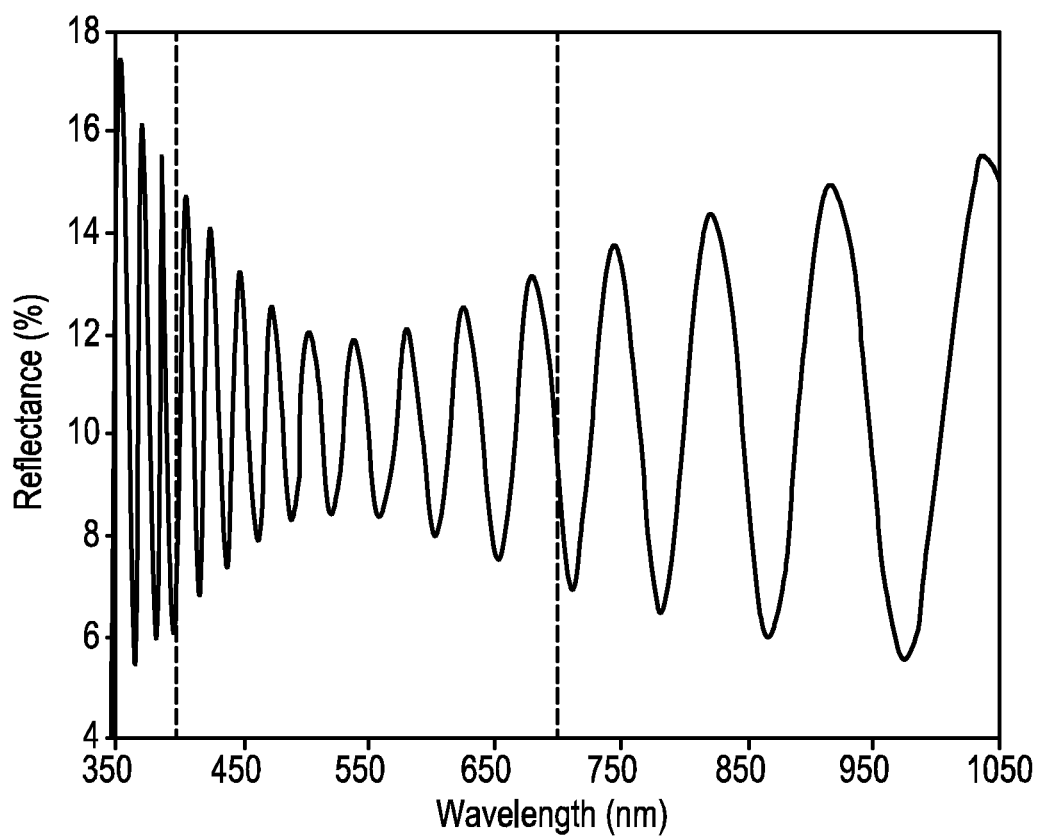
FIG. 3 is a reflectance spectra for the article shown in FIG. 2.

Observed color and color shifts can be reduced by minimizing the reflectance at one or both interfaces 10, 20, thus reducing reflectance oscillations and reflected color shifts for the entire article. For scratch-resistant materials, the reduction in reflectance is often most feasible at the scratch-material/substrate interface 20, while simultaneously retaining the high durability or scratch resistance of the scratch-resistant materials/air interface 10. Various ways to reduce reflectance include the use of a single optical interference layer (as shown in FIG. 2) or a layer having a monotonic gradient in refractive index at the scratch-resistant material/substrate interface 20. Such options, however, often exhibit large oscillations in the transmittance and/or reflectance spectra under various illuminants. A single layer interference layer is included in the article shown in FIG. 2. The article includes an alkali aluminoborosilicate glass substrate 10, a single layer interference layer 50 of $Al_2O_3$ having a physical thickness of about 80 nanometers (nm), an scratch-resistant layer 30 of $Si_uAl_vO_xN_y$ having a physical thickness of about 2000 nm, and a layer 60 of $SiO_2$ having a physical thickness of about 10 nm. FIG. 3 shows a modeled reflectance spectrum for the article illustrated in FIG. 2. The spectrum exhibits oscillations over the optical wavelength regime having amplitudes in the range from about 3.5 percentage points (e.g., a low reflectance of about 8.5% and a peak reflectance of about 12%, at the wavelength range from about 520 nm to 540 nm) to about 8 percentage points (e.g., a low reflectance of about 6.5% and a peak reflectance to about 14.5%, at the wavelength of about 400 nm to 410 nm). As used herein, the term "amplitude" includes the peak-to-valley change in reflectance or transmittance. As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. In one or more embodiments, the spectral resolution of the characterization of the transmittance and reflectance is less than 5 nm or 0.02 eV.

Figure 4:
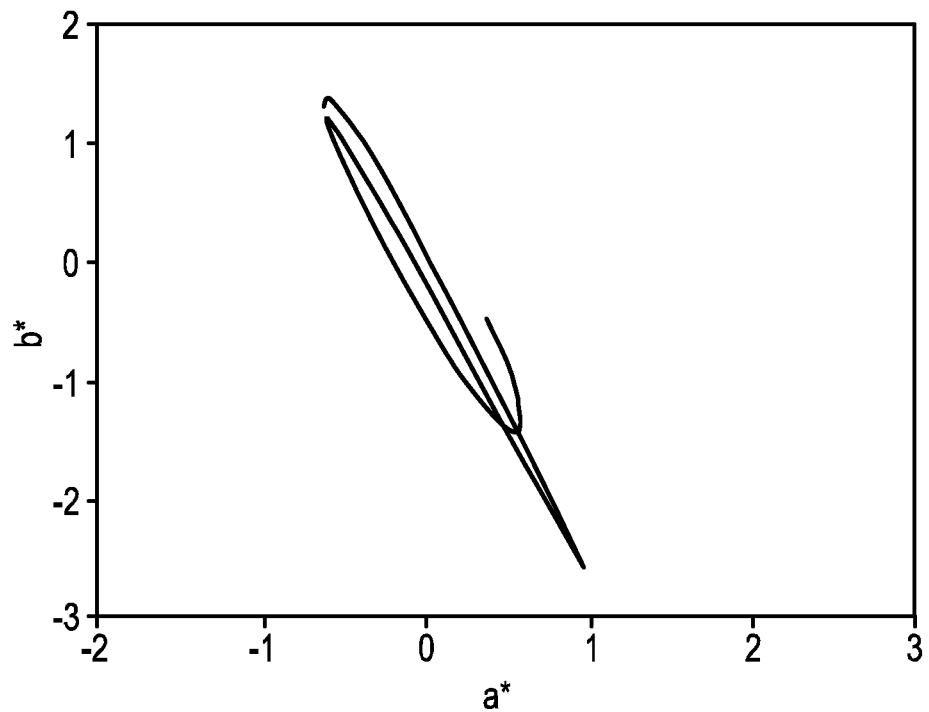
FIG. 4 is a graph showing the range of calculated a* and b* color shifts based on the reflectance spectra shown in FIG. 3.

The phrase "average amplitude" includes the peak-to-valley change in reflectance or transmittance averaged over every possible 100 nm wavelength range within the optical wavelength regime. As used herein, the "optical wavelength regime" includes the wavelength range from about 420 nm to about 700 nm. From this information, it can be predicted that the article shown in FIGS. 2 and 3 will exhibit relatively large color shifts when viewed at different incident illumination angles from normal incidence under different illuminants, as shown in FIG. 4.

The embodiments of this disclosure utilize an optical interference layer including multiple layers disposed between the substrate and the scratch-resistant materials. The optical interference layer achieves improved optical performance, in terms of colorlessness and/or smaller color shifts with viewed at varying incident illumination angles from normal incidence under different illuminants. Such optical interference layers are amenable to faster manufacturing over monotonic gradient designs, and articles incorporating optical interference layers provide scratch-resistance and superior optical properties.

A first aspect of this disclosure pertains to an article that exhibits colorlessness even when viewed at different incident illumination angles under an illuminant. In one or more embodiments, the article exhibits a color shift of about 2 or less for any incidental illumination angles in the ranges provided herein. As used herein, the phrase "color shift" refers to the change in both a* and b* values, under the CIE L*, a*, b* colorimetry system, in reflectance or transmittance. The a* and b* values are described as transmittance color (or transmittance color coordinates) or reflectance color (or reflectance color coordinates), respectively. Color shift may be determined using the following equation: $\sqrt{((a^*_2 - a^*_1)^2 + (b^*_2 - b^*_1)^2)}$, a* and b* coordinates (in transmittance or reflectance) of the article when viewed at normal incidence (i.e., $a^*_1$, and $b^*_1$) and at an incident illumination angle away from normal incidence (i.e., $a^*_2$, and $b^*_2$), provided that the incident illumination angle is different from normal incidence and in some cases differs from normal incidence by at least about 2 degrees or about 5 degrees. Measurements of the various colors over a collection of different observers indicates that the average observer sees a just-noticeable difference in the two colors when the color shift is of about 2.

In some instances, a color shift of about 2 or less is exhibited by the article when viewed at various incident illumination angles from normal incidence, under an illuminant. In some instances the color shift is about 1.9 or less, 1.8 or less, 1.7 or less, 1.6 or less, 1.5 or less, 1.4 or less, 1.3 or less, 1.2 or less, 1.1 or less, 1 or less, 0.9 or less, 0.8 or less, 0.7 or less, 0.6 or less, 0.5 or less, 0.4 or less, 0.3 or less, 0.2 or less, or 0.1 or less. In some embodiments, the color shift may be about 0. The illuminant can include standard illuminants as determined by the CIE, including A illuminants (representing tungsten-filament lighting), B illuminants (representing daylight simulating illuminants), C illuminants (representing daylight simulating illuminants), D series illuminants (representing natural daylight), and F series illuminants (representing various types of fluorescent lighting). In specific examples, the articles exhibit a color shift of about 2 or less when viewed at incident illumination angle from normal incidence under a CIE F2, F10, F11, F12 or D65 illuminant. The incident illumination angle may be in the range from about 0 degrees to about 80 degrees, from about 0 degrees to about 75 degrees, from about 0 degrees to about 70 degrees, from about 0 degrees to about 65 degrees, from about 0 degrees to about 60 degrees, from about 0 degrees to about 55 degrees, from about 0 degrees to about 50 degrees, from about 0 degrees to about 45 degrees, from about 0 degrees to about 40 degrees, from about 0 degrees to about 35 degrees, from about 0 degrees to about 30 degrees, from about 0 degrees to about 25 degrees, from about 0 degrees to about 20 degrees, from about 0 degrees to about 15 degrees, from about 5 degrees to about 80 degrees, from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from normal incidence. The article may exhibit the maximum color shifts described herein at and along all the incident illumination angles in the range from about 0 degrees to about 80 degrees away from normal incidence. In one example, the article may exhibit a color shift of 2 or less at any incident illumination angle in the range from about 0 degrees to about 60 degrees, from about 2 degrees to about 60 degrees, or from about 5 degrees to about 60 degrees away from normal incidence.

According to one or more embodiments, the article 100 exhibits an average transmittance of 85% or greater over the visible spectrum. In one or more embodiments, the article 100 has a total reflectance of 15% or less.

Figure 5:
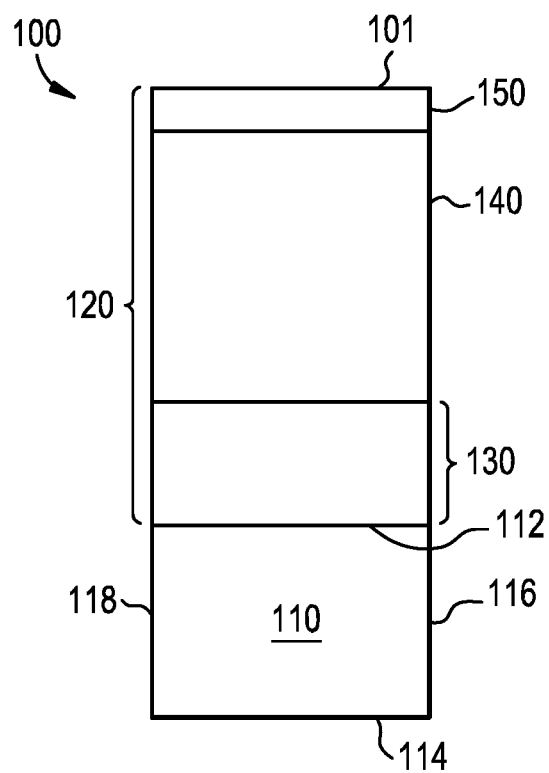
FIG. 5 is illustration of an article according to one or more embodiments.

Referring to FIG. 5, the article 100 according to one or more embodiments may include a substrate 110, and an optical film 120 disposed on the substrate. The substrate 110 includes opposing major surfaces 112, 114 and opposing minor surfaces 116, 118. The optical film 120 is shown in FIG. 5 as being disposed on a first opposing major surface 112; however, the optical film 120 may be disposed on the second opposing major surface 114 and/or one or both of the opposing minor surfaces, in addition to or instead of being disposed on the first opposing major surface 112. The article 100 includes a coated surface 101.

The optical film 120 includes at least one layer of at least one material. The term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein.

The articles described herein have scratch resistance, which may be characterized by a measured hardness of the article (or the measured hardness of the optical film, which may include a scratch resistant layer, as described herein). Hardness may be measured by a "Berkovich Indenter Hardness Test", which includes measuring the hardness of a material on a surface thereof by indenting the surface with a diamond Berkovich indenter. The Berkovich Indenter Hardness Test includes indenting the coated surface 101 of the article or the surface of the optical film (which may include the scratch resistant layer, described herein) with the diamond Berkovich indenter to form an indent to an indentation depth in the range from about 50 nm to about 1000 nm (or the entire thickness of the optical film, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater.*

*Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. The indentation depth is made and measured from the coated surface 101 of the article, the surface of the optical film and/or surface of any one or more of the layers in the optical film. As used herein, hardness refers to a maximum hardness, and not an average hardness.

Typically in nanoindentation measurement methods (such as by using a Berkovich indenter) of a coating or film that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film and layers thereof, described herein, without the effect of the underlying substrate. When measuring hardness of the optical film or layers thereof (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 100 nm, or less than about 70 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

It has been observed that the hardness measured at intermediate indentation depths (at which hardness approaches and is maintained at maximum levels) and at deeper indentation depths depends on the thickness of a material or layer. Specifically, the hardness response of four different layers (i.e., 500 nm thick, 1000 nm thick, 1500 nm thick, and 2000 nm thick) of $AlO_xN_y$ having different thicknesses was evaluated. The hardness of each layer was measured using the Berkovich Indenter Hardness Test. The 500 nm-thick layer exhibited its maximum hardness at indentation depths from about 100 nm to 180 nm, followed by a dramatic decrease in hardness at indentation depths from about 180 nm to about 200 nm, indicating the hardness of the substrate influencing the hardness measurement. The 1000 nm-thick layer exhibited a maximum hardness at indentation depths from about 100 nm to about 300 nm, followed by a dramatic decrease in hardness at indentation depths greater than about 300 nm. The 1500 nm-thick layer exhibited a maximum hardness at indentation depths from about 100 nm to about 550 nm and the 2000-nm thick layer exhibited a maximum hardness at indentation depths from about 100 nm to about 600 nm.

In some embodiments, the article, the optical film and/or layer(s) in the optical film exhibit a maximum hardness at indentation depths greater than about 100 nm or greater than about 200 nm and thus exhibit sufficient hardness to provide scratch resistance, that is not influenced by the substrate. In some embodiments, the article, the optical film and/or layer(s) in the optical film have a maximum hardness at such indentation depths and thus are resistant to specific scratches such as microductile scratches (which typically have depths of about 100 nm to about 500 nm or from about 200 nm to about 400 nm). For example, the coated surface 101 (or the surface of the optical film or any one or more layers of the optical film) may be resistant to microductile scratches because the article exhibits the hardness values recited herein along specific indentation depths, as measured by a Berkovich Indenter Hardness Test.

The measured or apparent hardness of the article and/or optical film (or layers in the optical film) may be maximized by tuning the thickness of the optical film or one or more layer(s) in the optical film.

In one or more embodiments, the article 100 exhibits an average hardness of about 8 GPa or greater, about 10 GPa or greater, about 14 GPa or greater, about 18 GPa or greater, as measured by the Berkovich Indenter Hardness test. In some embodiments, the average hardness of the article may be in the range from about 5 GPa to about 30 GPa, from about 6 GPa to about 30 GPa, from about 7 GPa to about 30 GPa, from about 8 GPa to about 30 GPa, from about 9 GPa to about 30 GPa, from about 10 GPa to about 30 GPa, from about 12 GPa to about 30 GPa, from about 5 GPa to about 28 GPa, from about 5 GPa to about 26 GPa, from about 5 GPa to about 24 GPa, from about 5 GPa to about 22 GPa, from about 5 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween. These hardness values may be present at indentation depths of about 50 nm or greater, or about 100 nm or greater (e.g., (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

In one or more embodiments, article 100 also exhibits abrasion resistance. Specifically, one or more embodiments of the articles described herein exhibit resistance to scratches and other damage formed by abrasion (or multiple contact events). Various forms of abrasion test are known in the art, such as that specified in ASTM D1044-99, using abrasive media supplied by Taber Industries. Modified abrasion methods related to ASTM D1044-99 can be created using different types of abrading media, abradant geometry and motion, pressure, etc. in order to provide repeatable and measurable abrasion or wear tracks to meaningfully differentiate the abrasion resistance of different samples. For example, different test conditions will usually be appropriate for soft plastics vs. hard inorganic test samples. The embodiments described herein exhibit scratch resistance as measured by a specific modified version of the ASTM D1044-99 test referred to herein as the "Taber Test", or a "Garnet Test", which provide clear and repeatable differentiation of durability between different samples, which comprise primarily hard inorganic materials. These test methods may generate a combination of micro-ductile scratches together with other damage modes mentioned above, depending on the specific sample tested.

As used herein, the phrase "Taber Test" refers to a test method using a Taber Linear Abraser 5750 (TLA 5750) and accessories supplied by Taber Industries, in an environment including a temperature of about 22° C.±3° C. and Relative Humidity of up to about 70%. The TLA 5750 includes a CS-17 abraser material having a 6.7 mm diameter abraser head. Each sample was abraded according to the Taber Test and the abrasive damage was evaluated using both Haze and Bidirectional Transmittance Distribution Function (BTDF) measurements, among other methods. In the Taber Test, the procedure for abrading each sample includes placing the TLA 5750 and a flat sample support on a rigid, flat surface and securing the TLA 5750 and the sample support to the surface. Before each sample is abraded under the Taber Test, the abraser material (CS-17) is refaced using a new S-14 refacing strip adhered to glass. The abraser is subjected to 10 refacing cycles using a cycle speed of 25 cycles/minute and stroke length of 1 inch, with no additional weight added (i.e., a total weight of about 350 g is used during refacing, which is the combined weight of the spindle and collet holding the abraser). The procedure then includes operating the TLA 5750 to abrade the sample, where the sample is placed in the sample support in contact with the abraser head and supporting the weight applied to the abraser head, using a cycle speed of 25 cycles/minute, and a stroke length of 1 inch, and a weight such that the total weight applied to the sample is 850 g (i.e., a 500 g auxiliary weight is applied in addition to the 350 g combined weight of the spindle and collet). The procedure includes forming two wear tracks on each sample for repeatability, and abrading each sample for 500 cycle counts in each of the two wear tracks on each sample.

In one or more embodiments, the coated surface 101 of the article is abraded according to the above Taber Test and the article exhibits a haze of about 5% or less, as measured on the abraded side using a hazemeter supplied by BYK Gardner under the trademark Haze-Gard plus®, using an aperture over the source port, the aperture having a diameter of 8 mm.

In some embodiments, the haze measured after the Taber Test may be about 4% or less, about 3% or less, about 2% or less, about 1% or less, about 0.8% or less, about 0.5% or less, about 0.4% or less, about 0.3%, about 0.2% or less, or about 0.1% or less.

In one or more embodiments, the coated surface 101 of the article may exhibit an abrasion resistance, after being abraded by the Taber Test as measured by a light scattering measurement. In one or more embodiments, the light scattering measurement includes a bi-directional reflectance distribution function (BRDF) or bi-directional transmittance distribution function (BTDF) measurement carried out using a Radiant Zemax IS-SA™ instrument. This instrument has the flexibility to measure light scattering using any input angle from normal to about 85 degrees incidence in reflection, and from normal to about 85 degrees incidence in transmission, while also capturing all scattered light output in either reflection or transmission into 2*Pi steradians (a full hemisphere in reflection or transmission). In one embodiment, the article 100 exhibits an abrasion resistance, as measured using BTDF at normal incidence and analyzing the transmitted scattered light at a selected angular range, for example from about 10° to about 80° degrees in polar angles and any angular range therein. The full azimuthal range of angles can be analyzed and integrated, or particular azimuthal angular slices can be selected, for example from about 0° and 90° azimuthally. In the case of linear abrasion an azimuthal direction that is substantially orthogonal to the abrasion direction may be utilized so as to increase signal-to-noise of the optical scattering measurement. In one or more embodiments, the article may exhibit a scattered light intensity after the Taber Test as measured at the coated surface 101, of about less than about 0.1, about 0.05 or less, about 0.03 or less, about 0.02 or less, about 0.01 or less, about 0.005 or less, or about 0.003 or less (in units of 1/steradian), when using the Radiant Zemax IS-SA tool in CCBTDF mode at normal incidence in transmission, with a 2 mm aperture and a monochrometer set to 600 nm wavelength, and when evaluated at polar scattering angles in the range from about 15° to about 60° (e.g. specifically, about 20°). Normal incidence in transmission may be otherwise known as zero degrees in transmission, which may be denoted as 180° incidence by the instrument software. In one or more embodiments, the scattered light intensity may be measured along an azimuthal direction substantially orthogonal to the abraded direction of a sample abraded by the Taber Test. These optical intensity values may also correspond to less than about 1%, less than about 0.5%, less than about 0.2%, or less than about 0.1% of the input light intensity that is scattered into polar scattering angles greater than about 5 degrees, greater than about 10 degrees, greater than about 30 degrees, or greater than about 45 degrees.

Generally speaking, BTDF testing at normal incidence, as described herein, is closely related to the transmission haze measurement, in that both are measuring the amount of light that is scattered in transmission through a sample (or, in this case the article, after abrading the coated surface 101). BTDF measurements provide more sensitivity as well as more detailed angular information, compared to haze measurements. BTDF allows measurement of scattering into different polar and azimuthal angles, for example allowing us to selectively evaluate the scattering into azimuthal angles that are substantially orthogonal to the abrasion direction in the linear Taber test (these are the angles where light scattering from linear abrasion is the highest). Transmission haze is essentially the integration of all scattered light measured by normal incidence BTDF into the entire hemisphere of polar angles greater than about +/−2.5 degrees.

The Garnet Test uses the same apparatus as the Taber Test (i.e., a Taber linear abraser, or an equivalent apparatus). The Garnet Test includes using a 150-grit garnet sandpaper to abrade the sample surface under varying applied loads for one reciprocation cycle (i.e., one forward-and-back cycle), with a stroke length of 1" and a speed of 45 cycles/minute. The loads applied are in terms of a total load (including the weight of the abraser spindle, holder, and any added weights). The garnet sandpaper has a contact area with the samples of about 7 mm, similar to the Taber test. The Garnet Test performed in this way is generally more aggressive than the Taber Test and can produce a wider variety of damage modes. The visible scratches and damage are also more random. Light scattering from these samples can be characterized using BTDF and Haze measurements as described above.

In one or more embodiments, the article exhibits a haze of about 3% or less (e.g., about 2% or less, about 1% or less, about 0.5% or less, or about 0.2% or less) after the Garnet Test, when tested in the Garnet Test with a total load in the range from about 380 g to about 2100 g. The articles of one or more embodiment exhibit a scattered light level at a polar angle of 20 degrees (orthogonal to abrasion axis, as measured by CC-BTDF) of about 0.04 or less, about 0.02 or less, about 0.01 or less, or even about 0.005 or less, in units of 1/steradian.

According to one or more embodiments, the article 100 exhibits an average light transmission of about 80% or greater. The term "light transmission" refers to the amount of light that is transmitted through a medium. The measure of light transmission is the difference between the amount of light that enters the medium and the amount of light that exits the medium. In other words, light transmission is the light that has traveled through a medium without being absorbed or scattered. The term "average light transmission" refers to spectral average of the light transmission multiplied by the luminous efficiency function, as described by CIE standard observer. The article 100 of specific embodiments may exhibit an average light transmission of 80% or greater, 82% or greater, 85% or greater, 90% or greater, 90.5% or greater, 91% or greater, 91.5% or greater, 92% or greater, 92.5% or greater, 93% or greater, 93.5% or greater, 94% or greater, 94.5% or greater, or 95% or greater.

In one or more embodiments, the article 100 has a total reflectivity that 20% or less. For example, the article may have a total reflectivity of 20% or less, 15%, or less, 10% or less, 9% or less, 8% or less, 7% or less, 6% or less. In some specific embodiments, the article has a total reflectivity of 6.9% or less, 6.8% or less, 6.7% or less, 6.6% or less, 6.5% or less, 6.4% or less, 6.3% or less, 6.2% or less, 6.1% or less, 6.0% or less, 5.9% or less, 5.8% or less, 5.7% or less, 5.6% or less, or 5.5% or less. In accordance with one or more embodiments, the article 100 has a total reflectivity that is the same or less than the total reflectivity of the substrate 110. In one or more embodiments, the article 100 exhibits a relatively flat transmittance spectrum, reflectance spectrum or transmittance and reflectance spectrum over the optical wavelength regime. In some embodiments, the relatively flat transmittance and/or reflectance spectrum includes an average oscillation amplitude of about 5 percentage points or less along the entire optical wavelength regime or wavelength range segments in the optical wavelength regime. Wavelength range segments may be about 50 nm, about 100 nm, about 200 nm or about 300 nm. In some embodiments, the average oscillation amplitude may be about 4.5 percentage points or less, about 4 percentage points or less, about 3.5 percentage points or less, about 3 percentage points or less, about 2.5 percentage points or less, about 2 percentage points or less, about 1.75 percentage points or less, about 1.5 percentage points or less, about 1.25 percentage points or less, about 1 percentage point or less, about 0.75 percentage points or less, about 0.5 percentage points of less, about 0.25 percentage points or less, or about 0 percentage points, and all ranges and sub-ranges therebetween. In one or more specific embodiments, the article exhibits a transmittance over a selected wavelength range segment of about 100 nm or 200 nm over the optical wavelength regime, wherein the oscillations from the spectra have a maximum peak of about 80%, about 82%, about 84%, about 86%, about 87%, about 88%, about 89%, about 90%, about 91%, about 92%, about 93%, about 94%, or about 95%, and all ranges and sub-ranges therebetween.

In some embodiments, the relatively flat average transmittance and/or average reflectance includes maximum oscillation amplitude, expressed as a percent of the average transmittance or average reflectance, along a specified wavelength range segment in the optical wavelength regime. The average transmittance or average reflectance would also be measured along the same specified wavelength range segment in the optical wavelength regime. The wavelength range segment may be about 50 nm, about 100 nm or about 200 nm. In one or more embodiments, the article 100 exhibits an average transmittance and/or average reflectance with an average oscillation amplitude of about 10% or less, about 5% or less, about 4.5% of less, about 4% or less, about 3.5% or less, about 3% or less, about 2.5% or less, about 2% or less, about 1.75% or less, about 1.5% or less, about 1.25% or less, about 1% or less, about 0.75% or less, about 0.5% or less, about 0.25% or less, or about 0.1% or less, and all ranges and sub-ranges therebetween. Such percent-based average oscillation amplitude may be exhibited by the article along wavelength ranges segments of about 50 nm, about 100 nm, about 200 nm or about 300 nm, in the optical wavelength regime. For example, an article may exhibit an average transmittance of about 85% along the wavelength range from about 500 nm to about 600 nm, which is a wavelength range segment of about 100 nm, within the optical wavelength regime. The article may also exhibit a percent-based oscillation amplitude of about 3% along the same wavelength range (500 nm to about 600 nm), which means that along the wavelength range from 500 nm to 600 nm, the absolute (non-percent-based) oscillation amplitude is about 2.55 percentage points.

Substrate

The substrate 110 may be inorganic and may include an amorphous substrate, a crystalline substrate or a combination thereof. The substrate 110 may be formed from man-made materials and/or naturally occurring materials. In some specific embodiments, the substrate 110 may specifically exclude plastic and/or metal substrates. In some embodiments, the substrate 110 may be organic and specifically polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In one or more embodiments, the substrate exhibits a refractive index in the range from about 1.45 to about 1.55. In specific embodiments, the substrate 110 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the substrate may be amorphous and may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0%. In substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, and depth of layer (DOL). Surface CS may be measured near the surface or within the strengthened glass at various depths. A maximum CS value may include the measured CS at the surface (CSs) of the strengthened substrate. The CT, which is computed for the inner region adjacent the compressive stress layer within a glass substrate, can be calculated from the CS, the physical thickness t, and the DOL. CS and DOL are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring CS and DOL are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass substrate. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and CT is given by the expression (1):

$$CT=(CS \cdot DOL)/(t-2\ DOL) \qquad (1),$$

wherein t is the physical thickness (μm) of the glass article. In various sections of the disclosure, CT and CS are expressed herein in megaPascals (MPa), physical thickness t is expressed in either micrometers (μm) or millimeters (mm) and DOL is expressed in micrometers (μm).

In one embodiment, a strengthened substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOL greater than 15 μm, and a CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum modifiers} > 1,$$

where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum modifiers} > 1.$$

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)$—$Al_2O_3 \leq 2$ mol. %; 2 mol. % $\leq Na_2O$—$Al_2O_3 \leq 6$ mol. %; and 4 mol. % $\leq (Na_2O+K_2O)$—$Al_2O_3 \leq 10$ mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass ceramic substrate, which may be strengthened or non-strengthened. Examples of suitable glass ceramics may include $Li_2O$—$Al_2O_3$—$SiO_2$ system (i.e. LAS-System) glass ceramics, MgO—$Al_2O_3$—$SiO_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 μm to about 5 mm. Example substrate 110 physical thicknesses range from about 100 μm to about 500 μm (e.g., 100, 200, 300, 400 or 500 μm). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

Optical Film

Figure 6:
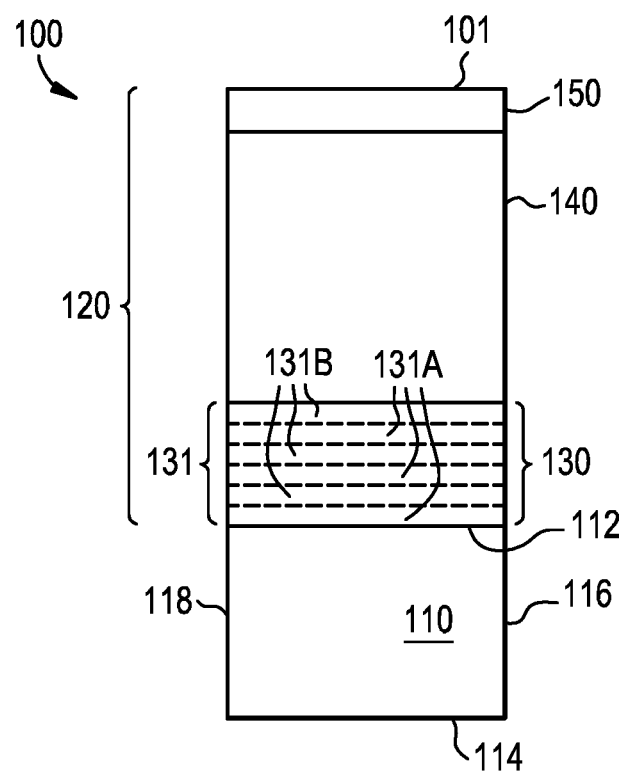
FIG. 6 is a more detailed illustration of the article shown in FIG. 5.

As shown in FIG. 5-6, the optical film 120 may include a plurality of layers 130, 140, 150. Additional layers may also be included in optical film 120. Moreover, in some embodiments, one or more films or layers may be disposed on the opposite side of the substrate 110 from the optical film 120 (i.e., on major surface 114).

The physical thickness of the optical film 120 may be in the range from about 0.1 μm to about 3 μm. In some instances, the physical thickness of the optical film 120 may be in the range from about 0.1 μm to about 2.9 μm, from about 0.1 μm to about 2.8 μm, from about 0.1 μm to about 2.7 μm, from about 0.1 μm to about 2.6 μm, from about 0.1 μm to about 2.5 μm, from about 0.1 μm to about 2.4 μm, from about 0.1 μm to about 2.3 μm, from about 0.1 μm to about 2.2 μm, from about 0.1 μm to about 2.1 μm, from about 0.1 μm to about 2 μm, from about 0.5 μm to about 3 μm, from about 1 μm to about 3 μm, from about 1.1 μm to about 3 μm, from about 1.2 μm to about 3 μm, from about 1.3 μm to about 3 μm, from about 1.4 μm to about 3 μm, or from about 1.5 μm to about 3 μm, and all ranges and sub-ranges therebetween.

The optical film 120 may exhibit a maximum hardness of greater than about 5 GPa, as measured on the coated surface 101, by the Berkovich Indenter Hardness Test. For example, the optical film 120 may exhibit a hardness in the range from about 6 GPa to about 30 GPa, from about 7 GPa to about 30 GPa, from about 8 GPa to about 30 GPa, from about 9 GPa to about 30 GPa, from about 10 GPa to about 30 GPa, from about 12 GPa to about 30 GPa, from about 5 GPa to about 28 GPa, from about 5 GPa to about 26 GPa, from about 5 GPa to about 24 GPa, from about 5 GPa to about 22 GPa, from about 5 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween. Such hardness values may be exhibited at indentation depths of about 50 nm or greater or about 100 nm or greater. In one or more embodiments, the indentation depths may be in the range from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm.

In one or more embodiments, the optical film includes an optical interference layer 130 disposed on major surface 112 of the substrate 110, a scratch-resistant layer 140 disposed on the optical interference layer 130 and an optional capping layer 150 disposed on the scratch resistant layer 140. In the embodiment shown, the optical interference layer 130 is disposed between the substrate 110 and the scratch-resistant layer 140, thus modifying the interface between the substrate 110 and the scratch-resistant layer 140.

The optical film or any one of or of the layers in the optical film may exhibit an extinction coefficient (at a wavelength of about 400 nm) of about 10' or less.

The optical interference layer 130 may include two or more sub-layers. In one or more embodiments, the two or more sub-layers may be characterized as having a different refractive index. Unless otherwise stated, refractive index values described herein are with reference a wavelength of about 550 nm. In embodiment, the optical interference layer 130 includes a first low RI sub-layer and a second high RI sub-layer. The difference in the refractive index of the first low RI sub-layer and the second high RI sub-layer may be about 0.01 or greater, 0.05 or greater, 0.1 or greater or even 0.2 or greater.

As shown in FIG. 6, the optical interference layer may include a plurality of sub-layer sets (131). A single sub-layer set may include a first low RI sub-layer and a second high RI sub-layer. For example, sub-layer set 131 includes a first low RI sub-layer 131A and a second high RI sub-layer 131B. In some embodiments, the optical interference layer may include a plurality of sub-layer sets such that the first low RI sub-layer (designated for illustration as "L") and the second high RI sub-layer (designated for illustration as "H") may be provide the following sequence of sub-layers: L/H/L/H or H/L/H/L, such that the first low RI sub-layer and the second high RI sub-layer appear to alternate along the physical thickness of the optical interference layer. In the example in FIG. 6, the optical interference layer 130 includes three sub-layer sets. In some embodiments, the optical interference layer 130 may include up to 10 sub-layer sets. For example, the optical interference layer 130 may include from about 2 to about 12 sub-layer sets, from about 3 to about 8 sub-layer sets, from about 3 to about 6 sub-layer sets.

In some embodiments, the optical interference layer may include one or more third sub-layers. The third sub-layer(s) may have a low RI, a high RI or a medium RI. In some embodiments, the third sub-layer(s) may have the same RI as the first low RI sub-layer 131A or the second high RI sub-layer 131B. In other embodiments, the third sub-layer(s) may have a medium RI that is between the RI of the first low RI sub-layer 131A and the RI of the second high RI sub-layer 131B. The third sub-layer(s) may be disposed between the plurality of sub-layer sets and the scratch-resistant layer 140 (see FIG. 12, 231C) or between the substrate and the plurality of sub-layer sets (see FIG. 12, 231D). Alternatively, the third sub-layer may be included in the plurality of sub-layer sets (not shown). The third sub-layer may be provided in the optical interference layer in the following exemplary configurations: $L_{third\ sub-layer}$/H/L/H/L; $H_{third\ sub-layer}$/L/H/L/H; L/H/L/H/$L_{third\ sub-layer}$; H/L/H/L/$H_{third\ sub-layer}$; $L_{third\ sub-layer}$/H/L/H/L/$H_{third\ sub-layer}$; $H_{third\ sub-layer}$/L/H/L/H/$L_{third\ sub-layer}$; $L_{third\ sub-layer}$/L/H/L/H; $H_{third\ sub-layer}$/H/L/H/L; H/L/H/L/$L_{third\ sub-layer}$; L/H/L/H/$H_{third\ sub-layer}$; $L_{third\ sub-layer}$/L/H/L/H/$H_{third\ sub-layer}$; $H_{third\ sub-layer}$//H/L/H/L/$L_{third\ sub-layer}$; L/M/H/L/M/H; H/M/L/H/M/L; M/L/H/L/M; and other combinations. In these configurations, "L" without any subscript refers to the first low RI sub-layer and "H" without any subscript refers to the second high RI sub-layer. Reference to "$L_{third\ sub-layer}$" refers to a third sub-layer having a low RI, "$H_{third\ sub-layer}$" refers to a third sub-layer having a high RI and "M" refers to a third sub-layer having a medium RI.

As used herein, the terms "low RI", "high RI" and "medium RI" refer to the relative values for the RI to another (e.g., low RI<medium RI<high RI). In one or more embodiments, the term "low RI" when used with the first low RI sub-layer or with the third sub-layer, includes a range from about 1.3 to about 1.7 (e.g., about 1.4 to about 1.6, or about 1.46). In one or more embodiments, the term "high RI" when used with the second high RI sub-layer or with the third sub-layer, includes a range from about 1.6 to about 2.5 (e.g., about 1.8 to about 2.1, or about 1.9 to about 2.0). In some embodiments, the term "medium RI" when used with the third sub-layer, includes a range from about 1.55 to about 1.8. In some instances, the ranges for low RI, high RI and medium RI may overlap; however, in most instances, the sub-layers of the optical interference layer have the general relationship regarding RI of: low RI<medium RI<high RI.

Exemplary materials suitable for use in the optical interference layer 130 include: $SiO_2$, $Al_2O_3$, $GeO_2$, SiO, $AlO_xN_y$, AlN, $Si_3N_4$, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in the first low RI sub-layer include $SiO_2$, $Al_2O_3$, $GeO_2$, SiO, $AlO_xN_y$, $SiO_xN_y$, $Si_uAl_vO_xN_y$, MgO, $MgF_2$, $BaF_2$, $CaF_2$, $DyF_3$, $YbF_3$, $YF_3$, and $CeF_3$. Some examples of suitable materials for use in the second high RI sub-layer include $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, and $MoO_3$.

In one or more embodiments at least one of the sub-layer(s) of the optical interference layer may include a specific optical thickness range. As used herein, the term "optical thickness" is determined by (n*d), where "n" refers to the RI of the sub-layer and "d" refers to the physical thickness of the sub-layer. In one or more embodiments, at least one of the sub-layers of the optical interference layer may include an optical thickness in the range from about 2 nm to about 200 nm, from about 10 nm to about 100 nm, or from about 15 nm to about 100 nm. In some embodiments, all of the sub-layers in the optical interference layer 130 may each have an optical thickness in the range from about 2 nm to about 200 nm, from about 10 nm to about 100 nm or from about 15 nm to about 100 nm. In some cases, at least one sub-layer of the optical interference layer 130 has an optical thickness of about 50 nm or greater. In some cases, each of the first low RI sub-layers have an optical thickness in the range from about 2 nm to about 200 nm, from about 10 nm to about 100 nm, or from about 15 nm to about 100 nm. In other cases, each of the second high RI sub-layers have an optical thickness in the range from about 2 nm to about 200 nm, from about 10 nm to about 100 nm, or from about 15 nm to about 100 nm. In yet other cases, each of the third sub-layers have an optical thickness in the range from about 2 nm to about 200 nm, from about 10 nm to about 100 nm, or from about 15 nm to about 100 nm.

In one or more embodiments, the optical interference layer 130 has a physical thickness of about 800 nm or less. The optical interference layer 130 may have a physical thickness in the range from about 10 nm to about 800 nm, from about 50 nm to about 800 nm, from about 100 nm to about 800 nm, from about 150 nm to about 800 nm, from about 200 nm to about 800 nm, from about 10 nm to about 750 nm, from about 10 nm to about 700 nm, from about 10 nm to about 650 nm, from about 10 nm to about 600 nm, from about 10 nm to about 550 nm, from about 10 nm to about 500 nm, from about 10 nm to about 450 nm, from about 10 nm to about 400 nm, from about 10 nm to about 350 nm, from about 10 nm to about 300 nm, from about 50 to about 300, from about 100 nm to about 200 nm, from about 125 nm to about 200 nm, from about 150 nm to about 190 nm, or from about 160 nm to about 180 nm, and all ranges and sub-ranges therebetween.

In some embodiments, the optical interference layer exhibits an average light reflectance of about 2% or less, 1.5% or less, 0.75% or less, 0.5% or less, 0.25% or less, 0.1% or less, or even 0.05% or less over the optical wavelength regime, when measured in an immersed state. As used herein, the phrase "immersed state" includes the measurement of the average reflectance by subtracting or otherwise removing reflections created by the article at interfaces other than those involving the optical interference layer. In some instances, the optical interference layer may exhibit such average light reflectance over other wavelength ranges such as from about 450 nm to about 650 nm, from about 420 nm to about 680 nm, from about 420 nm to about 740 nm, from about 420 nm to about 850 nm, or from about 420 nm to about 950 nm. In some embodiments, the optical interference layer exhibits an average light transmission of about 90% or greater, 92% or greater, 94% or greater, 96% or greater, or 98% or greater, over the optical wavelength regime.

The optical interference layer 130 of the embodiments described herein may be distinguished from layers that have a monotonic refractive index gradient. Articles that include the optical interference layer 130 between a scratch-resistant layer 140 and the substrate 110 exhibit improved optical performance (e.g., high average light transmission, low average light reflectance, low color shift as described herein), while reducing the physical thickness of the optical film 120. Monotonic refractive index gradient layers provide similar optical properties but may require greater physical thicknesses.

The scratch-resistant layer 140 of one or more embodiments may include an inorganic carbide, nitride, oxide, diamond-like material, or combination of these. Examples of suitable materials for the scratch-resistant layer 140 include metal oxides, metal nitrides, metal oxynitride, metal carbides, metal oxycarbides, and/or combinations thereof combination thereof. Exemplary metals include B, Al, Si, Ti, V, Cr, Y, Zr, Nb, Mo, Sn, Hf, Ta and W. Specific examples of materials that may be utilized in the scratch-resistant layer 140 may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof.

The scratch resistant layer may also comprise nanocomposite materials, or materials with a controlled microstructure to improve hardness, toughness, or abrasion/wear resistance. For example the scratch resistant layer may comprise nanocrystallites in the size range from about 5 nm to about 30 nm. In embodiments, the scratch resistant layer may comprise transformation-toughened zirconia, partially stabilized zirconia, or zirconia-toughened alumina. In embodiments, the scratch-resistant layer exhibits a fracture toughness value greater than about 1 MPa√m and simultaneously exhibits a hardness value greater than about 8 GPa, as measured by the Berkovich Indenter Hardness Test.

The composition of the scratch-resistant layer 140 may be modified to provide specific properties (e.g., hardness, refractive index etc.). In one or more embodiments, the scratch resistant layer may include AlOxNy that includes up to about 60 atomic % aluminum, up to about 20 atomic % oxygen and up to about 40 atomic % nitrogen. In some embodiments, the AlOxNy material may include silicon. In some embodiments, the AlOxNy material may include aluminum in an amount in the range from about 45 atomic % to about 55 atomic % (e.g., about 50 atomic %), oxygen in an amount in the range from about 12 atomic % to about 20 atomic % (e.g., about 15 atomic % to about 17 atomic %), and nitrogen in an amount in the range from about 30 atomic % to about 35 atomic % (e.g., about 32 atomic % or about 33 atomic %).

In some instances the amount of oxygen in the scratch resistant layer may be controlled to form larger crystal sizes or smaller crystal sizes. In other words, the amount of oxygen may be modified to provide a desired crystallinity and/or crystal size (or size range) of the scratch resistant layer. The amount of nitrogen may be controlled to provide a desired hardness, as measured by the Berkovich Indenter Hardness Test. An increased amount of nitrogen relative to oxygen may provide a scratch resistant layer and thus an article including the same, which exhibits higher hardness than such a layer or article that includes less nitrogen relative to the amount of oxygen. Moreover, the amount of nitrogen to oxygen may alter the refractive index and thus may influence the transmittance and color shift of the article.

In one or more embodiments, the scratch-resistant layer 140 exhibits a hardness in the range from about 5 GPa to about 30 GPa as measured by the Berkovich Indenter Hardness Test (measured from the major surface of the scratch-resistant layer). In one or more embodiments, the scratch-resistant layer 140 exhibits a hardness in the range from about 6 GPa to about 30 GPa, from about 7 GPa to about 30 GPa, from about 8 GPa to about 30 GPa, from about 9 GPa to about 30 GPa, from about 10 GPa to about 30 GPa, from about 12 GPa to about 30 GPa, from about 5 GPa to about 28 GPa, from about 5 GPa to about 26 GPa, from about 5 GPa to about 24 GPa, from about 5 GPa to about 22 GPa, from about 5 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween. In one or more embodiments, the scratch-resistant layer 140 may exhibit a hardness that is greater than 15 GPa, greater than 20 GPa, or greater than 25 GPa. In one or more embodiments, the scratch-resistant layer exhibits a hardness in the range from about 15 GPa to about 150 GPa, from about 15 GPa to about 100 GPa, or from about 18 GPa to about 100 GPa. These hardness values may be present at indentation depths of about 50 nm or greater, or about 100 nm or greater (e.g., in the range from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

The physical thickness of the scratch-resistant layer 140 may be in the range from about 1.5 µm to about 3 µm. In some embodiments, the physical thickness of the scratch-resistant layer 140 may be in the range from about 1.5 µm to about 3 µm, from about 1.5 µm to about 2.8 µm, from about 1.5 µm to about 2.6 µm, from about 1.5 µm to about 2.4 µm, from about 1.5 µm to about 2.2 µm, from about 1.5 µm to about 2 µm, from about 1.6 µm to about 3 µm, from about 1.7 µm to about 3 µm, from about 1.8 µm to about 3 µm, from about 1.9 µm to about 3 µm, from about 2 µm to about 3 µm, from about 2.1 µm to about 3 µm, from about 2.2 µm to about 3 µm, from about 2.3 µm to about 3 µm, and all ranges and sub-ranges therebetween. In some embodiments, the physical thickness of the scratch-resistant layer 140 may be in the range from about 0.1 µm to about 2 µm, or from about 0.1 µm to about 1 µm, or from 0.2 µm to about 1 µm.

In one or more embodiments, the scratch-resistant layer 140 has a refractive index of about 1.6 or greater. In some instances, the refractive index of the scratch-resistant layer 140 may be about 1.65 or greater, 1.7 or greater, 1.8 or greater, 1.9 or greater, 2 or greater, or 2.1 or greater (e.g., in the range from about 1.8 to about 2.1, or from about 1.9 to about 2.0). The scratch-resistant layer may have a refractive index that is greater than the refractive index of the substrate 110. In specific embodiments, the scratch-resistant layer has a refractive index that is about 0.05 index units greater or about 0.2 index units greater than the refractive index of the substrate, when measured at a wavelength of about 550 nm.

The capping layer 150 of one or more embodiments may include a low refractive index material, such as $SiO_2$, $Al_2O_3$, $GeO_2$, SiO, $AlO_xN_y$, $SiO_xN_y$, $Si_uAl_vO_xN_y$, MgO, $MgF_2$, $BaF_2$, $CaF_2$, $DyF_3$, $YbF_3$, $YF_3$, and $CeF_3$ and other such materials. The physical thickness of the capping layer may be in the range from about 0 to about 100 nm, from about 0.1 nm to about 50 nm, from about 1 nm to about 50 nm, from about 5 nm to about 50 nm, from about 10 nm to about 50 nm, from about 0 nm to about 40, from about 0 nm to about 30, from about 0 nm to about 20 nm, from about 0 nm to about 10 nm, from about 0.1 nm to about 15 nm, from about 0.1 nm to about 12 nm, from about 0.1 nm to about 10 nm, from about 0.1 nm to about 8 nm, from about 4 nm to about 30 nm, from about 4 nm to about 20 nm, from about 8 nm to about 12 nm, from about 9 nm to about 10 nm, and all ranges and sub-ranges therebetween. The refractive index of the capping layer may be in the range from about 1.4 to about 1.6 (e.g., about 1.46). The capping layer may exhibit an intrinsic hardness in the range from about 7 GPa to about 10 GPa, as measured by the Berkovich Indenter Hardness Test (as measured on the surface of a layer of the same material of the capping layer, formed in the same manner, but having a thickness of about 1 micrometer or greater).

In one or more embodiments, the article has a refractive index of about 1.7 or greater at the coated surface 101, which may include the capping layer. The capping layer 150 may formed using silane-based low-friction materials, including fluorosilane, alkyl silane, silsesquioxane, and the like, either by liquid deposition or vapor deposition methods. In one or more embodiments, the capping layer may comprise two or more materials or two or more sub-layers (e.g., 4 sub-layers or 6 sub-layers). The capping layer may provide an anti-reflective function especially where multiple sub-layers are utilized. The sub-layers may include different refractive indices and may include layers with high refractive indices (H) and low refractive indices (L) where "high" and "low" are with respect to one another and within known ranges for anti-reflective films. The sub-layers may be arranged so that high and low refractive index sub-layers alternate. The materials or sub-layers can include, for example $SiO_2$ or $SiO_xN_y$. In such embodiments, the one or more sub-layers can have a thickness each or combined in the range from about 4 nm to about 50 nm. In some embodiments, the capping layer 150 may include a silane-based low-friction sub-layer having a thickness in the range from about 0.1 nm to about 20 nm, disposed on underlying sub-layers of the capping layer (e.g., the $SiO_2$ and/or $SiO_xN_y$ layer(s)).

In some embodiments, the optical interference layer 130 may also comprise a crack mitigating layer. This crack mitigating layer may suppress or prevent crack bridging between the scratch resistant layer 140 and the substrate 110, thus modifying or improving the mechanical properties or strength of the article. Embodiments of crack mitigating layers are further described in U.S. patent application Ser. Nos. 14/052,055, 14/053,093 and 14/053,139, which are incorporated herein by reference. The crack mitigating layer may comprise crack blunting materials, crack deflecting materials, crack arresting materials, tough materials, or controlled-adhesion interfaces. The crack mitigating layer may comprise polymeric materials, nanoporous materials, metal oxides, metal fluorides, metallic materials, or other materials mentioned herein for use in either the optical interference layer 130 or the scratch resistant layer 140. The structure of the crack mitigating layer may be a multilayer structure, wherein the multilayer structure is designed to deflect, suppress, or prevent crack propagation while simultaneously providing the optical interference benefits described herein. The crack mitigating layer may include nanocrystallites, nanocomposite materials, transformation toughened materials, multiple layers of organic material, multiple layers of inorganic material, multiple layers of interdigitating organic and inorganic materials, or hybrid organic-inorganic materials. The crack mitigating layer may have a strain to failure that is greater than about 2%, or greater than about 10%. These crack mitigating layers can also be combined separately with the substrate, scratch resistant layer, and optical interference layer(s) described herein; it is not strictly required that the crack mitigating layer is simultaneously acting as an optical interference layer. In embodiments, the crack mitigating layer can perform its function in the presence or in the absence of an optical interference layer (and vice versa). The design of the optical interference layer can be adjusted, if needed, to accommodate the presence of a crack mitigating layer.

The crack mitigating layer may include tough or nanostructured inorganics, for example, zinc oxide, certain Al alloys, Cu alloys, steels, or stabilized tetragonal zirconia (including transformation toughened, partially stabilized, yttria stabilized, ceria stabilized, calcia stabilized, and magnesia stabilized zirconia); zirconia-toughened ceramics (including zirconia toughened alumina); ceramic-ceramic composites; carbon-ceramic composites; fiber- or whisker-reinforced ceramics or glass-ceramics (for example, SiC or $Si_3N_4$ fiber- or whisker-reinforced ceramics); metal-ceramic composites; porous or non-porous hybrid organic-inorganic materials, for example, nanocomposites, polymer-ceramic composites, polymer-glass composites, fiber-reinforced polymers, carbon-nanotube- or graphene-ceramic composites, silsesquioxanes, polysilsesquioxanes, or "ORMOSILs" (organically modified silica or silicate), and/or a variety of porous or non-porous polymeric materials, for example siloxanes, polysiloxanes, polyacrylates, polyacrylics, PI (polyimides), fluorinated polyimide, polyamides, PAI (polyamideimides), polycarbonates, polysulfones, PSU or PPSU (polyarylsulfones), fluoropolymers, fluoroelastomers, lactams, polycylic olefins, and similar materials, including, but not limited to PDMS (polydimethylsiloxane), PMMA (poly(methyl methacrylate)), BCB (benzocyclobutene), PEI (polyethyletherimide), poly(arylene ethers) such as PEEK (poly-ether-ether-ketone), PES (polyethersulfone) and PAR (polyarylate), PET (polyethylene terephthalate), PEN (polyethylene napthalate=poly(ethylene-2,6-napthalene dicarboxylate), FEP (fluorinated ethylene propylene), PTFE (polytetrafluoroethylene), PFA (perfluroalkoxy polymer, e.g., trade names Teflon®, Neoflon®) and similar materials. Other suitable materials include modified polycarbonates, some versions of epoxies, cyanate esters, PPS (polyphenylsulfides), polyphenylenes, polypyrrolones, polyquinoxalines, and bismaleimides.

The physical and/or optical thicknesses of the layers of the optical film 120 can be adjusted to achieve desired optical and mechanical properties (e.g., hardness). For example, the scratch-resistant layer 140 may be can be made thinner, for example in the range from about 100 nm to about 500 nm, while still providing some resistance to scratch, abrasion, or damage events (including drop events of the article onto hard surfaces such as asphalt, cement, or sandpaper). The capping layer physical and/or optical thickness can also be adjusted. The capping layer may be included when even lower total reflection is desired. The capping layer may also be included to further tune color of the article. For example, the optical films described herein minimize color shift with changing incidence illumination angle in a* or b* coordinates, but may also exhibit a slight slope to the reflectance spectra. A capping layer 150 may be included in the optical film 120 and the physical and/or optical thickness of the capping layer may be adjusted slightly (e.g., from about 10 nm to about 14 nm) to provide an even flatter reflectance spectrum (or a reflectance spectrum with oscillations having even smaller amplitudes) across the optical wavelength regime.

The optical film 120 may be formed using various deposition methods such as vacuum deposition techniques, for example, chemical vapor deposition (e.g., plasma enhanced chemical vapor deposition, low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. One or more layers of the optical film 120 may include nano-pores or mixed-materials to provide specific refractive index ranges or values.

The physical thicknesses of the layers or sub-layers of the optical film 120 may vary by less than about 10 nm, less than about 5 nm, less than about 1 nm or less than about 0.5 nm (representing the range of six standard deviations from the target value) to achieve the maximum targeted repeatability (e.g., a* and b* variations no greater than +/−0.2 for reflected F2 illumination). In some embodiments, larger variations in physical thicknesses of the layers can be tolerated while still achieving the desired targets of the invention for some applications (e.g., a* and b* variations no greater than +/−2.0 for reflected F2 illumination).

High-angle optical performance may be improved in some embodiments by adding additional layers to the optical film 120 and/or the article 100. In some cases, these additional layers can extend the wavelengths at which the reflectance spectrum has low amplitude oscillations (e.g., into the near-IR wavelengths, such as to 800 nm, 900 nm, or even 1000 nm). This leads to lower oscillations and lower color at high incidence angles, because generally the entire reflectance spectra of the article shifts to shorter wavelengths at higher light incidence angles. In some cases, this extended-band performance can be achieved by adjusting the interference layer design, for example by allowing a higher oscillation amplitude to achieve a wider-wavelength-band of low oscillations, without necessarily adding more layers. This extended-band or wide-wavelength-band of low oscillations (correlated to an extended band of low reflectance for the interference layers) can also be useful in making the article tolerant to deposition non-uniformity, substrate curvature, substrate sculpting, or substrate shaping which causes shadowing during directional deposition processes, or other geometry factors that cause a substantially uniform relative shift in all layer thicknesses relative to the typically ideal target thicknesses.

The optical film of one or more embodiments may include or exhibit a sensing function or include or exhibit one or more properties enabling sensing. As used herein, sensing may include optical sensing, electrical sensing, magnetic sensing, mechanical sensing or a combination thereof. The sensing function may include capacitive sensing, resistive sensing, inductive sensing, surface acoustic wave sensing, photoelectric sensing, or other known sensing functions. In one or more embodiments, a portion of the optical film (e.g., a single or select layer(s)) may exhibit such sensing function or one or more properties enabling sensing. In one embodiment, the optical film or portion thereof may exhibit piezoelectric properties, pyro-electric properties or a combination thereof. In some embodiments, the optical film may exhibit piezoelectric properties but be essentially free of pyro-electric properties and vice versa. One or more piezoelectric layers within the optical film may comprise crystalline or polycrystalline material, and may also exhibit the hardness described herein and/or a low optical absorption (and/or high optical transparency). In some embodiments, the piezoelectric properties may be present in one or more aluminum nitride or oxygen-doped aluminum nitride layers within the optical film. In some embodiments, such optical films may sense a magnitude of force or pressure, sense acoustic signals, and/or sense acceleration. Such embodiments may be described as having an optical film including a sensor or sensor layer. The optical film may include or may be used with one or more electrically conducting layers, transparent conductor layers (i.e. optically transparent and electrically conducting layers) and/or optical waveguiding layers to perform such sensing functions. The optical film may be coupled to a signal detector, electrode, or signal processor in order to capture, store, or interpret the output of the sensing function.

The articles disclosed herein may include articles with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof.

EXAMPLES

Various embodiments will be further clarified by the following examples. Examples 1-9 used modeling to understand the reflectance spectra and color shift of articles that included an optical film with an optical interference layer, a scratch-resistant layer and a capping layer. The modeling was based on collected refractive index data from formed layers of various materials and a strengthened aluminoborosilicate ("ABS") glass substrate. Examples 10, 11, and Comparative Example 12 are experimentally fabricated multilayer working examples which further demonstrate the principles of modeling Examples 1-9.

The layers were formed by DC reactive sputtering, reactive DC and radio frequency (RF) sputtering, and e-beam evaporation onto silicon wafers. Some of the formed layers included $SiO_2$, $Nb_2O_5$, or $Al_2O_3$ and were deposited onto silicon wafers by DC reactive sputtering from a silicon, niobium or aluminum target (respectively) at a temperature of about 50° C. using ion assist. Layers formed in this manner are designated with the indicator "RS". Other layers including $SiO_2$ were deposited onto silicon wafers by e-beam evaporation by heating the wafer to 300° C. and without ion assist. Such layers are designated with the indicator "E". Layers of $Ta_2O_5$ were deposited onto silicon wafers by e-beam evaporation by heating the wafer to 300° C. and without ion assist.

Layers of $Si_uAl_vO_xN_y$ were deposited onto silicon wafers by DC reactive sputtering combined with RF superimposed DC sputtering, with ion assist using a sputter deposition tool supplied by AJA-Industries. The wafer was heated to 200° C. during deposition and silicon targets having a 3 inch diameter and an aluminum targets having a 3 inch diameter were used. Reactive gases used included nitrogen and oxygen and argon was used as the inert gas. The RF power was supplied to the silicon target at 13.56 Mhz and DC power was supplied to the aluminum target. The resulting $Si_uAl_vO_xN_y$ layers had a refractive index at 550 nm of about 1.95 and a measured hardness of greater than about 15 GPa, using a Berkovich indenter on the surface of the $Si_uAl_vO_xN_y$ layer being tested, as described herein.

The refractive indices (as a function of wavelength) of the formed layers of the optical film and the glass substrates were measured using spectroscopic ellipsometry. Tables 1-7 include the refractive indices and dispersion curves measured. The refractive indices thus measured were then used to calculate reflectance spectra and angular color shift for the various modeled Examples.

TABLE 1

Refractive indices and dispersion curve
for a RS-SiO2 layer vs. wavelength.
Material SiO2-RS

| Wavelength (nm) | Refractive Index (n) | Extinction Coefficient (k) |
|---|---|---|
| 246.5 | 1.52857 | 0.0 |
| 275.2 | 1.51357 | 0.0 |
| 300.8 | 1.50335 | 0.0 |
| 324.7 | 1.49571 | 0.0 |
| 350.2 | 1.48911 | 0.0 |
| 375.8 | 1.48374 | 0.0 |
| 399.7 | 1.47956 | 0.0 |
| 425.2 | 1.47583 | 0.0 |
| 450.7 | 1.47269 | 0.0 |
| 476.3 | 1.47002 | 0.0 |
| 500.2 | 1.46788 | 0.0 |
| 525.7 | 1.46589 | 0.0 |
| 549.5 | 1.46427 | 0.0 |
| 575.0 | 1.46276 | 0.0 |
| 600.5 | 1.46143 | 0.0 |
| 625.9 | 1.46026 | 0.0 |
| 649.7 | 1.45928 | 0.0 |
| 675.1 | 1.45835 | 0.0 |
| 700.5 | 1.45751 | 0.0 |
| 725.9 | 1.45676 | 0.0 |
| 751.3 | 1.45609 | 0.0 |
| 775.0 | 1.45551 | 0.0 |
| 800.4 | 1.45496 | 0.0 |
| 850.9 | 1.45399 | 0.0 |
| 899.8 | 1.45320 | 0.0 |
| 950.2 | 1.45252 | 0.0 |
| 999.0 | 1.45195 | 0.0 |
| 1100.0 | 1.45100 | 0.0 |
| 1199.6 | 1.45028 | 0.0 |
| 1302.0 | 1.44971 | 0.0 |
| 1400.8 | 1.44928 | 0.0 |
| 1499.7 | 1.44892 | 0.0 |
| 1599.0 | 1.44863 | 0.0 |
| 1688.4 | 1.44841 | 0.0 |

TABLE 2

Refractive indices and dispersion curve
for a $Si_uAl_vO_xN_y$ layer vs. wavelength.
Material SiAlON-195

| Wavelength (nm) | Refractive Index (n) | Extinction Coefficient (k) |
|---|---|---|
| 206.6 | 2.37659 | 0.21495 |
| 225.4 | 2.28524 | 0.11270 |
| 251.0 | 2.18818 | 0.04322 |
| 275.5 | 2.12017 | 0.01310 |
| 300.9 | 2.06916 | 0.00128 |

TABLE 2-continued

Refractive indices and dispersion curve
for a $Si_uAl_vO_xN_y$ layer vs. wavelength.
Material SiAlON-195

| Wavelength (nm) | Refractive Index (n) | Extinction Coefficient (k) |
|---|---|---|
| 324.6 | 2.03698 | 0.0 |
| 350.2 | 2.01423 | 0.0 |
| 360.4 | 2.00718 | 0.0 |
| 371.2 | 2.00059 | 0.0 |
| 380.3 | 1.99562 | 0.0 |
| 389.9 | 1.99090 | 0.0 |
| 400.0 | 1.98640 | 0.0 |
| 410.5 | 1.98213 | 0.0 |
| 421.7 | 1.97806 | 0.0 |
| 430.5 | 1.97513 | 0.0 |
| 439.7 | 1.97230 | 0.0 |
| 449.2 | 1.96958 | 0.0 |
| 459.2 | 1.96695 | 0.0 |
| 469.6 | 1.96441 | 0.0 |
| 480.6 | 1.96197 | 0.0 |
| 492.0 | 1.95961 | 0.0 |
| 499.9 | 1.95808 | 0.0 |
| 512.3 | 1.95586 | 0.0 |
| 520.9 | 1.95442 | 0.0 |
| 529.9 | 1.95301 | 0.0 |
| 539.1 | 1.95165 | 0.0 |
| 548.6 | 1.95031 | 0.0 |
| 558.5 | 1.94900 | 0.0 |
| 568.7 | 1.94773 | 0.0 |
| 579.4 | 1.94649 | 0.0 |
| 590.4 | 1.94528 | 0.0 |
| 601.9 | 1.94410 | 0.0 |
| 613.8 | 1.94295 | 0.0 |
| 619.9 | 1.94239 | 0.0 |
| 632.6 | 1.94128 | 0.0 |
| 639.1 | 1.94074 | 0.0 |
| 652.6 | 1.93968 | 0.0 |
| 666.6 | 1.93864 | 0.0 |
| 681.2 | 1.93763 | 0.0 |
| 696.5 | 1.93665 | 0.0 |
| 712.6 | 1.93569 | 0.0 |
| 729.3 | 1.93477 | 0.0 |
| 746.9 | 1.93386 | 0.0 |
| 765.3 | 1.93299 | 0.0 |
| 784.7 | 1.93214 | 0.0 |
| 805.1 | 1.93131 | 0.0 |
| 826.6 | 1.93051 | 0.0 |
| 849.2 | 1.92973 | 0.0 |
| 873.1 | 1.92898 | 0.0 |
| 898.4 | 1.92825 | 0.0 |
| 925.3 | 1.92754 | 0.0 |
| 953.7 | 1.92686 | 0.0 |
| 999.9 | 1.92587 | 0.0 |
| 1050.7 | 1.92494 | 0.0 |
| 1107.0 | 1.92406 | 0.0 |
| 1169.7 | 1.92323 | 0.0 |
| 1239.8 | 1.92245 | 0.0 |
| 1319.0 | 1.92172 | 0.0 |
| 1408.9 | 1.92103 | 0.0 |
| 1512.0 | 1.92040 | 0.0 |
| 1631.4 | 1.91981 | 0.0 |
| 1771.2 | 1.91926 | 0.0 |
| 1999.8 | 1.91861 | 0.0 |

TABLE 3

Refractive indices and dispersion curve for a strengthened
aluminoborosilicate glass substrate vs. wavelength.
Material ABS glass

| Wavelength (nm) | Refractive Index (n) | Extinction Coefficient (k) |
|---|---|---|
| 350.6 | 1.53119 | 0.0 |
| 360.7 | 1.52834 | 0.0 |
| 370.8 | 1.52633 | 0.0 |
| 380.8 | 1.52438 | 0.0 |
| 390.9 | 1.52267 | 0.0 |
| 400.9 | 1.52135 | 0.0 |
| 411.0 | 1.52034 | 0.0 |
| 421.0 | 1.51910 | 0.0 |
| 431.1 | 1.51781 | 0.0 |
| 441.1 | 1.51686 | 0.0 |
| 451.2 | 1.51600 | 0.0 |
| 461.2 | 1.51515 | 0.0 |
| 471.2 | 1.51431 | 0.0 |
| 481.3 | 1.51380 | 0.0 |
| 491.3 | 1.51327 | 0.0 |
| 501.3 | 1.51259 | 0.0 |
| 511.4 | 1.51175 | 0.0 |
| 521.4 | 1.51124 | 0.0 |
| 531.4 | 1.51082 | 0.0 |
| 541.5 | 1.51040 | 0.0 |
| 551.5 | 1.50999 | 0.0 |
| 561.5 | 1.50959 | 0.0 |
| 571.5 | 1.50918 | 0.0 |
| 581.6 | 1.50876 | 0.0 |
| 591.6 | 1.50844 | 0.0 |
| 601.6 | 1.50828 | 0.0 |
| 611.6 | 1.50789 | 0.0 |
| 621.7 | 1.50747 | 0.0 |
| 631.7 | 1.50707 | 0.0 |
| 641.7 | 1.50667 | 0.0 |
| 651.7 | 1.50629 | 0.0 |
| 661.7 | 1.50591 | 0.0 |
| 671.8 | 1.50555 | 0.0 |
| 681.8 | 1.50519 | 0.0 |
| 691.8 | 1.50482 | 0.0 |
| 701.8 | 1.50445 | 0.0 |
| 709.8 | 1.50449 | 0.0 |
| 719.8 | 1.50456 | 0.0 |
| 729.9 | 1.50470 | 0.0 |
| 739.9 | 1.50484 | 0.0 |
| 749.9 | 1.50491 | 0.0 |

TABLE 4

Refractive indices and dispersion curve
for a RS-$Al_2O_3$ layer vs. wavelength.
Material Al2O3-RS

| Wavelength (nm) | Refractive Index (n) | Extinction Coefficient (k) |
|---|---|---|
| 251.3 | 1.76256 | 0.0 |
| 275.2 | 1.74075 | 0.0 |
| 300.8 | 1.72358 | 0.0 |
| 324.7 | 1.71136 | 0.0 |
| 350.2 | 1.70121 | 0.0 |
| 375.8 | 1.69321 | 0.0 |
| 401.3 | 1.68679 | 0.0 |
| 425.2 | 1.68185 | 0.0 |
| 450.7 | 1.67747 | 0.0 |
| 474.7 | 1.67402 | 0.0 |
| 500.2 | 1.67089 | 0.0 |
| 525.7 | 1.66823 | 0.0 |
| 549.5 | 1.66608 | 0.0 |
| 575.0 | 1.66408 | 0.0 |
| 600.5 | 1.66234 | 0.0 |
| 625.9 | 1.66082 | 0.0 |
| 649.7 | 1.65955 | 0.0 |
| 675.1 | 1.65835 | 0.0 |
| 700.5 | 1.65728 | 0.0 |
| 725.9 | 1.65633 | 0.0 |
| 749.7 | 1.65552 | 0.0 |

TABLE 4-continued

Refractive indices and dispersion curve
for a RS-Al₂O₃ layer vs. wavelength.
Material Al2O3-RS

| Wavelength (nm) | Refractive Index (n) | Extinction Coefficient (k) |
|---|---|---|
| 775.0 | 1.65474 | 0.0 |
| 800.4 | 1.65404 | 0.0 |
| 850.9 | 1.65282 | 0.0 |
| 899.8 | 1.65184 | 0.0 |
| 950.2 | 1.65098 | 0.0 |
| 999.0 | 1.65027 | 0.0 |
| 1100.0 | 1.64909 | 0.0 |
| 1199.6 | 1.64821 | 0.0 |
| 1302.0 | 1.64751 | 0.0 |
| 1400.8 | 1.64698 | 0.0 |
| 1499.7 | 1.64654 | 0.0 |
| 1599.0 | 1.64619 | 0.0 |
| 1688.4 | 1.64592 | 0.0 |

TABLE 5

Refractive indices and dispersion curve
for an E-Ta₂O₅ layer vs. wavelength.
Material Ta2O5-E

| Wavelength (nm) | Refractive Index (n) | Extinction Coefficient (k) |
|---|---|---|
| 299.5 | 2.31978 | 0.01588 |
| 310.0 | 2.27183 | 0.00049 |
| 319.5 | 2.23697 | 0.0 |
| 329.7 | 2.20688 | 0.0 |
| 340.6 | 2.18080 | 0.0 |
| 350.2 | 2.16164 | 0.0 |
| 360.4 | 2.14448 | 0.0 |
| 369.0 | 2.13201 | 0.0 |
| 380.3 | 2.11780 | 0.0 |
| 389.9 | 2.10741 | 0.0 |
| 399.9 | 2.09780 | 0.0 |
| 410.5 | 2.08888 | 0.0 |
| 421.7 | 2.08059 | 0.0 |
| 430.5 | 2.07475 | 0.0 |
| 439.7 | 2.06920 | 0.0 |
| 449.2 | 2.06394 | 0.0 |
| 459.2 | 2.05892 | 0.0 |
| 469.6 | 2.05415 | 0.0 |
| 480.6 | 2.04960 | 0.0 |
| 488.1 | 2.04669 | 0.0 |
| 499.9 | 2.04248 | 0.0 |
| 512.3 | 2.03846 | 0.0 |
| 520.9 | 2.03588 | 0.0 |
| 529.8 | 2.03337 | 0.0 |
| 539.1 | 2.03094 | 0.0 |
| 548.6 | 2.02857 | 0.0 |
| 558.5 | 2.02627 | 0.0 |
| 568.7 | 2.02403 | 0.0 |
| 579.4 | 2.02186 | 0.0 |
| 590.4 | 2.01974 | 0.0 |
| 601.9 | 2.01768 | 0.0 |
| 613.8 | 2.01567 | 0.0 |
| 619.9 | 2.01469 | 0.0 |
| 632.6 | 2.01276 | 0.0 |
| 645.8 | 2.01088 | 0.0 |
| 659.5 | 2.00905 | 0.0 |
| 673.8 | 2.00726 | 0.0 |
| 688.8 | 2.00552 | 0.0 |
| 704.5 | 2.00382 | 0.0 |
| 729.3 | 2.00135 | 0.0 |
| 746.9 | 1.99975 | 0.0 |
| 774.9 | 1.99743 | 0.0 |
| 805.1 | 1.99518 | 0.0 |
| 826.6 | 1.99372 | 0.0 |
| 849.2 | 1.99230 | 0.0 |
| 898.4 | 1.98955 | 0.0 |
| 953.7 | 1.98692 | 0.0 |
| 999.9 | 1.98502 | 0.0 |
| 1050.7 | 1.98318 | 0.0 |
| 1107.0 | 1.98140 | 0.0 |
| 1148.0 | 1.98024 | 0.0 |
| 1192.2 | 1.97910 | 0.0 |
| 1239.8 | 1.97799 | 0.0 |
| 1291.5 | 1.97690 | 0.0 |
| 1347.7 | 1.97584 | 0.0 |
| 1408.9 | 1.97479 | 0.0 |
| 1476.0 | 1.97376 | 0.0 |
| 1549.8 | 1.97276 | 0.0 |

TABLE 6

Refractive indices and dispersion curve
for an E-SiO₂ layer vs. wavelength.
Material SiO2-E

| Wavelength (nm) | Refractive Index (n) | Extinction Coefficient (k) |
|---|---|---|
| 299.5 | 1.48123 | 0.00296 |
| 310.0 | 1.47856 | 0.00283 |
| 319.5 | 1.47636 | 0.00273 |
| 329.7 | 1.47424 | 0.00262 |
| 340.6 | 1.47221 | 0.00252 |
| 350.2 | 1.47057 | 0.00244 |
| 360.4 | 1.46899 | 0.00236 |
| 369.0 | 1.46776 | 0.00229 |
| 380.3 | 1.46628 | 0.00221 |
| 389.9 | 1.46513 | 0.00215 |
| 399.9 | 1.46401 | 0.00209 |
| 410.5 | 1.46292 | 0.00203 |
| 421.7 | 1.46187 | 0.00197 |
| 430.5 | 1.46110 | 0.00192 |
| 439.7 | 1.46035 | 0.00188 |
| 449.2 | 1.45961 | 0.00183 |
| 459.2 | 1.45890 | 0.00179 |
| 469.6 | 1.45820 | 0.00174 |
| 480.6 | 1.45752 | 0.00170 |
| 488.1 | 1.45708 | 0.00167 |
| 499.9 | 1.45642 | 0.00163 |
| 512.3 | 1.45579 | 0.00158 |
| 520.9 | 1.45537 | 0.00156 |
| 529.8 | 1.45497 | 0.00153 |
| 539.1 | 1.45457 | 0.00150 |
| 548.6 | 1.45418 | 0.00147 |
| 558.5 | 1.45379 | 0.00144 |
| 568.7 | 1.45341 | 0.00142 |
| 579.4 | 1.45304 | 0.00139 |
| 590.4 | 1.45268 | 0.00136 |
| 601.9 | 1.45233 | 0.00133 |
| 613.8 | 1.45198 | 0.00131 |
| 619.9 | 1.45181 | 0.00129 |
| 632.6 | 1.45147 | 0.00126 |
| 639.1 | 1.45130 | 0.00125 |
| 652.5 | 1.45098 | 0.00122 |
| 659.5 | 1.45082 | 0.00121 |
| 673.8 | 1.45050 | 0.00118 |
| 681.2 | 1.45035 | 0.00117 |
| 688.8 | 1.45019 | 0.00116 |
| 704.5 | 1.44989 | 0.00113 |
| 720.8 | 1.44960 | 0.00110 |
| 746.9 | 1.44917 | 0.00106 |
| 774.9 | 1.44876 | 0.00102 |
| 805.1 | 1.44836 | 0.00098 |
| 826.6 | 1.44811 | 0.00096 |
| 849.2 | 1.44786 | 0.00093 |
| 898.4 | 1.44738 | 0.00088 |
| 953.7 | 1.44693 | 0.00083 |

TABLE 6-continued

Refractive indices and dispersion curve
for an E-SiO$_2$ layer vs. wavelength.
Material SiO2-E

| Wavelength (nm) | Refractive Index (n) | Extinction Coefficient (k) |
|---|---|---|
| 999.9 | 1.44661 | 0.00079 |
| 1050.7 | 1.44631 | 0.00075 |
| 1107.0 | 1.44602 | 0.00071 |
| 1148.0 | 1.44584 | 0.00068 |
| 1192.2 | 1.44566 | 0.00066 |
| 1239.8 | 1.44549 | 0.00063 |
| 1291.5 | 1.44533 | 0.00061 |
| 1347.7 | 1.44517 | 0.00058 |
| 1408.9 | 1.44502 | 0.00056 |
| 1476.0 | 1.44488 | 0.00053 |
| 1549.8 | 1.44474 | 0.00050 |

TABLE 7

Refractive indices and dispersion curve
for an RS-Nb$_2$O$_5$ layer vs. wavelength.
Material Nb2O5-RS

| Wavelength (nm) | Refractive Index (n) | Extinction Coefficient (k) |
|---|---|---|
| 206.6 | 2.04389 | 0.66079 |
| 250.0 | 2.32991 | 1.05691 |
| 300.2 | 3.14998 | 0.45732 |
| 325.0 | 2.94490 | 0.12012 |
| 350.2 | 2.74715 | 0.02027 |
| 375.1 | 2.62064 | 0.00048 |
| 400.6 | 2.53696 | 0.0 |
| 425.3 | 2.48169 | 0.0 |
| 450.0 | 2.44210 | 0.0 |
| 475.0 | 2.41223 | 0.0 |
| 500.9 | 2.38851 | 0.0 |
| 525.4 | 2.37086 | 0.0 |
| 549.8 | 2.35647 | 0.0 |
| 575.3 | 2.34409 | 0.0 |
| 600.4 | 2.33392 | 0.0 |
| 624.6 | 2.32557 | 0.0 |
| 650.8 | 2.31779 | 0.0 |
| 675.7 | 2.31142 | 0.0 |
| 700.5 | 2.30583 | 0.0 |
| 725.1 | 2.30093 | 0.0 |
| 749.1 | 2.29665 | 0.0 |
| 774.9 | 2.29255 | 0.0 |
| 799.9 | 2.28898 | 0.0 |
| 849.2 | 2.28288 | 0.0 |
| 901.7 | 2.27749 | 0.0 |
| 999.9 | 2.26958 | 0.0 |
| 1102.1 | 2.26342 | 0.0 |
| 1203.7 | 2.25867 | 0.0 |
| 1298.3 | 2.25513 | 0.0 |
| 1400.9 | 2.25198 | 0.0 |
| 1502.8 | 2.24939 | 0.0 |
| 1599.8 | 2.24730 | 0.0 |
| 1698.4 | 2.24567 | 0.0 |
| 1796.9 | 2.24389 | 0.0 |
| 1892.9 | 2.24254 | 0.0 |
| 1999.7 | 2.24122 | 0.0 |
| 2066.4 | 2.24047 | 0.0 |

Example 1

Modeled Example 1 included an article having the same structure as shown in FIG. 6. Modeled Example 1 included a chemically strengthened alkali aluminoborosilicate glass substrate and an optical film disposed on the substrate. The optical film included an optical interference layer with three sets of sub-layers, a scratch-resistant layer disposed on the optical interference layer and a capping layer disposed on the scratch-resistant layer. The optical film materials and thicknesses of each layer, in the order arranged in the optical film, are provided in Table 8.

TABLE 8

Optical film attributes for modeled Example 1.

| | Layer | Material | Modeled Physical Thickness |
|---|---|---|---|
| | Ambient medium | Air | Immersed |
| | Capping layer | RS-SiO$_2$ | 9.5 nm |
| | Scratch-resistant layer | Si$_u$Al$_v$O$_x$N$_y$ | 2000 nm |
| Optical inter- ference layer | 1$^{st}$ low RI sub-layer | RS-SiO$_2$ | 8.22 nm |
| | 2$^{nd}$ high RI sub-layer | Si$_u$Al$_v$O$_x$N$_y$ | 46.39 nm |
| | 1$^{st}$ low RI sub-layer | RS-SiO$_2$ | 29 nm |
| | 2$^{nd}$ high RI sub-layer | Si$_u$Al$_v$O$_x$N$_y$ | 27.87 nm |
| | 1$^{st}$ low RI sub-layer | RS-SiO$_2$ | 49.63 nm |
| | 2$^{nd}$ high RI sub-layer | Si$_u$Al$_v$O$_x$N$_y$ | 9.34 nm |
| | Substrate | ABS Glass | Immersed |

Figure 7:
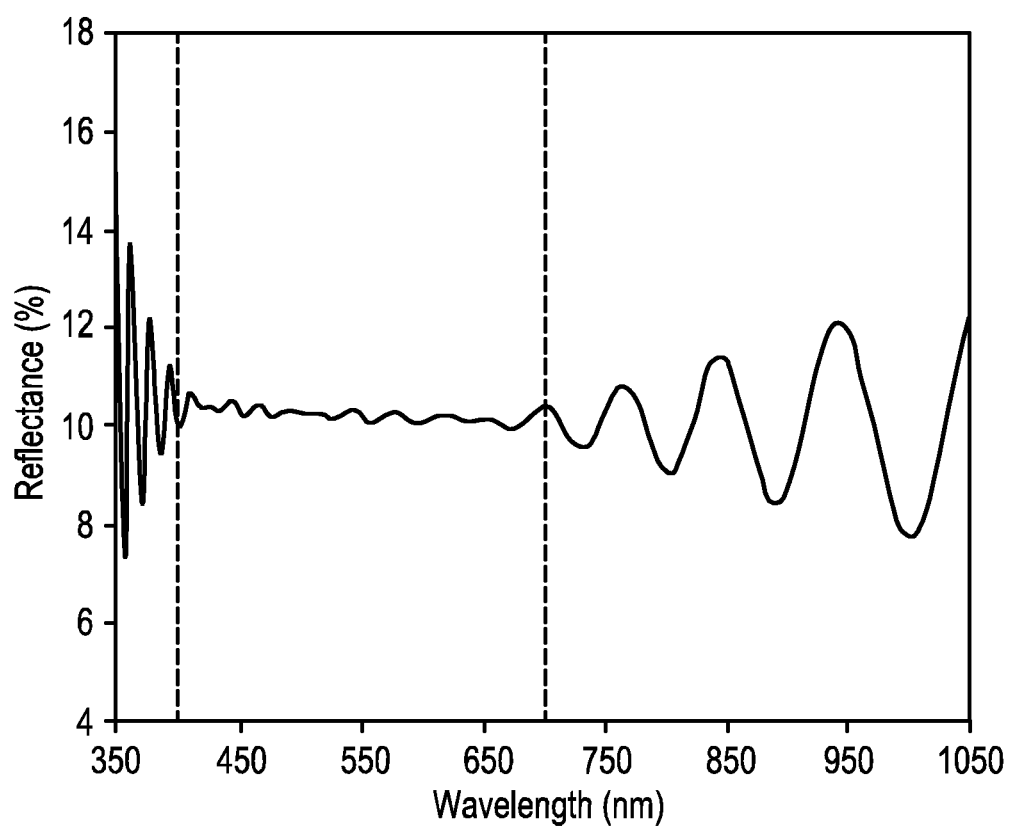
FIG. 7 is a calculated reflectance spectra for the article having an optical interference layer with three sub-layer sets, according to modeled Example 1.
Figure 8:
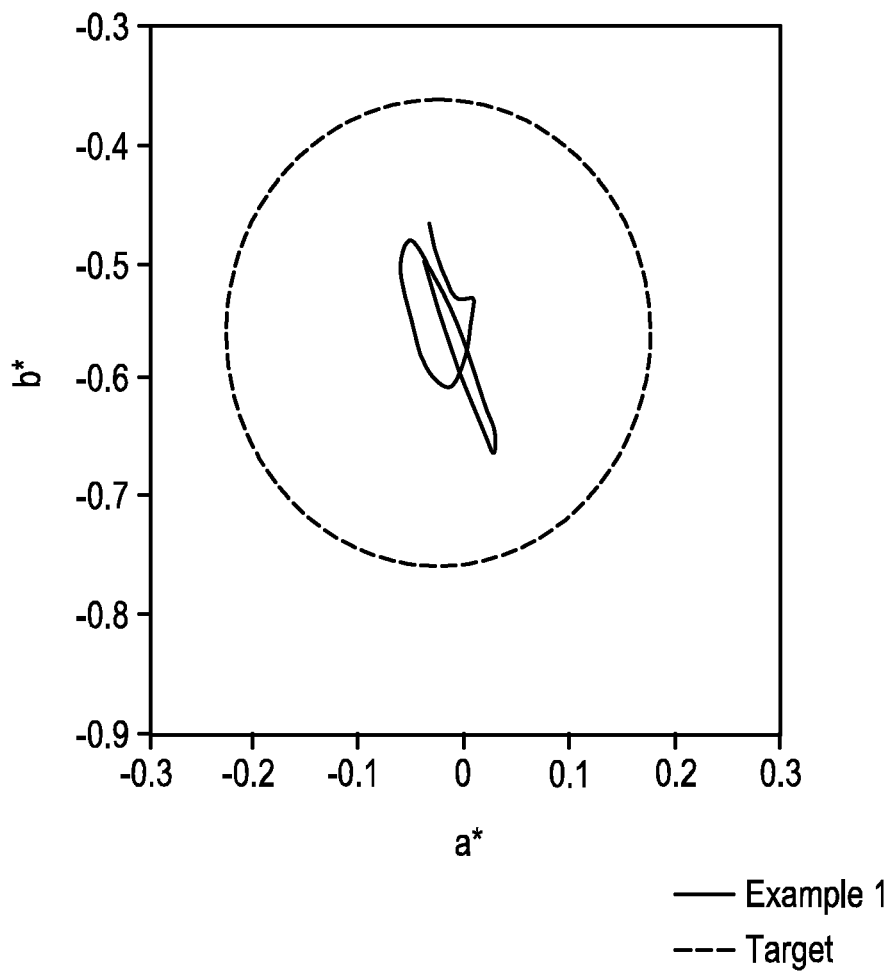
FIG. 8 is a graph showing the range of calculated a* and b* color shifts for modeled Example 1.

The calculated reflectance spectrum for modeled Example 1 is shown in FIG. 7. As shown in FIG. 7, the oscillations in the reflectance spectrum are small (i.e., less than about 0.5 percentage points over the optical wavelength regime), leading to relatively low calculated visible color shift for a 10 degree observer, over a range of incidence viewing angles from 60 degrees to normal incidence, under an F2 illuminant, as shown in FIG. 8. FIG. 7 shows a target having a radius of 0.2, centered on the color coordinates of the substrate without the optical film disposed thereon, under F2 illumination.

Example 2

Figure 9:
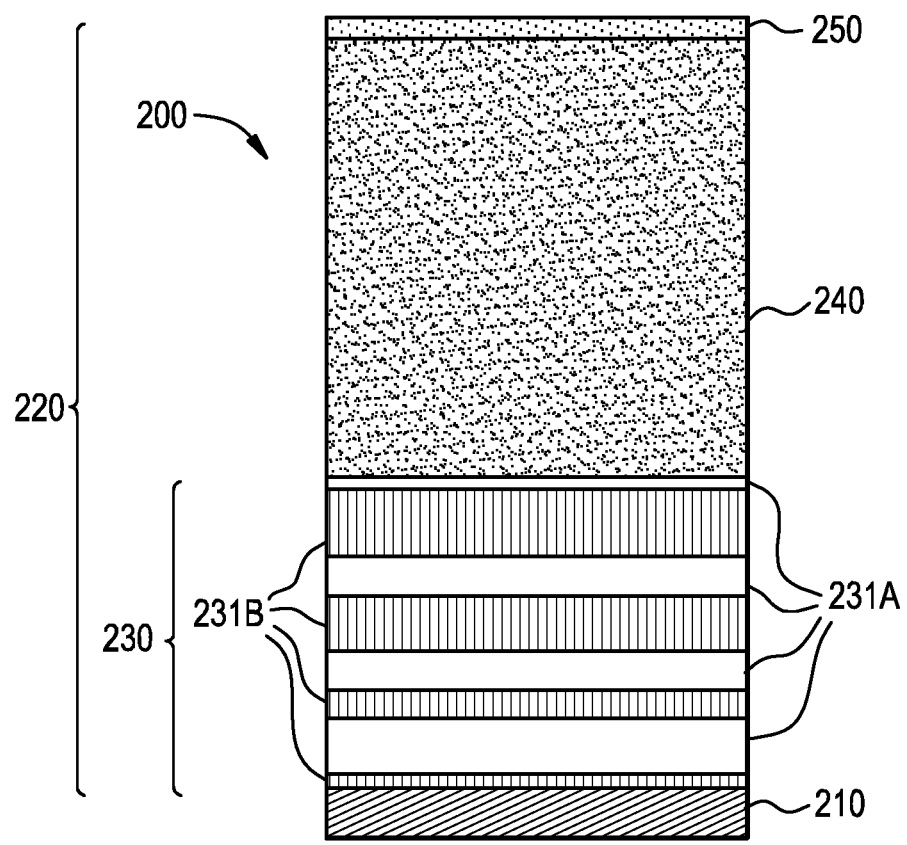
FIG. 9 is a schematic representation of the article according to modeled Example 2.

Modeled Example 2 included an article 200 with a chemically strengthened alkali aluminoborosilicate substrate 210 and an optical film 220 disposed on the substrate. The optical film 220 included an optical interference layer 230, a scratch-resistant layer 240 disposed on the optical interference layer, and a capping layer 250, as shown in FIG. 9. The optical interference layer 230 included four sets of sub-layers 231A, 231B. The optical film materials and thicknesses of each layer, in the order arranged in the optical film, are provided in Table 9.

TABLE 9

Optical film attributes for modeled Example 2.

| | Layer | Material | Modeled Thickness |
|---|---|---|---|
| | Ambient medium | Air | Immersed |
| | Capping layer | RS-SiO$_2$ | 9.5 nm |
| | Scratch-resistant layer | Si$_u$Al$_v$O$_x$N$_y$ | 2000 nm |
| Optical inter- ference layer | 1$^{st}$ low RI sub-layer | RS-SiO$_2$ | 4.83 nm |
| | 2$^{nd}$ high RI sub-layer | Si$_u$Al$_v$O$_x$N$_y$ | 53.16 nm |
| | 1$^{st}$ low RI sub-layer | RS-SiO$_2$ | 19.63 nm |
| | 2$^{nd}$ high RI sub-layer | Si$_u$Al$_v$O$_x$N$_y$ | 38.29 nm |
| | 1$^{st}$ low RI sub-layer | RS-SiO$_2$ | 40.97 nm |
| | 2$^{nd}$ high RI sub-layer | Si$_u$Al$_v$O$_x$N$_y$ | 21.73 nm |
| | 1$^{st}$ low RI sub-layer | RS-SiO$_2$ | 54.88 nm |
| | 2$^{nd}$ high RI sub-layer | Si$_u$Al$_v$O$_x$N$_y$ | 7.05 nm |
| | Substrate | ABS Glass | Immersed |

Figure 10:
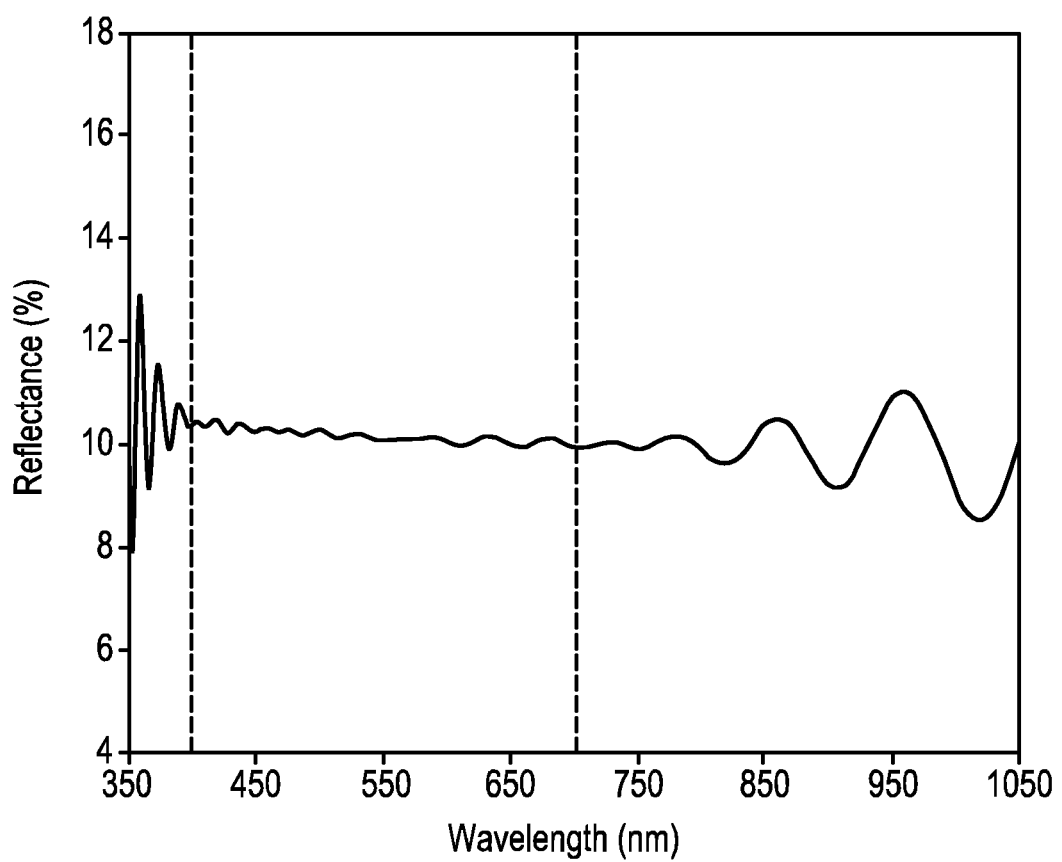
FIG. 10 is a calculated reflectance spectra for the article according to modeled Example 2.
Figure 11:
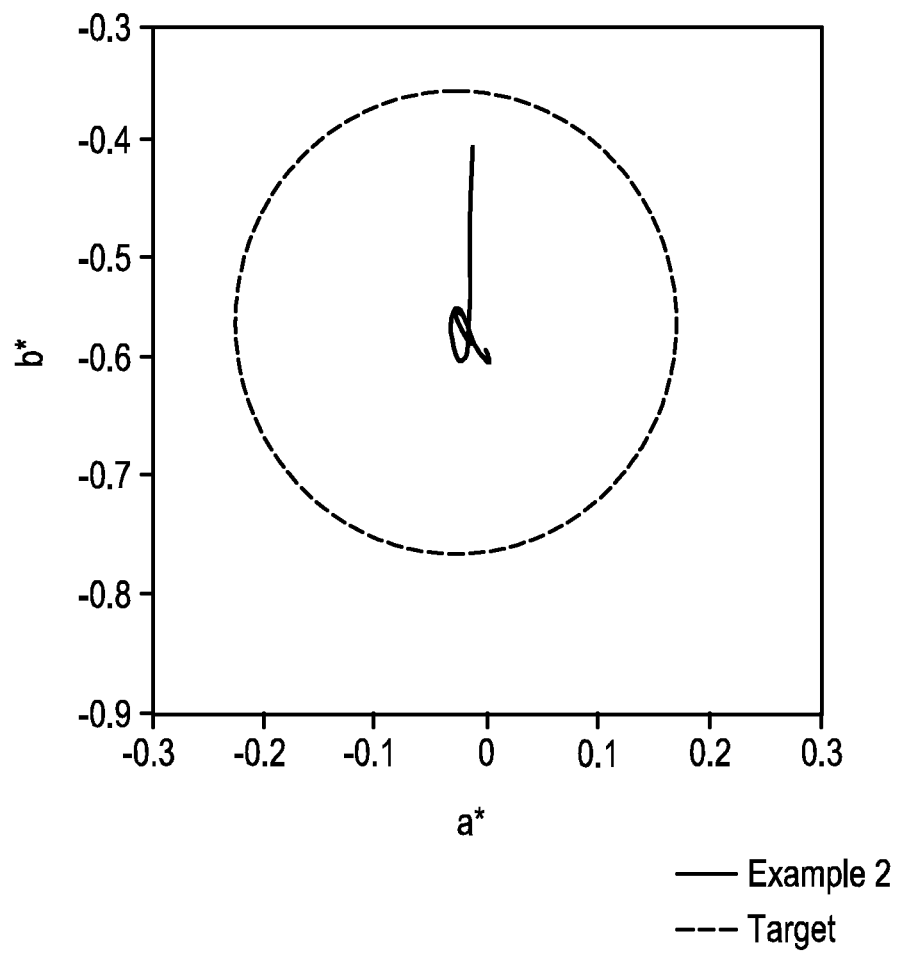
FIG. 11 is a graph showing the range of calculated a* and b* color shifts for modeled Example 2.

The calculated reflectance spectrum for the modeled Example 2 is shown in FIG. 10. As shown in FIG. 10, the oscillations in the reflectance spectrum are small (i.e., less than about 0.5 percentage points over the optical wavelength regime), leading to relatively low calculated visible color shift for a 10 degree observer, over a range of incidence viewing angles from 60 degrees to normal incidence, under an F2 illuminant, as shown in FIG. 11. FIG. 11 shows a target having a radius of 0.2, centered on the color coordinates of the substrate without the optical film disposed thereon, under F2 illumination.

Example 3

Figure 12:
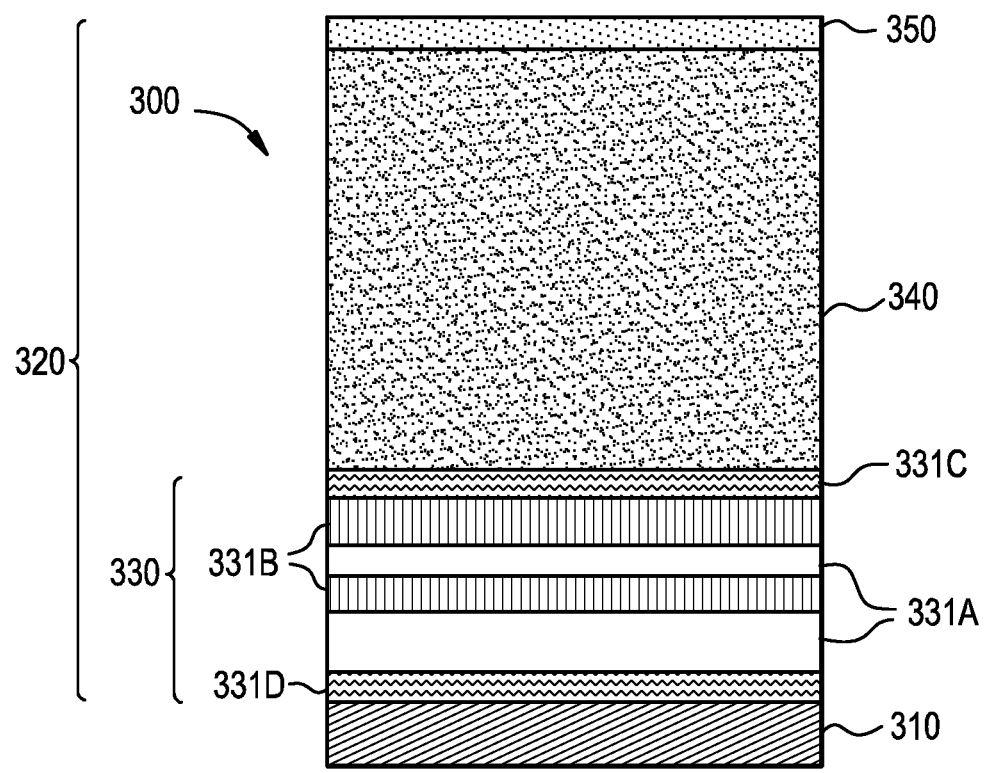
FIG. 12 is a schematic representation of the article according to modeled Example 3.

Modeled Example 3 included an article 300 with a chemically strengthened alkali aluminoborosilicate substrate 310 and an optical film 320 disposed on the substrate. The optical film 320 included an optical interference layer 330, a scratch resistant layer 340 disposed on the optical interference layer, and a capping layer 350 disposed on the scratch-resistant layer 250. The optical interference layer included two sets of sub-layers 331A, 331B, a third sub-layer 331C disposed between the plurality of sub-layers and the scratch-resistant layer, and a third sub-layer 331D disposed between the plurality of sub-layers and the substrate, as shown in FIG. 12. The optical film materials and thicknesses of each layer, in the order arranged in the optical film, are provided in Table 10.

TABLE 10

Optical film attributes for modeled Example 3.

| | Layer | Material | Modeled Thickness |
|---|---|---|---|
| | Ambient medium | Air | Immersed |
| | Capping layer | RS-SiO$_2$ | 9.5 nm |
| | Scratch-resistant layer | Si$_u$Al$_v$O$_x$N$_y$ | 2000 nm |
| Optical inter-ference layer | Third sub-layer | RS-Al$_2$O$_3$ | 13.5 nm |
| | 2$^{nd}$ high RI sub-layer | Si$_u$Al$_v$O$_x$N$_y$ | 43.58 nm |
| | 1$^{st}$ low RI sub-layer | RS-SiO$_2$ | 28.85 nm |
| | 2$^{nd}$ high RI sub-layer | Si$_u$Al$_v$O$_x$N$_y$ | 27.48 nm |
| | 1$^{st}$ low RI sub-layer | RS-SiO$_2$ | 40.62 nm |
| | Third sub-layer | RS-Al$_2$O$_3$ | 27.26 nm |
| | Substrate | ABS Glass | Immersed |

Figure 13:
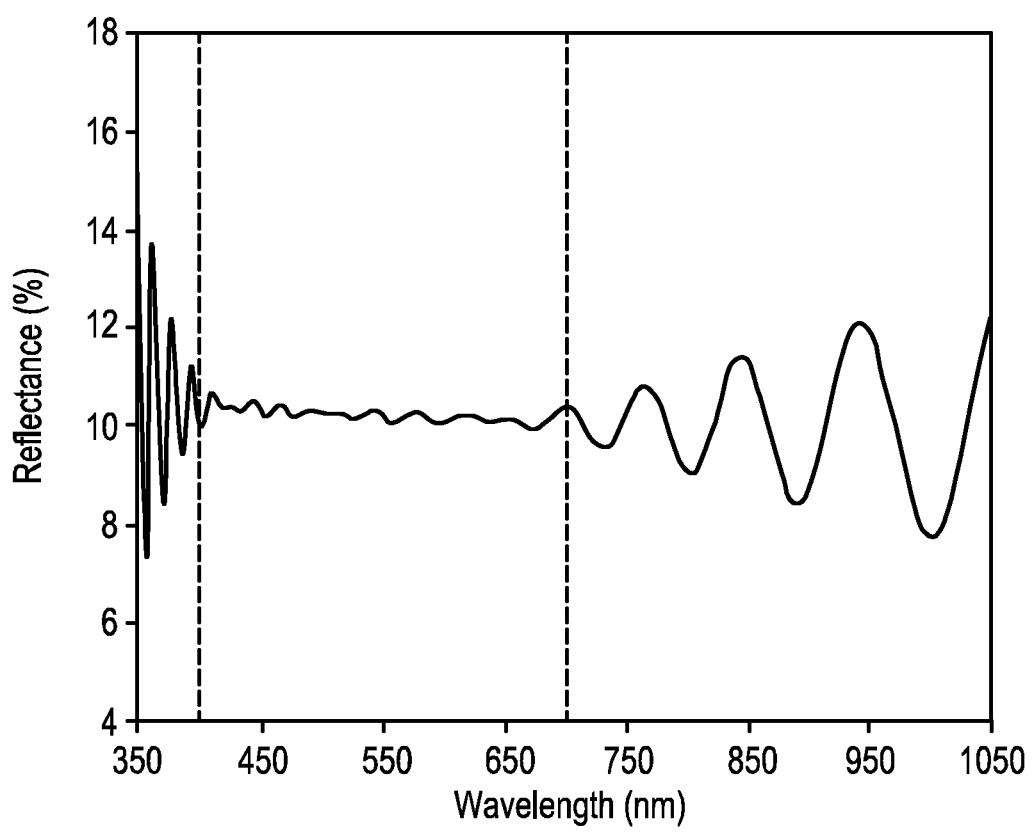
FIG. 13 is a calculated reflectance spectra for the article according to modeled Example 3.
Figure 14:
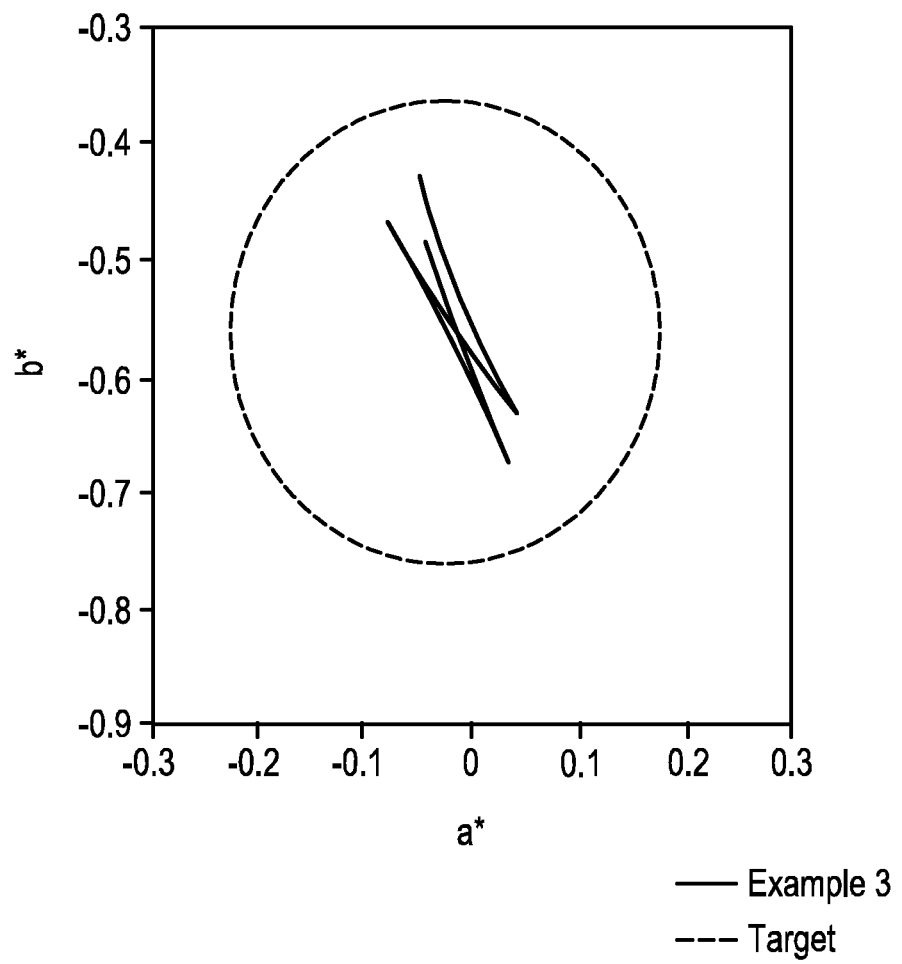
FIG. 14 is a graph showing the range of calculated a* and b* color shifts for modeled Example 3.

The calculated reflectance spectrum for the modeled Example 3 is shown in FIG. 13. As shown in FIG. 13, the oscillations in the reflectance spectrum are small (i.e., less than about 0.5 percentage points over the optical wavelength regime), leading to relatively low calculated visible color shift for a 10 degree observer, over a range of incidence viewing angles from 60 degrees to normal incidence, under an F2 illuminant, as shown in FIG. 14. FIG. 14 shows a target having a radius of 0.2, centered on the color coordinates of the substrate without the optical film disposed thereon, under F2 illumination.

Example 4

Figure 15:
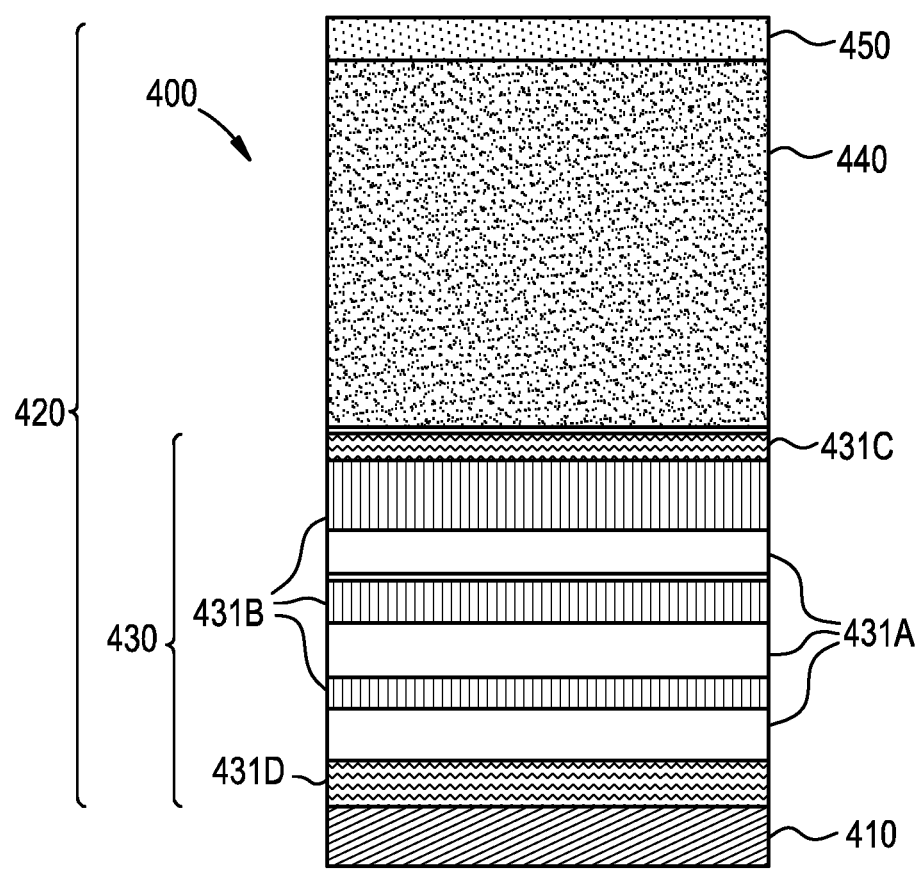
FIG. 15 is a schematic representation of the article according to modeled Example 4.

Modeled Example 4 included an article 400 with a chemically strengthened alkali aluminoborosilicate substrate 410 and an optical film 420 disposed on the substrate. The optical film 420 included an optical interference layer 430, a scratch resistant layer 440 disposed on the optical interference layer, and a capping layer 450 disposed on the scratch-resistant layer. The optical interference layer included three sets of sub-layers 431A, 431B, a third sub-layer 431C disposed between the plurality of sub-layers and the scratch-resistant layer, and a third sub-layer 431D disposed between the plurality of sub-layers and the substrate, as shown in FIG. 15. The optical film materials and thicknesses of each layer, in the order arranged in the optical film, are provided in Table 11.

TABLE 11

Optical film attributes for modeled Example 4.

| | Layer | Material | Modeled Thickness |
|---|---|---|---|
| | Ambient medium | Air | Immersed |
| | Capping layer | RS-SiO$_2$ | 9.5 nm |
| | Scratch-resistant layer | Si$_u$Al$_v$O$_x$N$_y$ | 2000 nm |
| Optical inter-ference layer | Third sub-layer | RS-Al$_2$O$_3$ | 10.20 nm |
| | 2$^{nd}$ high RI sub-layer | Si$_u$Al$_v$O$_x$N$_y$ | 49.01 nm |
| | 1$^{st}$ low RI sub-layer | RS-SiO$_2$ | 23.30 nm |
| | 2$^{nd}$ high RI sub-layer | Si$_u$Al$_v$O$_x$N$_y$ | 35.04 nm |
| | 1$^{st}$ low RI sub-layer | RS-SiO$_2$ | 44.95 nm |
| | 2$^{nd}$ high RI sub-layer | Si$_u$Al$_v$O$_x$N$_y$ | 19.02 nm |
| | 1$^{st}$ low RI sub-layer | RS-SiO$_2$ | 50.45 nm |
| | Third sub-layer | RS-Al$_2$O$_3$ | 17.16 nm |
| | Substrate | ABS Glass | Immersed |

Figure 16:
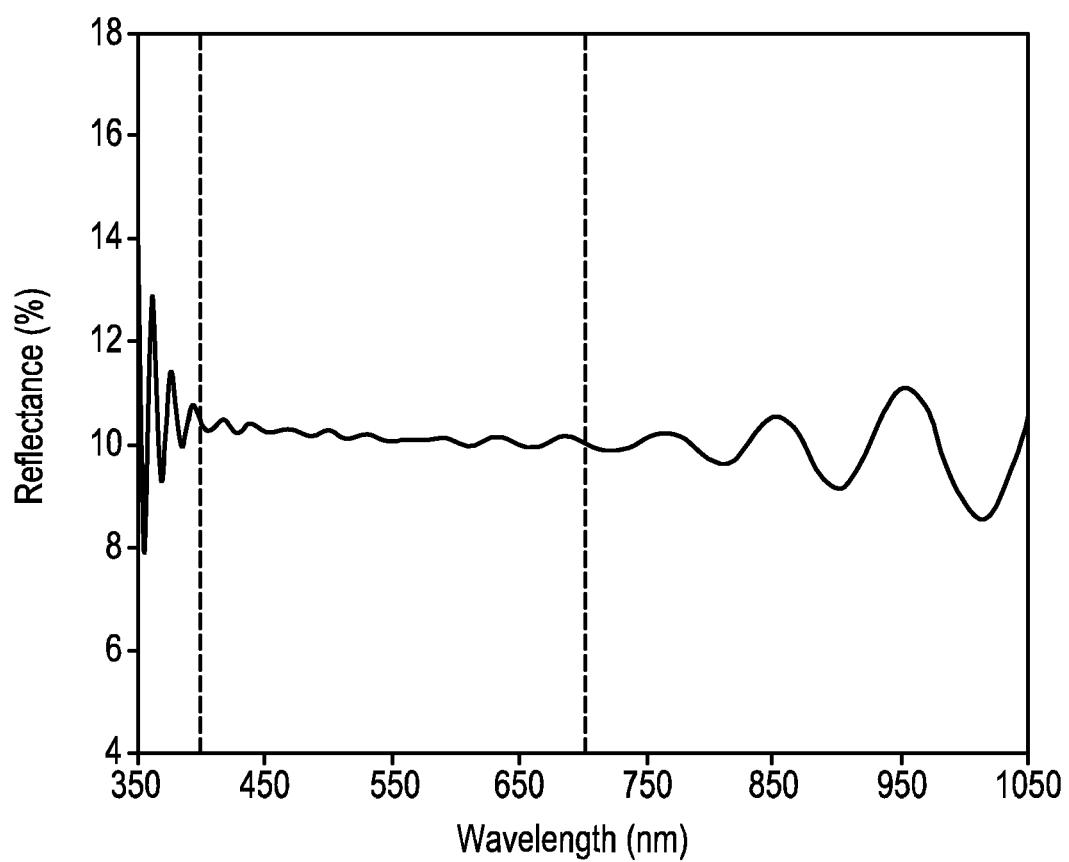
FIG. 16 is a calculated reflectance spectra for the article according to modeled Example 4.
Figure 17:
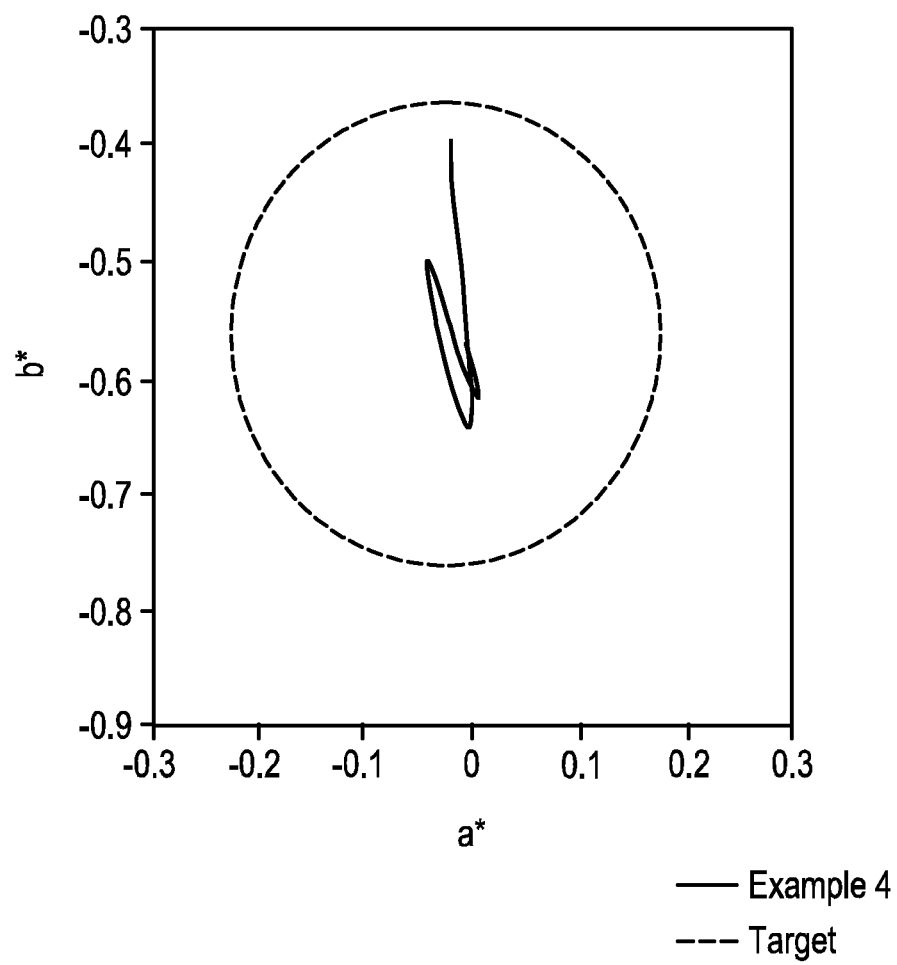
FIG. 17 is a graph showing the range of calculated a* and b* color shifts for modeled Example 4.

The calculated reflectance spectrum for the modeled Example 4 is shown in FIG. 16. As shown in FIG. 16, the oscillations in the reflectance spectrum are small (i.e., less than about 0.5 percentage points over the optical wavelength regime), leading to relatively low calculated visible color shift for a 10 degree observer, over a range of incidence viewing angles from 60 degrees to normal incidence, under an F2 illuminant, as shown in FIG. 17. FIG. 17 shows a target having a radius of 0.2, centered on the color coordinates of the substrate without the optical film disposed thereon, under F2 illumination.

Example 5

Figure 18:
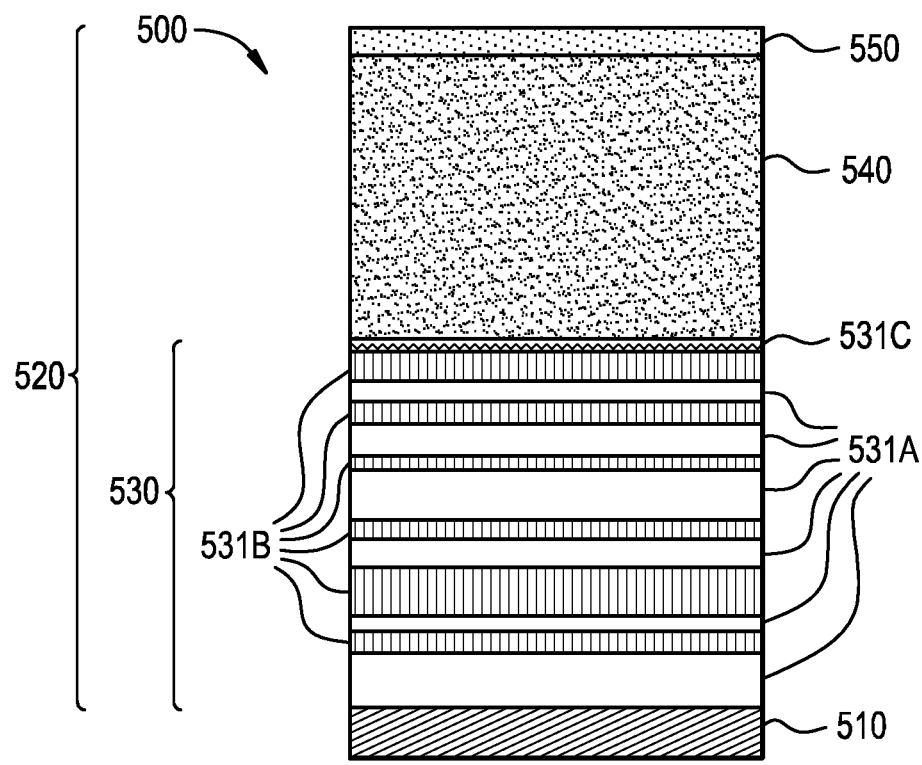
FIG. 18 is a schematic representation of the article according to modeled Example 5.

Modeled Example 5 included an article 500 with a chemically strengthened alkali aluminoborosilicate substrate 510 and an optical film 520 disposed on the substrate. The optical film 520 included an optical interference layer 530, a scratch resistant layer 540 disposed on the optical interference layer, and a capping layer 550 disposed on the scratch-resistant layer 550. The optical interference layer included six sets of sub-layers 531A, 531B and a third sub-layer 531C disposed between the plurality of sub-layers and the scratch-resistant layer, as shown in FIG. 18. The optical film materials and thicknesses of each layer, in the order arranged in the optical film, are provided in Table 12.

TABLE 12

Optical film attributes for modeled Example 5.

| | Layer | Material | Modeled Thickness |
|---|---|---|---|
| | Ambient medium | Air | Immersed |
| | Capping layer | RS-SiO$_2$ | 14 nm |
| | Scratch-resistant layer | Si$_u$Al$_v$O$_x$N$_y$ | 2000 nm |
| Optical inter-ference layer | Third sub-layer | RS-Al$_2$O$_3$ | 7.05 nm |
| | 2$^{nd}$ high RI sub-layer | Si$_u$Al$_v$O$_x$N$_y$ | 54.65 nm |
| | 1$^{st}$ low RI sub-layer | RS-Al$_2$O$_3$ | 24.59 nm |
| | 2$^{nd}$ high RI sub-layer | Si$_u$Al$_v$O$_x$N$_y$ | 37.96 nm |
| | 1$^{st}$ low RI sub-layer | RS-Al$_2$O$_3$ | 52.53 nm |
| | 2$^{nd}$ high RI sub-layer | Si$_u$Al$_v$O$_x$N$_y$ | 17.48 nm |
| | 1$^{st}$ low RI sub-layer | RS-Al$_2$O$_3$ | 90.07 nm |
| | 2$^{nd}$ high RI sub-layer | Si$_u$Al$_v$O$_x$N$_y$ | 20.63 nm |
| | 1$^{st}$ low RI sub-layer | RS-Al$_2$O$_3$ | 38.15 nm |
| | 2$^{nd}$ high RI sub-layer | Si$_u$Al$_v$O$_x$N$_y$ | 84.11 nm |
| | 1$^{st}$ low RI sub-layer | RS-Al$_2$O$_3$ | 6.87 nm |
| | 2$^{nd}$ high RI sub-layer | Si$_u$Al$_v$O$_x$N$_y$ | 48.85 nm |
| | 1$^{st}$ low RI sub-layer | RS-Al$_2$O$_3$ | 81.63 nm |
| | Substrate | ABS Glass | Immersed |

Figure 19:
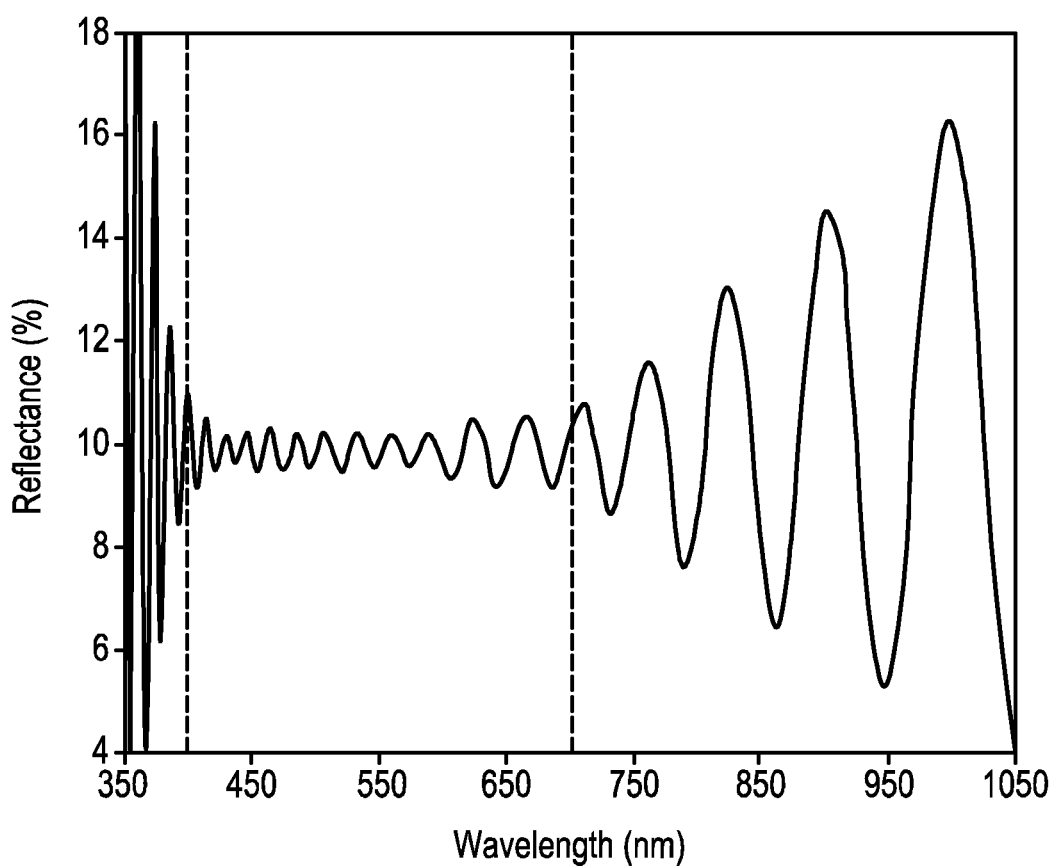
FIG. 19 is a calculated reflectance spectra for the article according to modeled Example 5.

The calculated reflectance spectrum for the modeled Example 5 is shown in FIG. 19. As shown in FIG. 19, the oscillations in the reflectance spectrum are small (i.e., less than about 1 percentage point over the optical wavelength regime), which would lead to a relatively low visible color shift when viewed at an incidence viewing angle in the range from about 0 degrees to about 60 degrees to normal incidence, under an illuminant.

Example 6

Figure 20:
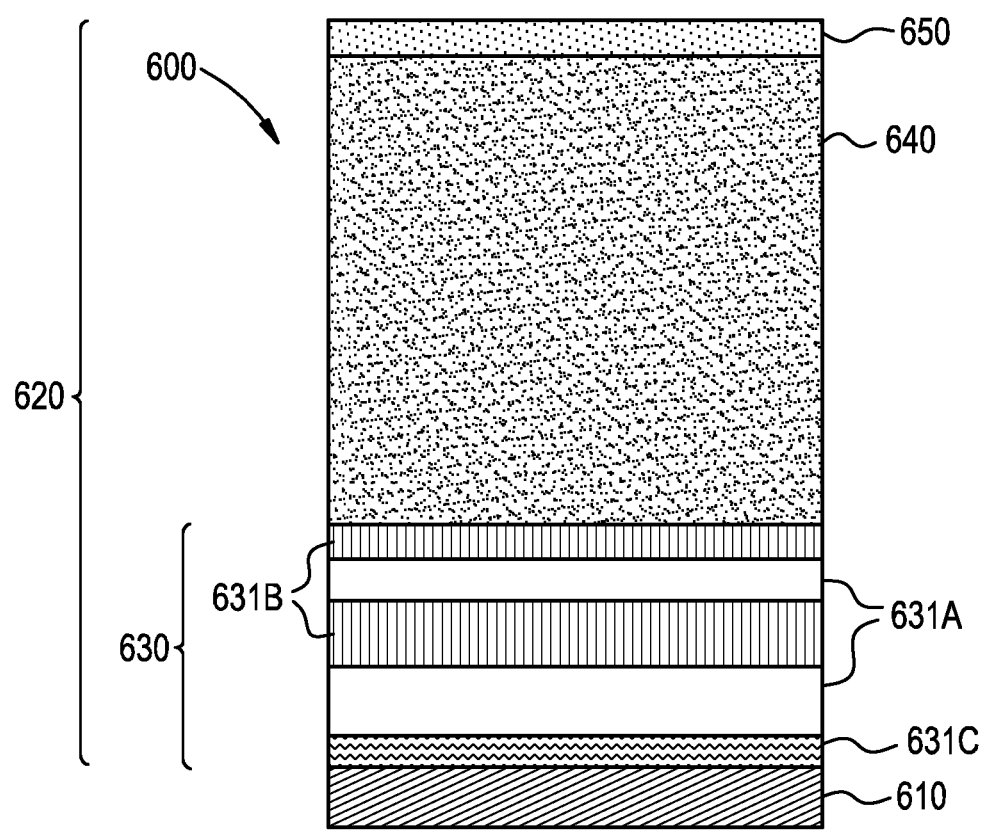
FIG. 20 is a schematic representation of the article according to modeled Example 6.

Modeled Example 6 included an article 600 with a chemically strengthened alkali aluminoborosilicate substrate 610 and an optical film 620 disposed on the substrate. The optical film 620 included an optical interference layer 630, a scratch resistant layer 640 disposed on the optical interference layer, and a capping layer 650 disposed on the scratch-resistant layer 650. The optical interference layer included two sets of sub-layers 631A, 631B and a third sub-layer 631C disposed between the plurality of sub-layers and the substrate, as shown in FIG. 20. The optical film materials and thicknesses of each layer, in the order arranged in the optical film, are provided in Table 13.

TABLE 13

Optical film attributes for modeled Example 6.

| | Layer | Material | Modeled Thickness |
|---|---|---|---|
| | Ambient medium | Air | Immersed |
| | Capping layer | RS-SiO$_2$ | 10 nm |
| | Scratch-resistant layer | Si$_u$Al$_v$O$_x$N$_y$ | 2000 nm |
| Optical | 2$^{nd}$ high RI sub-layer | E-Ta$_2$O$_5$ | 15.27 nm |
| inter- | 1$^{st}$ low RI sub-layer | E-SiO$_2$ | 19.35 nm |
| ference | 2$^{nd}$ high RI sub-layer | E-Ta$_2$O$_5$ | 32.53 nm |
| layer | 1$^{st}$ low RI sub-layer | E-SiO$_2$ | 43.18 nm |
| | Third sub-layer | E-Ta$_2$O$_5$ | 12.64 nm |
| | Substrate | ABS Glass | Immersed |

Figure 21:
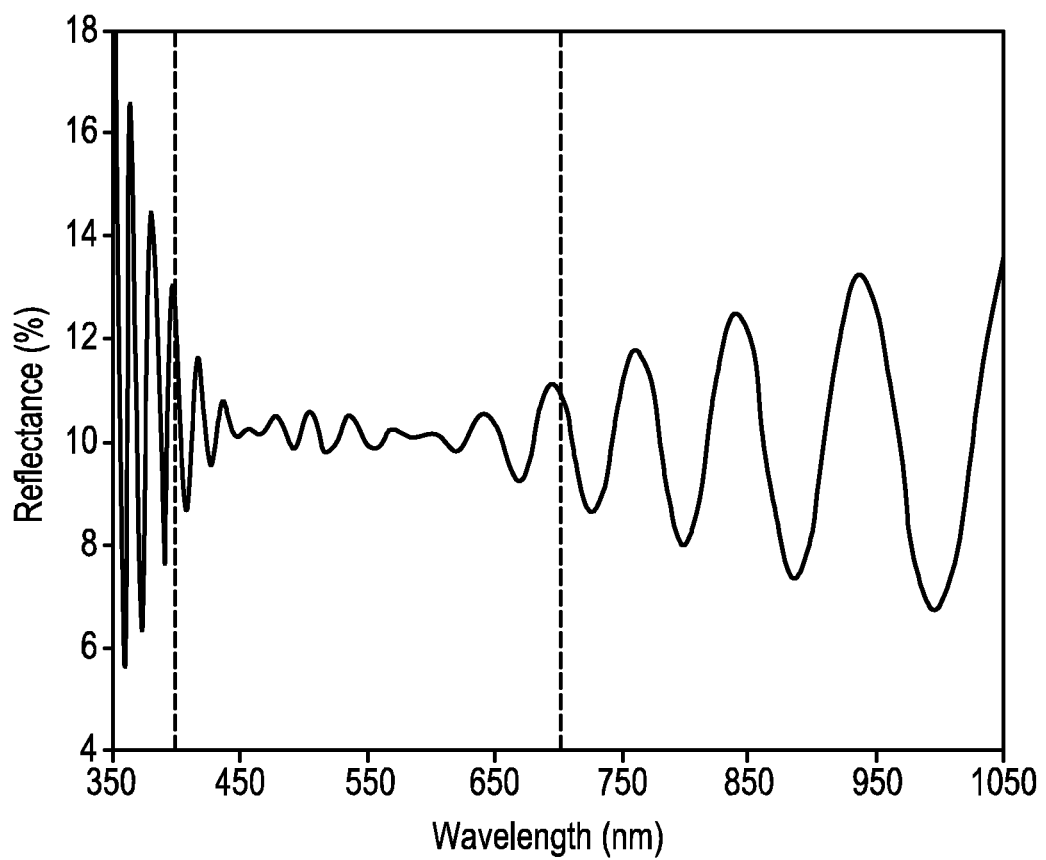
FIG. 21 is a calculated reflectance spectra for the article according to modeled Example 6.
Figure 26:
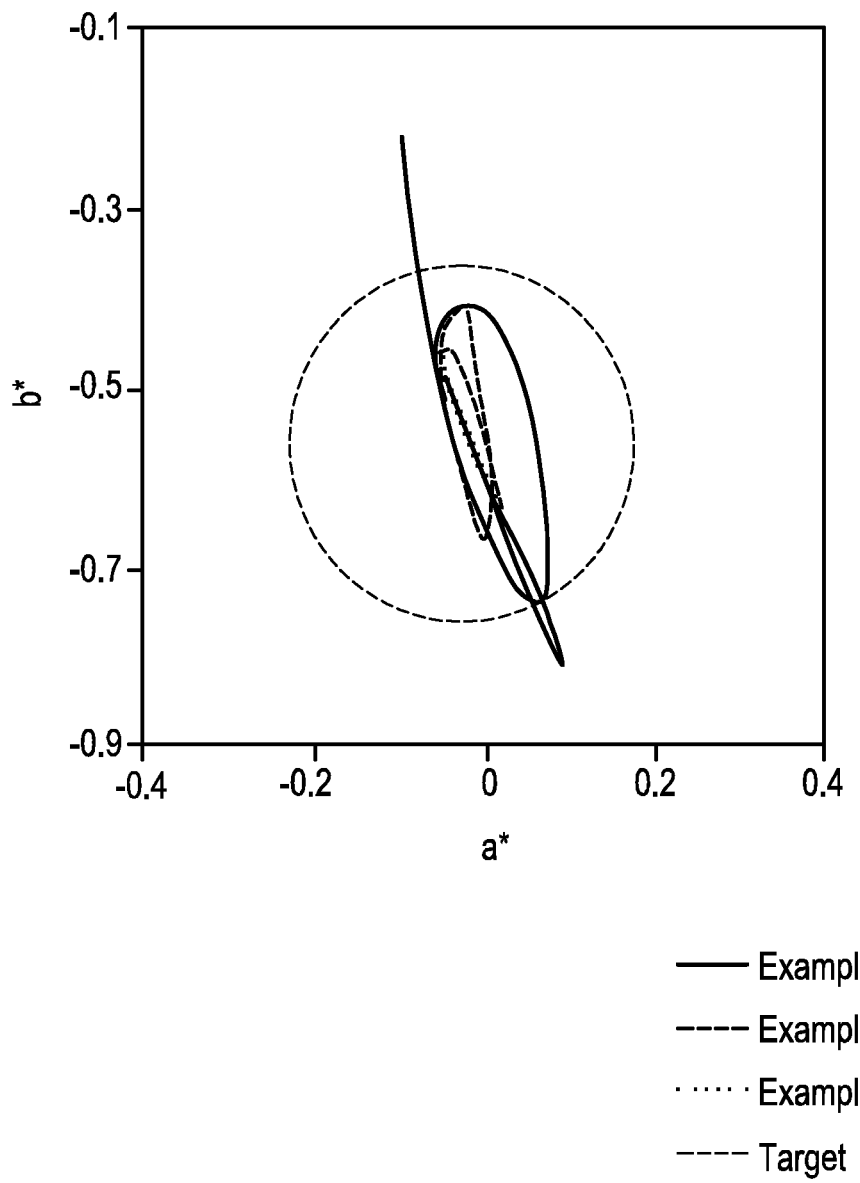
FIG. 26 is a graph showing the range of calculated a* and b* color shifts for modeled Examples 6-8.

The calculated reflectance spectrum for the modeled Example 6 is shown in FIG. 21. As shown in FIG. 21, the oscillations in the reflectance spectrum are small (i.e., less than about 1 percentage point over the optical wavelength regime), leading to relatively low calculated visible color shift for a 10 degree observer, over a range of incidence viewing angles from 60 degrees to normal incidence, under an F2 illuminant, as shown in FIG. 26. FIG. 26 shows a target having a radius of 0.2, centered on the color coordinates of the substrate without the optical film disposed thereon, under F2 illumination.

Example 7

Figure 22:
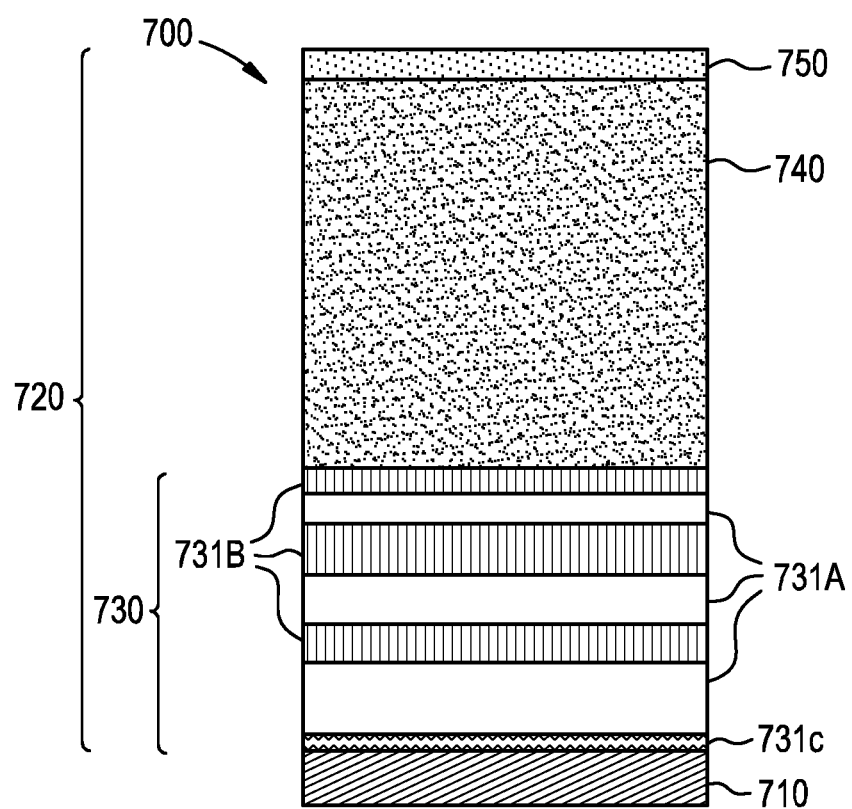
FIG. 22 is a schematic representation of the article according to modeled Example 7.

Modeled Example 7 included an article 700 with a chemically strengthened alkali aluminoborosilicate substrate 710 and an optical film 720 disposed on the substrate. The optical film 720 included an optical interference layer 730, a scratch resistant layer 740 disposed on the optical interference layer, and a capping layer 750 disposed on the scratch-resistant layer 750. The optical interference layer included three sets of sub-layers 731A, 731B, and a third sub-layer 731C between the plurality of sub-layers and the substrate, as shown in FIG. 22. The optical film materials and thicknesses of each layer, in the order arranged in the optical film, are provided in Table 14.

TABLE 14

Optical film attributes for modeled Example 7.

| | Layer | Material | Modeled Thickness |
|---|---|---|---|
| | Ambient medium | Air | Immersed |
| | Capping layer | RS-SiO$_2$ | 10 nm |
| | Scratch-resistant layer | Si$_u$Al$_v$O$_x$N$_y$ | 2000 nm |
| Optical | 2$^{nd}$ high RI sub-layer | E-Ta$_2$O$_5$ | 18.67 nm |
| inter- | 1$^{st}$ low RI sub-layer | E-SiO$_2$ | 13.7 nm |
| ference | 2$^{nd}$ high RI sub-layer | E-Ta$_2$O$_5$ | 39.23 nm |
| layer | 1$^{st}$ low RI sub-layer | E-SiO$_2$ | 32.77 nm |
| | 2$^{nd}$ high RI sub-layer | E-Ta$_2$O$_5$ | 24.91 nm |
| | 1$^{st}$ low RI sub-layer | E-SiO$_2$ | 50.89 nm |
| | Third sub-layer | E-Ta$_2$O$_5$ | 8.39 nm |
| | Substrate | ABS Glass | Immersed |

The calculated reflectance spectrum for the modeled Example 7 is shown in FIG. 22. As shown in FIG. 22, the oscillations in the reflectance spectrum are small (i.e., less than about 0.5 percentage points over the optical wavelength regime and, in some cases, less than about 0.1 percentage points over the optical wavelength regime), leading to relatively low calculated visible color shift for a 10 degree observer, over a range of incidence viewing angles from 60 degrees to normal incidence, under an F2 illuminant, as shown in FIG. 26.

Example 8

Figure 23:
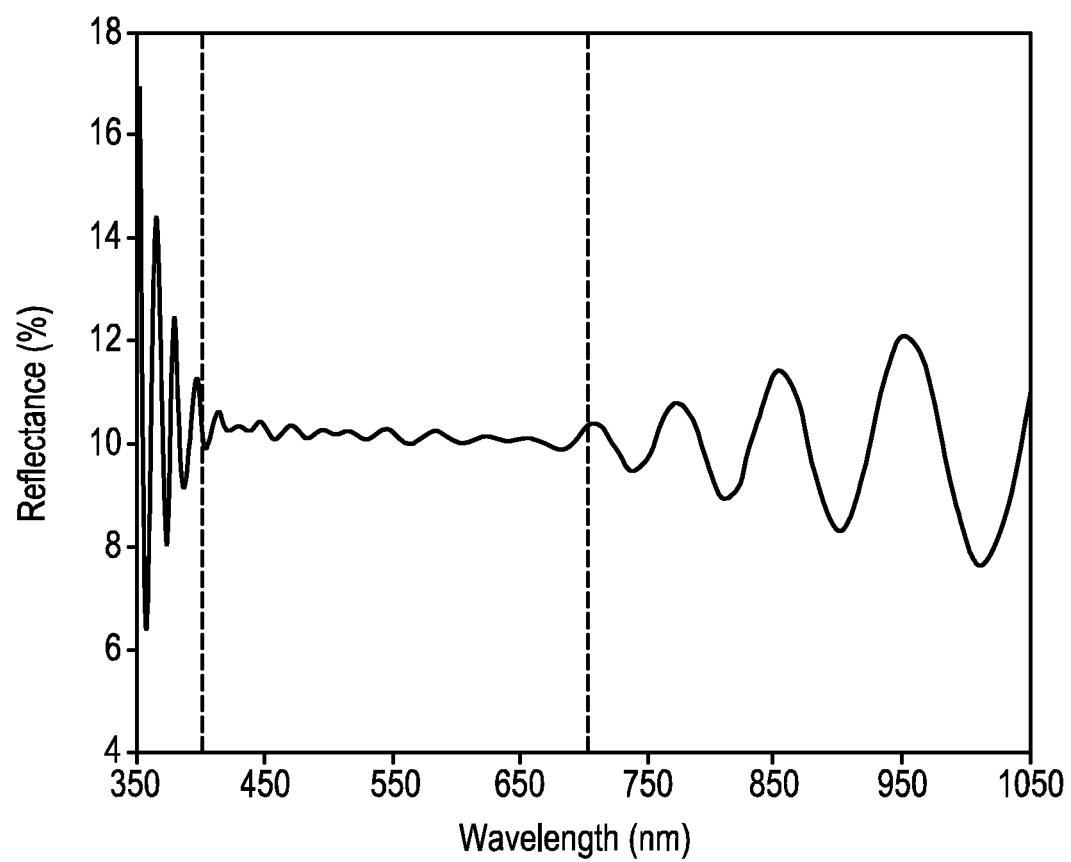
FIG. 23 is a calculated reflectance spectra for the article according to modeled Example 7.
Figure 24:
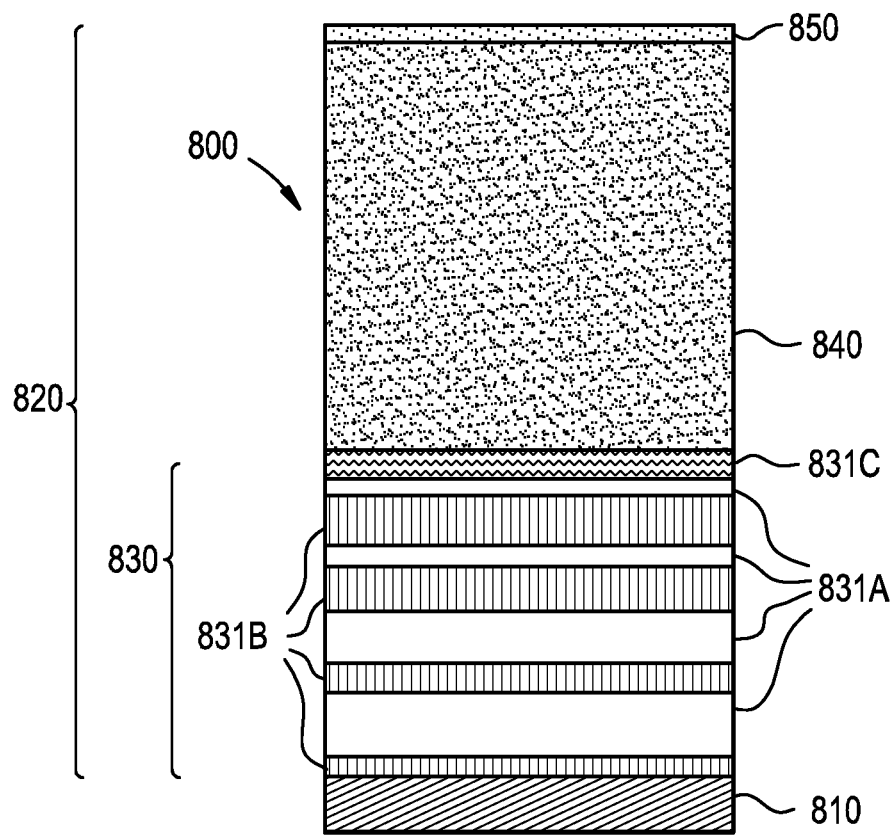
FIG. 24 is a schematic representation of the article according to modeled Example 8.

Modeled Example 8 included an article 800 with a chemically strengthened alkali aluminoborosilicate substrate 810 and an optical film 820 disposed on the substrate. The optical film 820 included an optical interference layer 830, a scratch resistant layer 840 disposed on the optical interference layer, and a capping layer 850 disposed on the scratch-resistant layer 840. The optical interference layer included four sets of sub-layers 831A, 831B, and a third sub-layer 831C disposed between the plurality of sub-layers and the scratch-resistant layer, as shown in FIG. 23. The optical film materials and thicknesses of each layer, in the order arranged in the optical film, are provided in Table 15.

TABLE 15

Optical film attributes for modeled Example 8.

| | Layer | Material | Modeled Thickness |
|---|---|---|---|
| | Ambient medium | Air | Immersed |
| | Capping layer | RS-SiO$_2$ | 10 nm |
| | Scratch-resistant layer | Si$_u$Al$_v$O$_x$N$_y$ | 2000 nm |
| Optical | Third sub-layer | E-Ta$_2$O$_5$ | 19.52 nm |
| inter- | 1$^{st}$ low RI sub-layer | E-SiO$_2$ | 11.28 nm |
| ference | 2$^{nd}$ high RI sub-layer | E-Ta$_2$O$_5$ | 44.68 nm |
| layer | 1$^{st}$ low RI sub-layer | E-SiO$_2$ | 25.72 nm |
| | 2$^{nd}$ high RI sub-layer | E-Ta$_2$O$_5$ | 34.69 nm |
| | 1$^{st}$ low RI sub-layer | E-SiO$_2$ | 45.76 nm |
| | 2$^{nd}$ high RI sub-layer | E-Ta$_2$O$_5$ | 20.24 nm |
| | 1$^{st}$ low RI sub-layer | E-SiO$_2$ | 57.29 nm |
| | 2$^{nd}$ high sub-layer | E-Ta$_2$O$_5$ | 6.64 nm |
| | Substrate | ABS Glass | Immersed |

Figure 25:
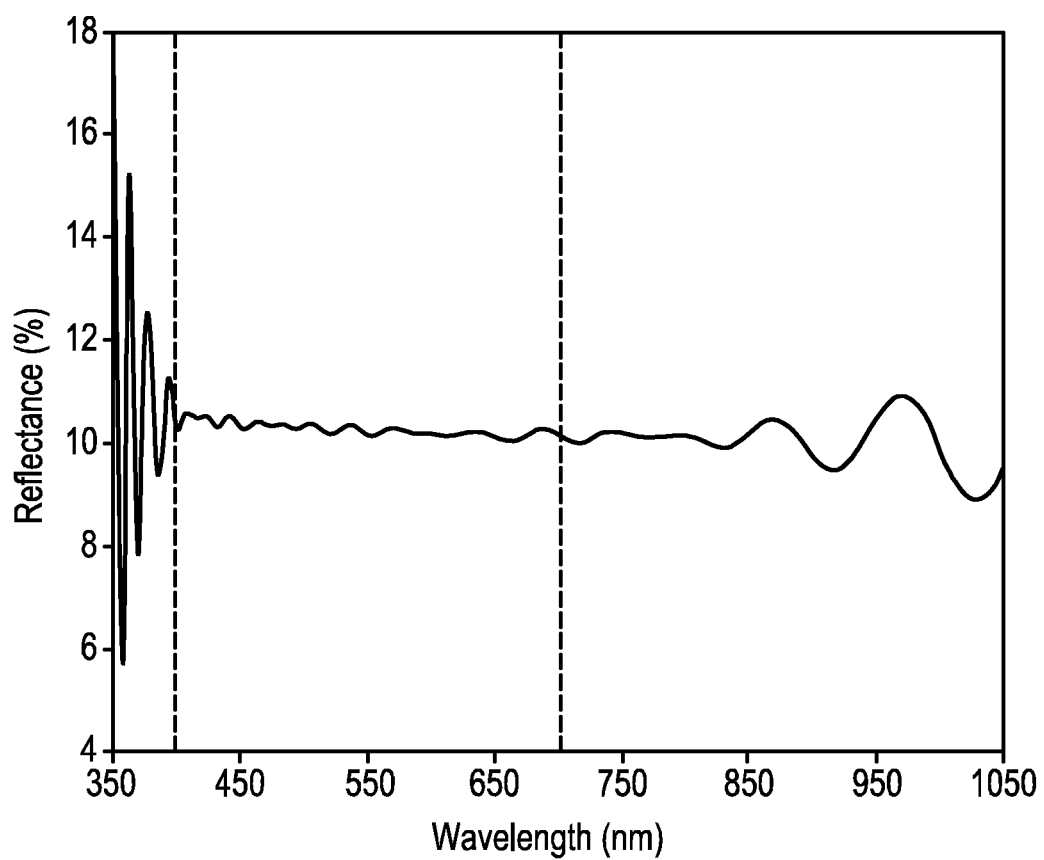
FIG. 25 is a calculated reflectance spectra for the article according to modeled Example 8.

The calculated reflectance spectrum for the modeled Example 8 is shown in FIG. 25. As shown in FIG. 25, the oscillations in the reflectance spectrum are small (i.e., less than about 0.25 percentage points over the optical wavelength regime and, in some cases, less than about 0.1 percentage points over the optical wavelength regime), leading to relatively low calculated visible color shift for a 10 degree observer, over a range of incidence viewing angles from 60 degrees to normal incidence, under an F2 illuminant, as shown in FIG. 26.

Example 9

Figure 27:
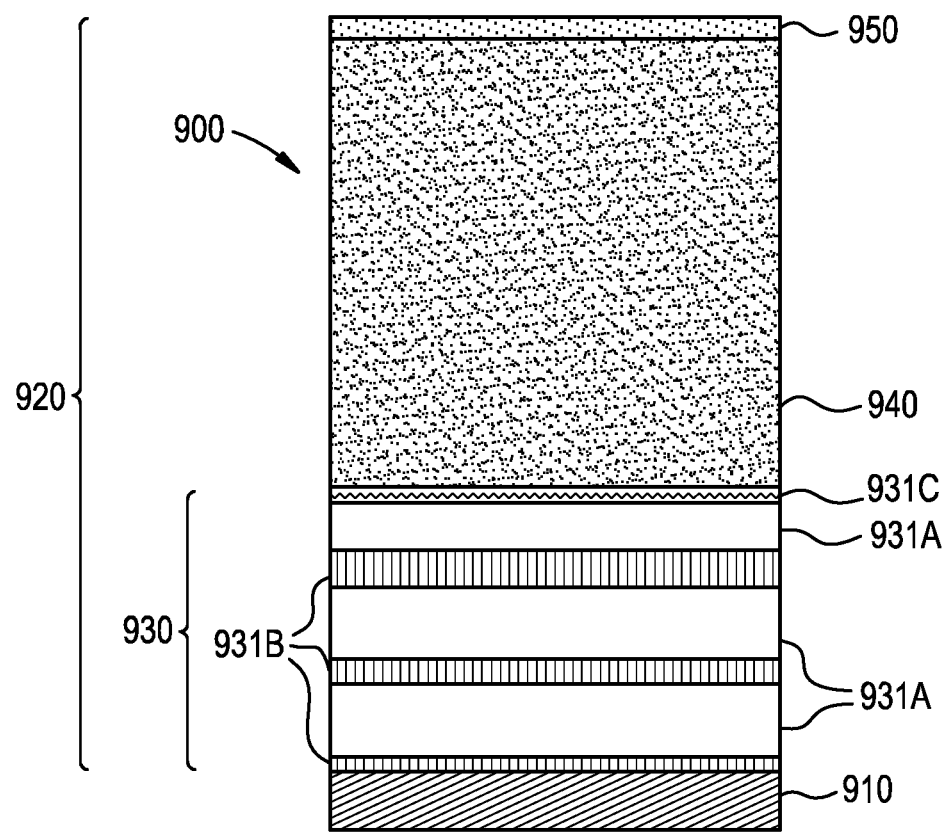
FIG. 27 is a schematic representation of the article according to modeled Example 9.

Modeled Example 9 included an article 900 with a chemically strengthened alkali aluminoborosilicate substrate 910 and an optical film 920 disposed on the substrate. The optical film 920 included an optical interference layer 930, a scratch resistant layer 940 disposed on the optical interference layer, and a capping layer 950 disposed on the scratch-resistant layer 950. The optical interference layer included three sets of sub-layers 931A, 931B, and a third sub-layer 931C between the plurality of sub-layers and the scratch-resistant layer, as shown in FIG. 27. The optical film materials and thicknesses of each layer, in the order arranged in the optical film, are provided in Table 16.

TABLE 16

Optical film attributes for modeled Example 9.

| | Layer | Material | Modeled Thickness |
|---|---|---|---|
| | Ambient medium | Air | Immersed |
| | Capping layer | RS-SiO$_2$ | 14 nm |
| | Scratch-resistant layer | Si$_u$Al$_v$O$_x$N$_y$ | 2000 nm |
| Optical | Third sub-layer | RS-Nb$_2$O$_5$ | 7.0 nm |
| inter- | 1$^{st}$ low RI sub-layer | RS-SiO$_2$ | 23.02 nm |
| ference | 2$^{nd}$ high RI sub-layer | RS-Nb$_2$O$_5$ | 19.75 nm |
| layer | 1$^{st}$ low RI sub-layer | RS-SiO$_2$ | 41.60 nm |
| | 2$^{nd}$ high RI sub-layer | RS-Nb$_2$O$_5$ | 14.68 nm |
| | 1$^{st}$ low RI sub-layer | RS-SiO$_2$ | 57.14 nm |
| | 2$^{nd}$ high sub-layer | RS-Nb$_2$O$_5$ | 5.08 nm |
| | Substrate | ABS Glass | Immersed |

Figure 28:
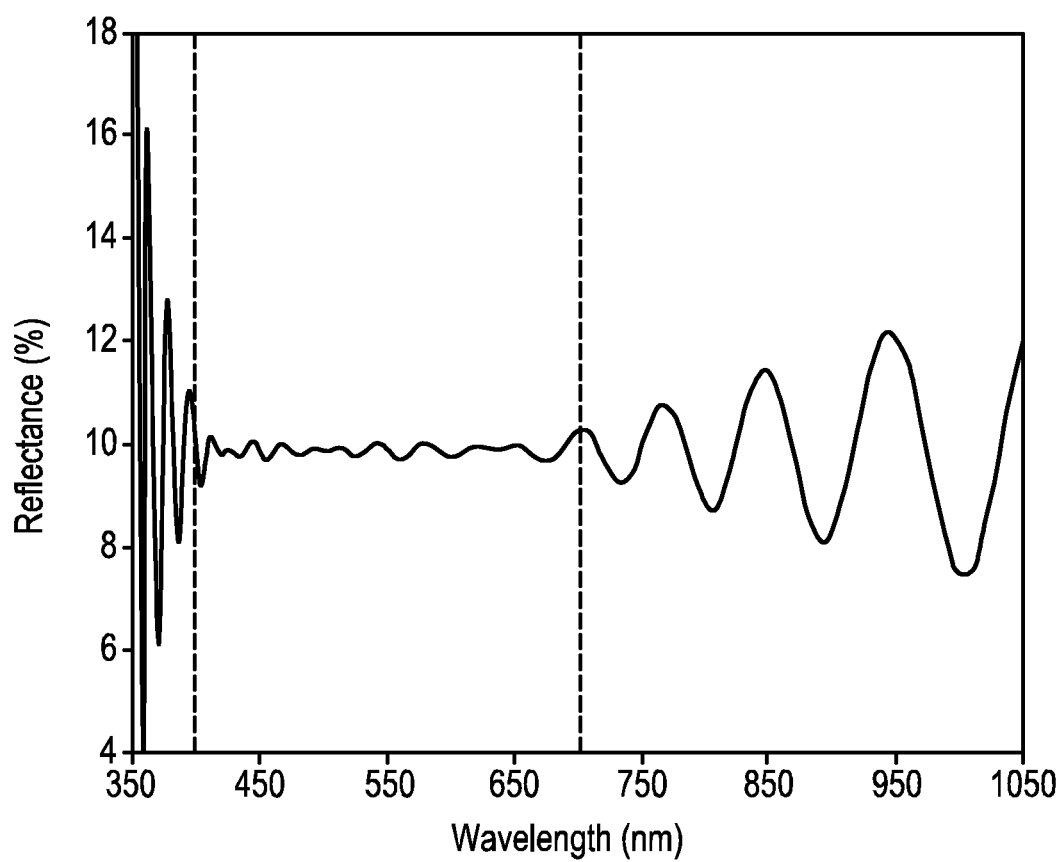
FIG. 28 is a calculated reflectance spectra for the article according to modeled Example 9.

The calculated reflectance spectrum for the modeled Example 9 is shown in FIG. 28. As shown in FIG. 28, the oscillations in the reflectance spectrum are small (i.e., less than about 1 percentage points over the optical wavelength regime and, in some cases, less than about 0.1 percentage points over the optical wavelength regime), which would lead to a relatively low visible color shift at an incidence viewing angle in the range from about 0 degrees to about 60 degrees to normal incidence, under an illuminant.

Examples 10-11 and Comparative Example 12

Example 10 was made and included a substrate, and an optical film disposed on the substrate. The substrate included a chemically strengthened ABS glass substrate having a compressive stress of about 900 MPa and a DOL of about 45 μm. As shown in Table 17, the optical film included an optical interference layer with six sub-layer sets. The six sub-layer sets included first low RI sub-layer of SiOxNy (having a refractive index value of about 1.49 at a wavelength of about 550 nm) and a second high RI sub-layer of AlO$_x$N$_y$ (having a refractive index value of about 2.0 at a wavelength of about 550 nm). The optical film also included an AlO$_x$N$_y$ scratch resistant layer. The optical interference layer of Example 10 was formed using reactive magnetron sputtering using an AJA-Industries sputter deposition tool using oxidizing and nitridizing environments. Sputter targets used included a 3" diameter silicon target and a 3" diameter aluminum target.

The first low RI layer was formed by supplying about 490 W RF to the silicon target. During formation of the first low RI layer, about 75 W RF and 50 W DC were supplied to the aluminum target; however, the aluminum shutter was closed to prevent deposition of aluminum. During deposition of the first low RI sub-layers, oxygen was flowed into the reactor at a flow rate of about 3.3 sccm, argon was flowed into the reactor at a flow rate of about 30 sccm and nitrogen gas was flowed into the reactor at a flow rate of about 30 sccm. The deposition times for the first low RI sub-layers were modified to provide the thicknesses shown in Tables 17 and 18.

The second high RI sub-layers were disposed using RF superimposed DC power directed at the aluminum target. About 300 W of DC power was supplied to the aluminum target and about 200 W of RF power was supplied to the Al target. During formation of the second high RI layer, RF power was supplied to the silicon target at about 50 W; however, the silicon shutter was closed to prevent deposition of silicon. During deposition of the second high RI sub-layers, oxygen was flowed into the reactor at a flow rate of 0.25 sccm, argon was flowed into the reactor at a flow rate of about 30 sccm and nitrogen gas was flowed into the rector at a rate of about 30 sccm. The deposition times for the second high RI sub-layers were modified to provide the thicknesses shown in Tables 17 and 18.

Table 17 also provides the refractive index values for the respective first low RI sub-layers, second high RI sub-layers and the scratch-resistant layer, at a wavelength of about 550 nm. The entire dispersion curves for these sub-layers are similar to analogous materials used in Modeled Examples 1-9 (whose refractive index dispersions were also measured experimentally). Dispersion curves used in Modeled Examples 1-9 can be shifted up or down slightly by a linear or scaled amount at each wavelength to arrive at the target refractive indices used in Examples 10 and 11 to very closely reproduce the actual dispersion curves of the materials in working Examples 10 and 11.

At each of the transitions between the first low RI sub-layers (SiOxNy) and the second high RI sub-layers (AlOxNy), both the silicon and aluminum shutters were closed for about 60 seconds, as the gas flows were transitioned to those required for the following sub-layer. During this transition, the powers and gas flows were adjusted. The sputtering was maintained "on" but the sputtered material went onto the closed shutter. The power supplied to the silicon target was left at about 500 W in some cases to scavenge remnant oxygen, since the second high RI sub-layer utilized a low oxygen flow (as compared to the oxygen flow used to form the first low RI sub-layer). This process allowed the sputter targets to attain their desired powers, in the presence of the gases that were used for the various layers, prior to opening the shutters for a given sub-layer.

The scratch-resistant layer was formed using the same conditions as used to form the second high RI sub-layers. The resulting scratch-resistant layer combined with the optical interference layers as described exhibited a hardness of about 15 GPa, as measured using a Berkovich indenter as described herein and a modulus of about 212 GPa as measured by known nanoindentation methods.

TABLE 17

Optical film target refractive indices and thicknesses for Example 10.

| Layer | Material | Target Refractive Index @550 nm | Target Thickness (nm) |
|---|---|---|---|
| Scratch-resistant layer | AlO$_x$N$_y$ | 2.00709 | 2000 |
| First low RI sub-layer | SiO$_x$N$_y$ | 1.49658 | 9.7 |
| Second high RI sub-layer | AlO$_x$N$_y$ | 2.00709 | 42.17 |
| First low RI sub-layer | SiO$_x$N$_y$ | 1.49658 | 30.27 |
| Second high RI sub-layer | AlO$_x$N$_y$ | 2.00709 | 24.68 |
| First low RI sub-layer | SiO$_x$N$_y$ | 1.49658 | 52.71 |
| Second high RI sub-layer | AlO$_x$N$_y$ | 2.00709 | 8.25 |
| Substrate | ABS glass | 1.51005 | |

TABLE 18

Sputtering process conditions used for Example 10.

| Layer | Material | Sputter Time (sec) | Si W RF | Si shutter | Al W RF | Al W DC | Al shutter | $O_2$ flow | Ar flow | $N_2$ flow |
|---|---|---|---|---|---|---|---|---|---|---|
| Scratch-resistant layer | $AlO_xN_y$ | 32756.6 | 50 | closed | 200 | 300 | open | 3.3 | 30 | 30 |
| First low RI sub-layer | $SiO_xN_y$ | 121.9 | 490 | open | 75 | 50 | closed | 0.25 | 30 | 30 |
| Second high RI sub-layer | $AlO_xN_y$ | 710.3 | 50 | closed | 200 | 300 | open | 3.3 | 30 | 30 |
| First low RI sub-layer | $SiO_xN_y$ | 448.3 | 490 | open | 75 | 50 | closed | 0.25 | 30 | 30 |
| Second high RI sub-layer | $AlO_xN_y$ | 440.6 | 50 | closed | 200 | 300 | open | 3.3 | 30 | 30 |
| First low RI sub-layer | $SiO_xN_y$ | 804.2 | 490 | open | 75 | 50 | closed | 0.25 | 30 | 30 |
| Second high RI sub-layer | $AlO_xN_y$ | 104.3 | 50 | closed | 200 | 300 | open | 3.3 | 30 | 30 |
| Substrate | ABS glass | | | | | | | | | |
| Total Time: | | 35523.0 | | | | | | | | |

Example 11 was formed using the same equipment and similar reactive sputtering processes as Example 10; however Example 11 included $Si_uAl_vO_xN_y$ in the second high RI sub-layers and as the scratch resistant layer, which had a refractive index at a wavelength of about 550 nm of about 1.998. The same substrate was used in Example 11 as was used in Example 10. The optical film design for Example 11 and sputtering process conditions used to form Example 11 are shown in Tables 19 and 20.

Example 11 was measured for hardness using a Berkovich diamond indenter and an indentation depth of about 100 nm, as described herein, and the article of Exhibit 11 had a measured hardness of 21 GPa. Example 11 also exhibited an elastic modulus of 237 GPa.

TABLE 19

Optical film target refractive indices and thicknesses for Example 11.

| Layer | Material | Target Refractive Index @550 nm | Target Thickness (nm) |
|---|---|---|---|
| Scratch-resistant layer | $Si_uAl_vO_xN_y$ | 1.99823 | 2000 |
| First low RI sub-layer | $SiO_xN_y$ | 1.49594 | 11.8 |
| Second high RI sub-layer | $Si_uAl_vO_xN_y$ | 1.99823 | 45.4 |
| First low RI sub-layer | $SiO_xN_y$ | 1.49594 | 33.6 |
| Second high RI sub-layer | $Si_uAl_vO_xN_y$ | 1.99823 | 27.5 |
| First low RI sub-layer | $SiO_xN_y$ | 1.49594 | 56.5 |
| Second high RI sub-layer | $Si_uAl_vO_xN_y$ | 1.99823 | 10.1 |
| Substrate | ABS glass | 1.51005 | |

TABLE 20

Sputtering process conditions for Example 11.

| Layer | Material | Sputter Time (sec) | Si W RF | Si shutter | Al W RF | Al W DC | Al shutter | O2 flow | Ar flow | N2 flow |
|---|---|---|---|---|---|---|---|---|---|---|
| Scratch-resistant layer | $Si_uAl_vO_xN_y$ | 18340.0 | 500 | open | 200 | 300 | open | 3.3 | 30 | 30 |
| First low RI sub-layer | $SiO_xN_y$ | 135.0 | 500 | open | 50 | 50 | closed | 0.5 | 30 | 30 |
| Second high RI sub-layer | $Si_uAl_vO_xN_y$ | 440.0 | 500 | open | 200 | 300 | open | 3.3 | 30 | 30 |
| First low RI sub-layer | $SiO_xN_y$ | 385.0 | 500 | open | 50 | 50 | closed | 0.5 | 30 | 30 |
| Second high RI sub-layer | $Si_uAl_vO_xN_y$ | 275.0 | 500 | open | 200 | 300 | open | 3.3 | 30 | 30 |
| First low RI sub-layer | $SiO_xN_y$ | 640.0 | 500 | open | 50 | 50 | closed | 0.5 | 30 | 30 |
| Second high RI sub-layer | $Si_uAl_vO_xN_y$ | 195.0 | 500 | open | 200 | 300 | open | 3.3 | 30 | 30 |
| Substrate | ABS glass | | | | | | | | | |
| Total time: | | 20410.0 | | | | | | | | |

Comparative Example 12 was formed using the same substrate as Examples 10 and 11, but film disposed on the substrate was formed by reactive sputtering using a Shincron rotary drum coater. The film of Comparative Example 12 included a single optical interference layer disposed between a scratch-resistant layer and the glass substrate. Comparative Example 12 included the following structure: glass substrate/115 nm optical interference layer of $Al_2O_3$/2000 nm scratch-resistant layer of $AlO_xN_y$/32 nm capping layer of $SiO_2$.

Figure 29:
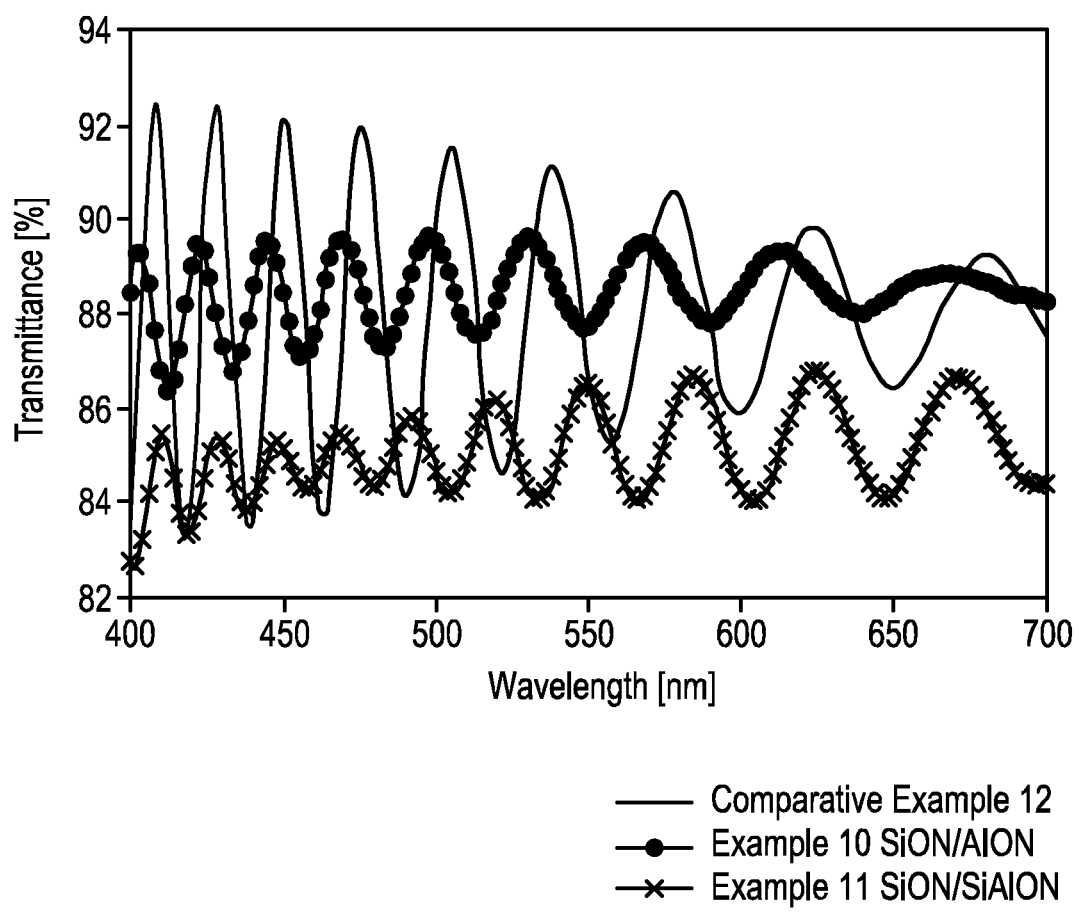
FIG. 29 shows the measured transmittance spectra for articles according to Examples 10-11 and Comparative Example 12.
Figure 30:
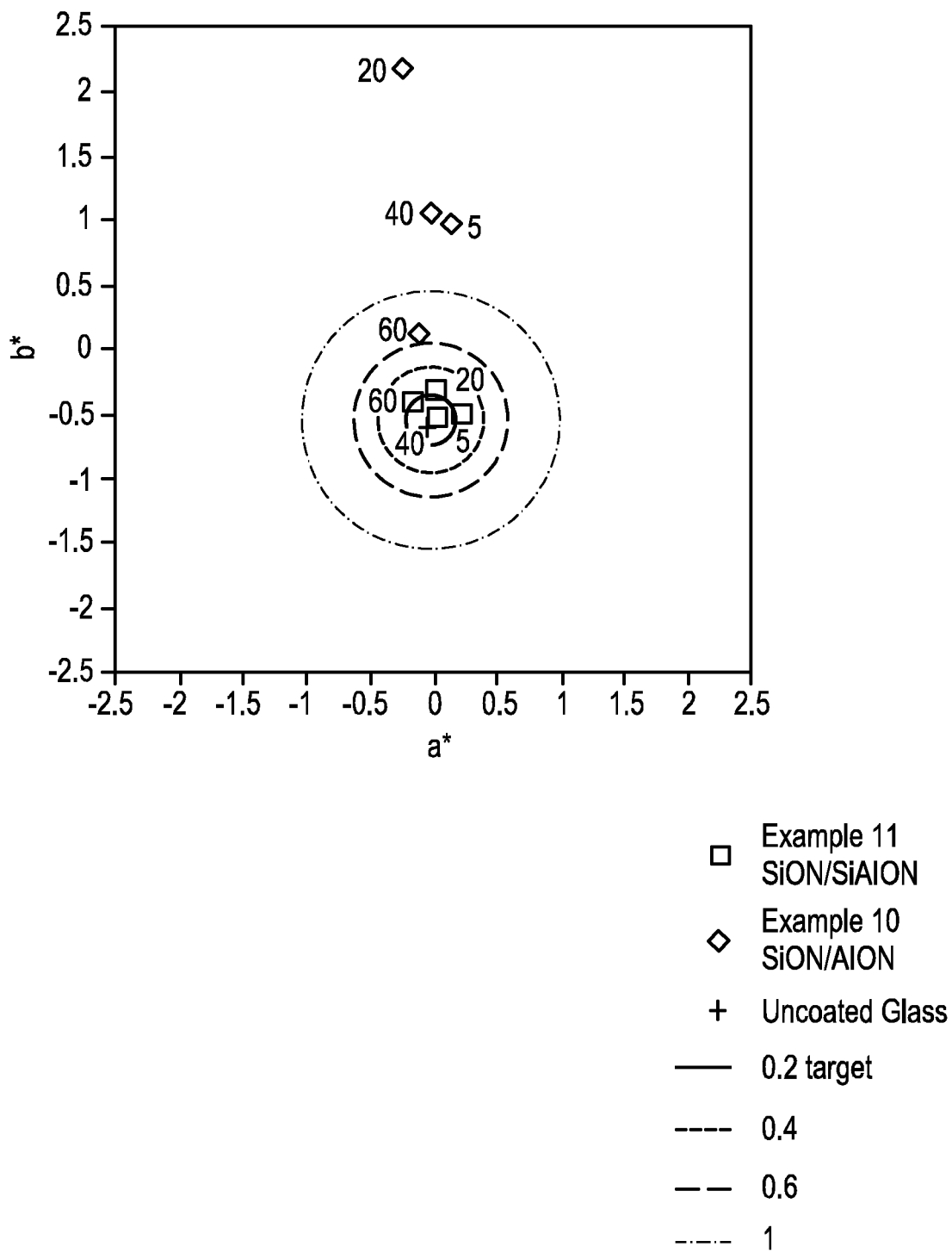
FIG. 30 shows the measured reflected color coordinates for Examples 10-11 and bare glass at different incident illumination angles.
Figure 31:
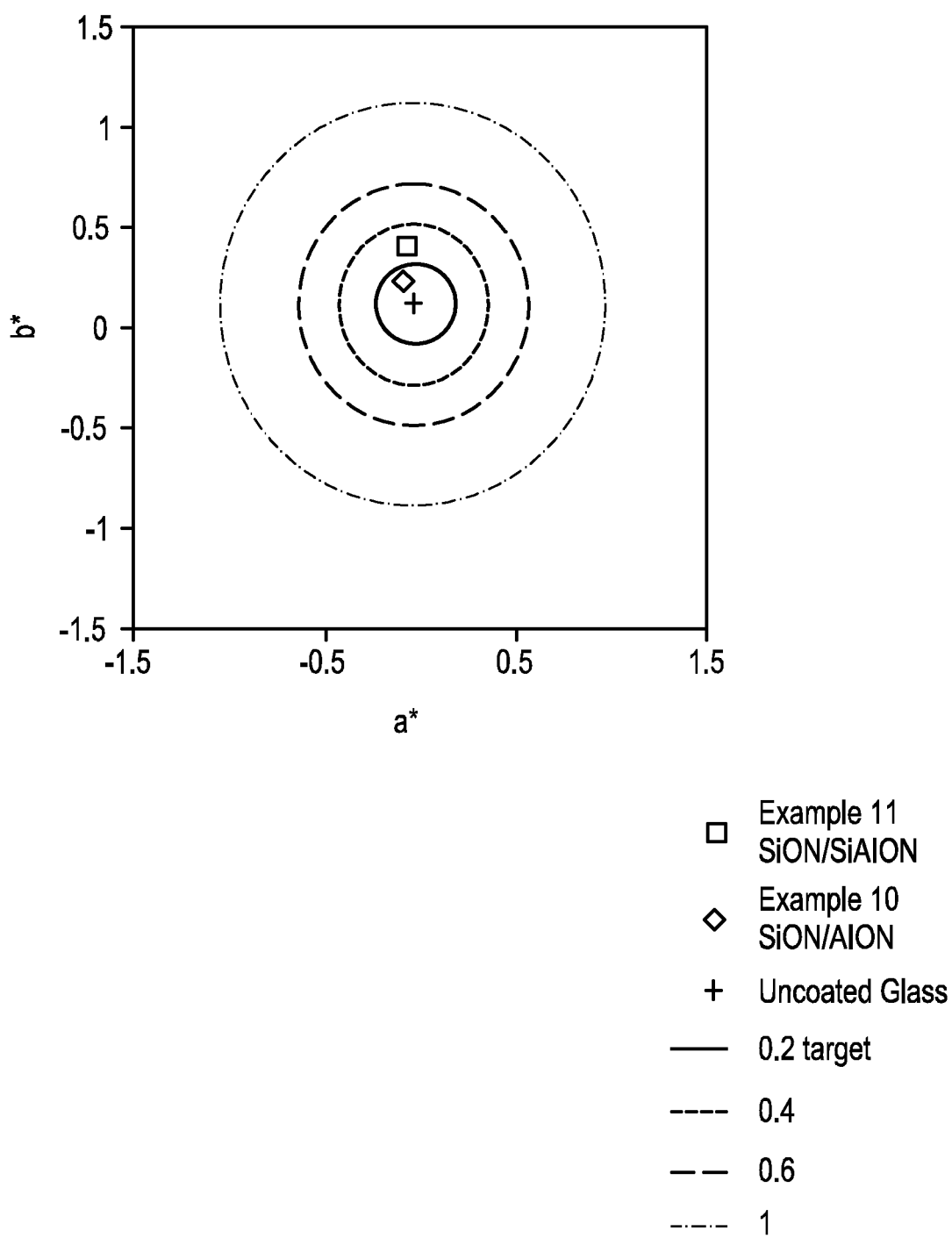
FIG. 31 shows the measured transmitted light color coordinates for Examples 10-11 at an incident illumination angle of 5 degrees.

The optical properties of Examples 10 and 11 and Comparative Example 12 are summarized in FIGS. 29-31. FIG. 29 shows the transmittance spectra for Examples 10-11 and Comparative Example 12. FIG. 30 shows the measured reflected light color coordinates for Examples 10-11 with F2 illumination at different incident illumination angles (e.g., 5, 20, 40, and 60 degrees). FIG. 31 shows the measured transmitted light color coordinates for Examples 10-11 with D65 illumination at an incident illumination angle of 5 degrees. Circular target lines are shown in FIGS. 30 and 31 as guides for the eye.

The oscillation amplitudes in transmittance for Example 10 was measured as less than about 3 percentage points for any 50 nm or 100 nm wavelength range segment, within the broader wavelength range from about 450 nm to about 650 nm, or from about 400 nm to about 700 nm. As shown in FIG. 30, the maximum variation in reflected color coordinates for Example 10 under F2 illumination with measurement incident illumination angle varying from 5 to 60 degrees was less than +/−1.5 in b* color coordinate and less than +/−0.5 in a* color coordinate. As shown in FIG. 31, the transmitted color coordinates for Example 10 under D65 illumination at 5 degree incident illumination angle varies from the uncoated glass color coordinates by less than +/−0.2 in b* color coordinate and less than +/−0.1 in a* color coordinate.

The oscillation amplitudes in transmittance for Example 11 was measured as less than about 3 percentage points for any 50 nm or 100 nm wavelength range segment, within the broader wavelength range from about 450 nm to about 650 nm, or from about 400 nm to about 700 nm. In some instances, the oscillation amplitude was even less than 2 percentage points from some 50 nm or 100 nm wavelength range segments. As shown in FIG. 30, the maximum variation in reflected color coordinates for Example 11 under F2 illumination with measurement incident illumination angle varying from 5 to 60 degrees is less than +/−0.4 in both a* and b* color coordinates. As shown in FIG. 31, the transmitted color coordinates for Example 11 under D65 illumination at 5 degrees varies from the uncoated glass color coordinates by less than +/−0.4 in b* color coordinate and less than +/−0.1 in a* color coordinate.

The oscillation amplitudes in transmittance for Comparative Example 12 were comparatively large, as shown in FIG. 29. From this data, it can be predicted that the color coordinates a* and b* would vary substantially under the same illuminants and the same incident illumination angles as used to evaluate Examples 10 and 11.

The absolute color coordinates for Examples 10 and 11 could be further tuned by adding a capping layer (e.g., a capping layer having a thickness in the range from about 5 nm to about 25 nm of $SiO_2$ or $SiO_xN_y$), as shown in the modeled Examples. The range of color variation and reflectance/transmittance oscillations seen in Examples 10 and 11 is in a low and useful range, although the color variation is somewhat larger than that seen in the modeled Examples. This difference between the modeled Examples 1-9 and Examples 10-11 is believed to be a function of layer thickness and index variations encountered during the reactive RF sputtering process. There are a variety of methods known in the art for forming the optical films of Examples 10-11 and described herein, which were not used in these experiments, which could further improve the control of the experimentally fabricated layer and sub-layer thicknesses and refractive indices. Exemplary methods include slower deposition rates for the thinnest layers in the optical film, optical or quartz crystal thickness monitoring of layer or sub-layer thickness during deposition, plasma emission or mass spectrometric monitoring of the gas composition in the chamber during deposition; and other known techniques used to control layer thickness and composition in thin film deposition.

The optical interference layers used in the Examples were designed to minimize reflection between the scratch-resistant layer and the substrate, thus reducing reflectance oscillation for the entire article. The reduced reflectance oscillation (or reflectance oscillations having reduced amplitudes), provided low observed color and low color shifts at different incidence viewing angles under multiple illumination sources, including illumination sources with sharp wavelength spikes such as CIE F2 and F10 illumination. The scratch-resistant layer exhibited a hardness of greater than about 15 GPa when measured using a Berkovich indenter, as described herein, and in some cases even greater than 20 GPa.

Example 13

Figure 32:
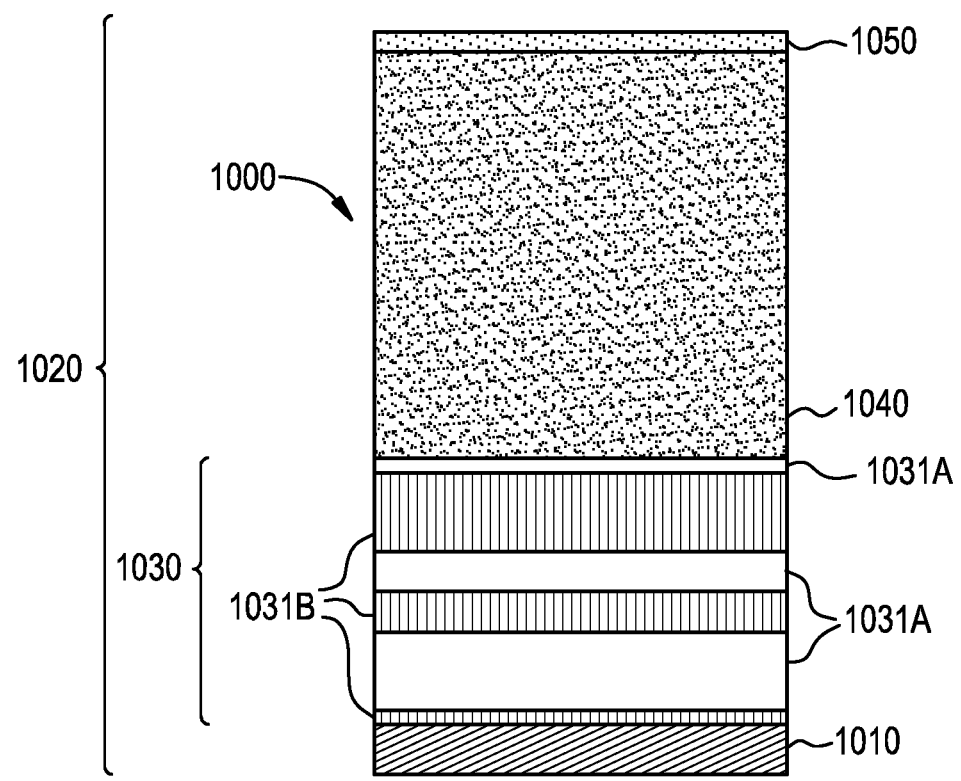
FIG. 32 is a schematic representation of the article according to modeled Example 13.

Modeled Example 13 included an article 1000 with a chemically strengthened glass substrate 1010 and an optical film 1020 disposed on the substrate. The optical film 1020 included an optical interference layer 1030, a scratch resistant layer 1040 disposed on the optical interference layer, and a capping layer 1050 disposed on the scratch-resistant layer 1040. The optical interference layer included three sets of sub-layers 1031A, 1031B, between the substrate and the scratch-resistant layer, as shown in FIG. 32. The optical film materials and thicknesses of each layer, in the order arranged in the optical film, are provided in Table 21.

TABLE 21

Optical film attributes for modeled Example 13.

| Layer | | Material | Modeled Thickness |
|---|---|---|---|
| Ambient medium | | Air | Immersed |
| Capping layer | | $SiO_2$ | 10 nm |
| Scratch-resistant layer | | $AlOxNy$ | 2000 nm |
| Optical inter-ference layer | 1st low RI sub-layer | $SiO_2$ | 10 nm |
| | 2nd high RI sub-layer | $AlOxNy$ | 50 nm |
| | 1st low RI sub-layer | $SiO_2$ | 25 nm |
| | 2nd high RI sub-layer | $AlOxNy$ | 25 nm |
| | 1st low RI sub-layer | $SiO_2$ | 50 nm |
| | 2nd high sub-layer | $AlOxNy$ | 10 nm |
| Substrate | | ABS Glass | Immersed |

Example 13 has symmetrical optical interference layer. In one or more embodiments, the optical interference layer may be modified to have different sub-layers and sub-layers with different thicknesses so long as the symmetry is preserved.

Example 14

Example 14A was formed using an aluminosilicate glass substrate that was chemically strengthened and exhibited a compressive stress in the range from about 700 MPa to about 900 MPa and a depth of compressive stress layer in the range from about 40 about 40 µm to about 50 µm. Example 14A included an optical film including the following structure shown in Table 22, with the thickness of each layer varying by no more than 5 nm, due to manufacturing tolerances.

TABLE 22

Optical Film Attributes of Example 14A.

| | Layer | Material | Thickness |
|---|---|---|---|
| | Capping layer | SiO$_2$ | 10 nm |
| | Scratch-resistant layer | AlOxNy | 2000 nm |
| Optical inter-ference layer | 1$^{st}$ low RI sub-layer | SiO$_2$ | 10 nm |
| | 2$^{nd}$ high RI sub-layer | AlOxNy | 50 nm |
| | 1$^{st}$ low RI sub-layer | SiO$_2$ | 30 nm |
| | 2$^{nd}$ high RI sub-layer | AlOxNy | 30 nm |
| | 1$^{st}$ low RI sub-layer | SiO$_2$ | 50 nm |
| | 2$^{nd}$ high sub-layer | AlOxNy | 10 nm |

Comparative Example 14B included the same substrate as Example 14A but was uncoated. Comparative Example 14C included the same substrate as Example 14A with a hydrophobic, low-friction fluorosilane coating having a thickness of about 10 nm disposed on the substrate. Comparative Examples 14D-14F included the same substrate as Example 14A with a single layer of either Si$_u$Al$_v$O$_x$N$_y$ having a thickness of 186 nm (14D) or 478 nm (14E) or AlO$_x$N$_y$ with a thickness of about 294 nm (14F).

The coatings on Example 14A, and Comparative Examples 14D-14F were formed using reactive DC sputtering or combined reactive DC and RF sputtering from metallic targets. It should be noted that layers of AlO$_x$N$_y$ can often be substituted for the layers of Si$_u$Al$_v$O$_x$N$_y$ layers and can be formed using the same or a similar process used to form such layers. Both Si$_u$Al$_v$O$_x$N$_y$, and AlO$_x$N$_y$ layers can be made which exhibited a refractive index at 550 nm of about 1.95-2.05 and a measured hardness greater than 15 GPa measured using the Berkovich Indentation Hardness Test along an indentation depth of about 100 nm or greater.

Table 23 shows scattered light intensity (CCBTDF, 1/steradian) and transmission haze (with 8 mm aperture) after subjecting the samples to the Taber Test. Table 23 also shows the average scattered light intensity value and haze value of Example 14A, and Comparative Examples 14B-F, as a baseline. Lower scattered light intensity and lower haze correlates to less visible scratches and less visible damage after the abrasion test. Example 14A exhibited the lowest scattered light intensity and haze after the Taber Test indicating superior resistance to multiple contact event damage.

TABLE 23

Scattered Light Intensity and Haze Measurements for Example 14A and Comparative Examples 14B-14F.

| Examples | Scattered light intensity - Avg. +/- Std. Dev. (CCBTDF, 1/steradian) At 20 degrees | Range of Transmission Haze With 8 mm aperture |
|---|---|---|
| Comparative Example 14B - IX glass (no coating) | 0.021 +/- 0.004 | 0.1-0.4 |
| Comparative Example 14C - IX Glass + hydrophobic, low-friction fluorosilane coating | 0.022 +/- 0.015 | 0.25-0.35 |
| Comp. Ex. 14D - IX Glass + 1 L Si$u$Al$v$OxNy 186 nm | 0.03 +/- 0.01 | 0.8 |
| Comp. Ex. 14E - IX Glass + 1 L Si$u$Al$v$OxNy 478 nm | 0.018 +/- 0.001 | 0.3 |
| Comp. Ex. 14F - IX Glass + 1 L AlOxNy 294 nm | 0.174 +/- 0.04 | 5.1 |
| Example 14A 3 L SRC Al$_2$O$_3$/ AlON/SiO$_2$ | 0.002 +/- 0.0001 | 0.05 |
| Average of non-abraded regions of Examples 14A and Comparative Examples 14B-12F | 0.002 +/- 0.001 | 0-0.2 |

Example 14A was also subjected to the Garnet Test (separately from the Taber Test) at different total loads, as shown in Table 24. Comparative Example 14B was also subjected to the Garnet Test (separately from the Taber Test) for comparison.

TABLE 24

Garnet Test results of Example 14A and Comparative Example 14B.

| Total Load applied | Haze (with 8 mm aperture) after Garnet Test with specified total load (g) | | | | | Scattered light at 20 degrees (CCBTDF, 1/sr) |
|---|---|---|---|---|---|---|
| | 380 g | 500 g | 750 g | 1500 g | 2100 g | 2100 g |
| Comparative Ex. 14B | 0.4 | 0.5 | 1.2 | 3.2 | 3.5 | 0.053 +/- 0.03 |
| Example 14A | 0 | 0 | 0 | 0 | 0.1 | 0.002 +/- 0.0005 |

As shown in Table 24, Example 14A exhibited significantly less haze and less scattered light after the Garnet Test at all loads as compared to Comparative Example 14B.

It will be apparent to those skilled in the art that various modifications and variations can be made without departing from the spirit or scope of the invention.

What is claimed is:
1. A device comprising:
a cover article, the cover article comprising a substrate having a surface, and an optical film disposed on the substrate surface forming a coated surface, the optical film comprising a scratch-resistant layer and an optical interference layer disposed between the scratch-resistant layer and the substrate, the optical interference layer comprises a physical thickness from about 50 nm to about 800 nm,
wherein the optical interference layer comprises at least one set of sub-layers, the set of sub-layers comprising a first low refractive index (RI) sub-layer and a second high refractive index (RI) sub-layer,
wherein the first low RI sub-layer comprises a contiguous and uninterrupted sub-layer of SiO2 disposed in direct contact with the substrate surface and has a refractive index from about 1.4 to about 1.5, as measured from about 380 nm to about 750 nm, and a physical thickness from 12 nm to about 135 nm,
wherein the optical film comprises a total of eight (8) or less of the scratch-resistant layer and the sub-layers of the optical interference layer, and further wherein the cover article comprises a maximum hardness of 8 GPa or greater, as measured by a Berkovich Indenter Hardness Test along indentation depths of about 100 nm or greater.

2. The device of claim 1, wherein the optical interference layer comprises a physical thickness from about 50 nm to about 300 nm.

3. The device of claim 1, wherein the cover article comprises a maximum hardness of 10 GPa or greater, as measured by a Berkovich Indenter Hardness Test along indentation depths of about 100 nm or greater.

4. The device of claim 1, wherein the difference between the refractive index of the first low RI sub-layer and the refractive index of the second high RI sub-layer is about 0.01 or greater.

5. The device of claim 1, wherein the second RI sub-layer comprises a silicon-containing nitride or a silicon-containing oxynitride, and the scratch resistant layer comprises a silicon-containing nitride or a silicon-containing oxynitride.

6. The device of claim 1, wherein:
the second high RI sub-layer comprises at least one of $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, and $MoO_3$.

7. The device of claim 1, wherein the second high RI sub-layer comprises an optical thickness (n*d) in the range from about 2 nm to about 200 nm where n is the refractive index and d is the physical thickness of the second high RI sub-layer.

8. The device of claim 1, wherein the optical interference layer comprises an average light reflection of about 2% or less over the optical wavelength regime.

9. The device of claim 1, wherein the substrate comprises a glass selected from the group consisting of soda lime glass, alkali aluminosilicate glass, alkali containing borosilicate glass and alkali aluminoborosilicate glass.

10. The device of claim 1, wherein the substrate comprises a glass that is chemically strengthened and comprises a compressive stress (CS) layer with a surface CS of at least 250 MPa extending within the chemically strengthened glass from a surface of the chemically strengthened glass to a depth of layer (DOL) of at least about 10 µm.

11. The device of claim 1, wherein the cover article further comprises a color shift of 2 or less, when viewed at at least one incident illumination angle in the range from about 2 degrees to about 60 degrees from normal incidence under an illuminant comprising CIE A illuminants, CIE B illuminants, CIE C illuminants, CIE D illuminants or CIE F illuminants, and
further wherein color shift is determined by the equation $\sqrt{((a^*_2-a^*_1)^2+(b^*_2-b^*_1)^2)}$, where a*1 and b*1 are coordinates of the article when viewed at normal incidence and a*2 and b*2 are coordinates of the article viewed at the at least one incident illumination angle, and wherein the coordinates of the article when viewed at normal incidence and at the at least one incident illumination angle are both in transmittance or reflectance.

12. The device of claim 1, wherein the substrate comprises a crystalline substrate.

13. The device of claim 12, wherein the crystalline substrate comprises a glass ceramic substrate.

14. The device of claim 1, wherein the device is a smart phone, a mobile phone, a tablet, a computer, or a navigation system.

15. The device of claim 1, wherein the first low RI sub-layer comprises the sub-layer of $SiO_2$ and a sub-layer of $Al_2O_3$.

16. The device of claim 1, wherein the optical film comprises a physical thickness from about 100 nm to about 350 nm.

17. The device of claim 1, wherein the cover article further comprises a color shift of 2 or less, when viewed at each of the incident illumination angles in the range from about 2 degrees to about 60 degrees from normal incidence under an illuminant comprising CIE A illuminants, CIE B illuminants, CIE C illuminants, CIE D illuminants or CIE F illuminants, and
further wherein color shift is determined by the equation $\sqrt{((a^*_2-a^*_1)^2+(b^*_2-b^*_1)^2)}$, where a*1 and b*1 are coordinates of the article when viewed at normal incidence and a*2 and b*2 are coordinates of the article viewed at each of the incident illumination angles, and wherein the coordinates of the article when viewed at normal incidence and at each of the incident illumination angles are both in transmittance or reflectance.

18. The device of claim 1, wherein the optical interference layer comprises a physical thickness from about 50 nm to about 450 nm.

19. The device of claim 1, wherein the optical interference layer comprises a physical thickness from about 50 nm to about 500 nm.

20. A device comprising:
a cover article, the cover article comprising a substrate comprising a substrate surface, and an optical film disposed on the substrate surface forming a coated surface,
wherein the optical film comprises a scratch-resistant layer and an optical interference layer disposed between the scratch-resistant layer and the substrate, the optical interference layer comprising at least one set of sub-layers, the set of sub-layers comprising a first low refractive index (RI) sub-layer and a second high refractive index (RI) sub-layer, the scratch-resistant layer having a physical thickness from 0.1 microns to 3 microns, the optical interference layer comprises a physical thickness from about 50 nm to about 800 nm, wherein at least one of the sub-layers in the optical interference layer has an optical thickness (n*d) in the range from 2 nm to 200 nm where n is the refractive index and d is the physical thickness of each of the sub-layers,
wherein the first low RI sub-layer comprises a contiguous and uninterrupted sub-layer of $SiO_2$ disposed in direct contact with the substrate surface and has a refractive index from about 1.4 to about 1.5, as measured from about 380 nm to about 750 nm, and a physical thickness from 12 nm to about 135 nm,
wherein the optical film comprises a total of eight (8) or less of the scratch-resistant layer and the sub-layers of the optical interference layer, and
wherein the cover article comprises a maximum hardness of 8 GPa or greater, as measured by a Berkovich Indenter Hardness Test along indentation depths of about 100 nm or greater.

21. The device of claim 20, wherein the cover article further comprises a color shift of 2 or less, when viewed at at least one incident illumination angle in the range from about 2 degrees to about 60 degrees from normal incidence under an illuminant comprising CIE A illuminants, CIE B illuminants, CIE C illuminants, CIE D illuminants or CIE F illuminants, and
further wherein color shift is determined by the equation $\sqrt{((a^*_2-a^*_1)^2+(b^*_2-b^*_1)^2)}$, where a*1 and b*1 are coordinates of the article when viewed at normal incidence and a*2 and b*2 are coordinates of the article viewed at the at least one incident illumination angle, and wherein the coordinates of the article when viewed at normal incidence and at the at least one incident illumination angle are both in transmittance or reflectance.

22. The device of claim 20, wherein the substrate comprises a crystalline substrate.

23. The device of claim 22, wherein the crystalline substrate comprises a glass ceramic substrate.

24. The device of claim 20, wherein the device is a smart phone, a mobile phone, a tablet, a computer, or a navigation system.

25. The device of claim 20, wherein the cover article further comprises a color shift of 2 or less, when viewed at each of the incident illumination angles in the range from about 2 degrees to about 60 degrees from normal incidence under an illuminant comprising CIE A illuminants, CIE B illuminants, CIE C illuminants, CIE D illuminants or CIE F illuminants, and
further wherein color shift is determined by the equation $\sqrt{((a^*_2-a^*_1)^2+(b^*_2-b^*_1)^2)}$, where $a^*1$ and $b^*1$ are coordinates of the article when viewed at normal incidence and $a^*2$ and $b^*2$ are coordinates of the article viewed at each of the incident illumination angles, and wherein the coordinates of the article when viewed at normal incidence and at each of the incident illumination angles are both in transmittance or reflectance.

26. The device of claim 20, wherein the optical film further comprises a capping layer disposed on the scratch-resistant layer, the capping layer comprises a contiguous and uninterrupted sub-layer of $SiO_2$ having a refractive index from about 1.4 to about 1.5, as measured from about 380 nm to about 750 nm.

27. A device comprising:
a cover article, the cover article comprising a substrate having a surface, and an optical film disposed on the substrate surface forming a coated surface,
wherein the optical film comprises a scratch-resistant layer and an optical interference layer disposed between the scratch-resistant layer and the substrate,
wherein the optical film further comprises a capping layer disposed on the scratch-resistant layer,
wherein the optical interference layer comprises a physical thickness from about 50 nm to about 800 nm,
wherein the optical interference layer further comprises at least one first low refractive index (RI) sub-layer and at least one second high refractive index (RI) sub-layer,
wherein the first low RI sub-layer comprises a contiguous and uninterrupted sub-layer of $SiO_2$ disposed in direct contact with the substrate surface and the capping layer comprises a contiguous and uninterrupted layer of $SiO_2$, each of the first low RI sub-layer and the capping layer having a refractive index from about 1.4 to about 1.5, as measured from about 380 nm to about 750 nm,
wherein the first low RI sub-layer comprises a physical thickness from 12 nm to about 135 nm,
wherein the optical film comprises a total of eight (8) or less of the scratch-resistant layer and the sub-layers of the optical interference layer, and
further wherein the cover article comprises a maximum hardness of 8 GPa or greater, as measured by a Berkovich Indenter Hardness Test along indentation depths of about 100 nm or greater.

28. The device of claim 27, wherein at least one of the sub-layers in the optical interference layer has an optical thickness (n*d) in the range from 2 nm to 200 nm.

29. The device of claim 27, wherein the scratch-resistant layer has a physical thickness from 0.1 microns to 3 microns, and further wherein the scratch-resistant layer and the at least one second high RI sub-layer comprises $Si_3N_4$ or $SiO_xN_y$.

30. The device of claim 27, wherein the substrate comprises a crystalline substrate.

31. The device of claim 30, wherein the crystalline substrate comprises a glass ceramic substrate.

32. The device of claim 27, wherein the device is a smart phone, a mobile phone, a tablet, a computer, or a navigation system.

33. A device comprising:
a cover article, the cover article comprising a substrate having a surface, and an optical film disposed on the substrate surface forming a coated surface, the optical film comprising a scratch-resistant layer and an optical interference layer disposed between the scratch-resistant layer and the substrate, the optical interference layer comprises a physical thickness from about 50 nm to about 800 nm,
wherein the optical interference layer comprises at least one set of sub-layers, the set of sub-layers comprising a first low refractive index (RI) sub-layer and a second high refractive index (RI) sub-layer,
wherein the first low RI sub-layer comprises a contiguous and uninterrupted sub-layer of $SiO_2$ disposed in direct contact with the substrate surface and has a refractive index from about 1.4 to about 1.5, as measured from about 380 nm to about 750 nm, and a physical thickness from 12 nm to about 135 nm,
wherein the scratch-resistant layer comprises a physical thickness from about 100 nm to about 3000 nm, and
further wherein the cover article comprises a maximum hardness of 8 GPa or greater, as measured by a Berkovich Indenter Hardness Test along indentation depths of about 100 nm or greater.

34. The device of claim 33, wherein the substrate comprises a crystalline substrate.

35. The device of claim 34, wherein the crystalline substrate comprises a glass ceramic substrate.

36. The device of claim 33, wherein the device is a smart phone, a mobile phone, a tablet, a computer, or a navigation system.

* * * * *

UNITED STATES PATENT AND TRADEMARK OFFICE
CERTIFICATE OF CORRECTION

| | |
|---|---|
| PATENT NO. | : 11,231,526 B2 |
| APPLICATION NO. | : 16/386759 |
| DATED | : January 25, 2022 |
| INVENTOR(S) | : Robert Alan Bellman et al. |

It is certified that error appears in the above-identified patent and that said Letters Patent is hereby corrected as shown below:

On the Title Page

Item (56), in Column 2, under "Other Publications", Line 1, delete "nanolamianted" and insert -- nanolaminated --.

Item (56), in Column 2, under "Other Publications", Line 3, delete "(See copy." and insert -- (See copy). --.

On the Page 5, item (56), in Column 2, under "Other Publications", Line 5, delete "Stabilzed" and insert -- Stabilized --.

On the Page 5, item (56), in Column 2, under "Other Publications", Line 10, delete "AIN" and insert -- AlN --.

On the Page 5, item (56), in Column 2, under "Other Publications", Line 16, delete "Sceince" and insert -- Science --.

On the Page 5, item (56), in Column 2, under "Other Publications", Line 27, delete "(1985." and insert -- (1985). --.

On the Page 6, item (56), in Column 1, under "Other Publications", Line 10, delete "AI/AIN" and insert -- Al/AlN --.

On the Page 6, item (56), in Column 1, under "Other Publications", Line 20, delete "AIN" and insert -- AlN --.

On the Page 6, item (56), in Column 1, under "Other Publications", Line 21, delete "AIN" and insert -- AlN --.

On the Page 6, item (56), in Column 1, under "Other Publications", Line 23, delete "AIN" and insert Signed and Sealed this
Eighteenth Day of July, 2023

*Katherine Kelly Vidal*

Katherine Kelly Vidal
*Director of the United States Patent and Trademark Office*

-- AlN --

On the Page 6, item (56), in Column 2, under "Other Publications", Line 13, delete "Incluence" and insert -- Influence --.

On the Page 6, item (56), in Column 2, under "Other Publications", Line 19, delete "notride" and insert -- nitride --.

On the Page 6, item (56), in Column 2, under "Other Publications", Line 62, delete "Interconects" and insert -- Interconnects --.

On the Page 6, item (56), in Column 2, under "Other Publications", Line 64, delete "consideratino" and insert -- consideration --.

On the Page 6, item (56), in Column 2, under "Other Publications", Line 70, delete "(See Copy." and insert -- (See Copy). --.

On the Page 6, item (56), in Column 2, under "Other Publications", Line 73, delete "(2010." and insert -- (2010). --.

On the Page 7, in Column 1, under "Other Publications", Line 9, delete "(1989," and insert -- (1989), --.

On the Page 7, in Column 1, under "Other Publications", Line 29, delete "Characatization" and insert -- Characterization --.

On the Page 7, in Column 1, under "Other Publications", Line 30, delete "Physices" and insert -- Physics --.

On the Page 7, in Column 1, under "Other Publications", Line 35, delete "(See copy." and insert -- (See copy). --.

On the Page 7, in Column 1, under "Other Publications", Line 46, delete "(See Copy." and insert -- (See Copy). --.

On the Page 7, in Column 2, under "Other Publications", Line 3, delete "(See copy." and insert -- (See copy). --.

On the Page 7, in Column 2, under "Other Publications", Line 25, delete "oxyynitride" and insert -- oxynitride --.

On the Page 7, in Column 2, under "Other Publications", Line 33, delete "(Year: 2001." and insert -- (Year: 2001). --.

On the Page 7, in Column 2, under "Other Publications", Line 36, delete "(Year: 1999." and insert -- (Year: 1999). --.

CERTIFICATE OF CORRECTION (continued)
U.S. Pat. No. 11,231,526 B2

On the Page 7, in Column 2, under "Other Publications", Line 39, delete "(Year: 2012." and insert -- (Year: 2012). --.

On the Page 7, in Column 2, under "Other Publications", Line 47, delete "Si02" and insert -- SiO2 --.

In the Claims

In Column 46, Line 60, in Claim 1, delete "SiO2" and insert -- $SiO_2$ --.

In Column 47, Line 22, in Claim 6, delete "AlN," and insert -- AlN, --.

In Column 47, Line 50, in Claim 11, delete "a*1 and b*1" and insert -- $a*_1$ and $b*_1$ --.

In Column 47, Line 52, in Claim 11, delete "a*2 and b*2" and insert -- $a*_2$ and $b*_2$ --.

In Column 48, Line 12, in Claim 17, delete "a*1 and b*1" and insert -- $a*_1$ and $b*_1$ --.

In Column 48, Line 14, in Claim 17, delete "a*2 and b*2" and insert -- $a*_2$ and $b*_2$ --.

In Column 48, Line 66, in Claim 21, delete "a*1 and b*1" and insert -- $a*_1$ and $b*_1$ --.

In Column 49, Line 1, in Claim 21, delete "a*2 and b*2" and insert -- $a*_2$ and $b*_2$ --.

In Column 49, Line 22, in Claim 25, delete "a*1 and b*1" and insert -- $a*_1$ and $b*_1$ --.

In Column 49, Line 24, in Claim 25, delete "a*2 and b*2" and insert -- $a*_2$ and $b*_2$ --.